United States Patent
Otani et al.

(10) Patent No.: US 6,689,328 B1
(45) Date of Patent: Feb. 10, 2004

(54) METAL HONEYCOMB BODY FOR EXHAUST GAS PURIFICATION CATALYST AND METHOD FOR PRODUCING THE SAME

(75) Inventors: Tadayuki Otani, Tokai (JP); Atuhiko Imai, Tokai (JP); Masayuki Kasuya, Tokai (JP); Kazutoshi Iwami, Tokyo (JP); Toru Utsumi, Tokyo (JP); Mikio Yamanaka, Futtsu (JP); Hitoshi Ohta, Tokyo (JP); Yoshikuni Tokunaga, Aichi (JP); Fujio Shimizu, Tokai (JP); Toshihiro Egami, Tokai (JP); Tamio Noda, Tokai (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/423,489

(22) PCT Filed: Aug. 15, 1997

(86) PCT No.: PCT/JP97/02842

§ 371 (c)(1),
(2), (4) Date: Mar. 6, 2000

(87) PCT Pub. No.: WO98/51410

PCT Pub. Date: Nov. 19, 1998

(30) Foreign Application Priority Data

| May 9, 1997 | (JP) | 9-119914 |
| May 9, 1997 | (JP) | 9-119915 |
| May 12, 1997 | (JP) | 9-120931 |
| Jun. 5, 1997 | (JP) | 9-148223 |

(51) Int. Cl.$^7$ .............................. B01J 35/04; B32B 3/12; B21D 47/00
(52) U.S. Cl. .................... 422/180; 422/177; 502/439; 29/890; 428/593; 228/181; 228/193
(58) Field of Search ............. 502/527.19–527.22, 502/527.18, 439; 422/312, 177, 180, 179, 222, 181; 228/181–183, 193; 29/890

(56) References Cited

U.S. PATENT DOCUMENTS 4,752,599 A * 6/1988 Nakamura et al. .......... 502/257
4,870,046 A * 9/1989 Yamanaka et al. .......... 502/439
5,173,471 A * 12/1992 Usui et al. ................ 502/439

FOREIGN PATENT DOCUMENTS

| EP | 0636411 | 2/1995 |
| EP | WO 95 21022 | 8/1995 |
| JP | 1-266978 | 10/1989 |
| JP | 3-61113 | 6/1991 |
| JP | 5-9638 | 2/1993 |
| JP | 5-131144 | 5/1993 |
| JP | 5-168947 | 7/1993 |
| JP | 7-328778 | 12/1995 |
| JP | 8-38912 | 2/1996 |
| JP | 08-038912 A * | 2/1996 |
| JP | 8-22380 | 3/1996 |
| JP | 8-108077 | 4/1996 |
| JP | 8-229411 | 9/1996 |
| JP | 2521839 | 10/1996 |
| JP | 8-332394 | 12/1996 |
| JP | 9-76035 | 2/1997 |
| JP | 9-99218 | 4/1997 |
| JP | 9-215932 | 8/1997 |

* cited by examiner

Primary Examiner—Hien Tran
(74) Attorney, Agent, or Firm—Kenyon & Kenyon

(57) ABSTRACT

In order to improve solid phase diffusion bondability at contact portions between a metal flat foil and a metal corrugated foil together constituting a metal honeycomb body for a catalyst converter used for purifying an exhaust gas and to improve engine durability, the present invention comprises one or combination of the following structures; a structure wherein at least one of the metal foils has a foil thickness of less than 40 $\mu$m; a structure wherein an Al content after bonding is at least 3%; a structure wherein the surface condition of both metal foils in a width-wise direction has a predetermined surface coarseness or a predetermined surface shape and condition; and a structure wherein the width of contact portions between both metal foils is at least five times the thickness of the metal foils. In order to further improve engine durability, the present invention disposes an unbonded portion inside the honeycomb body having the construction described above, or disposes a shell on the outer periphery of the honeycomb body.

31 Claims, 34 Drawing Sheets

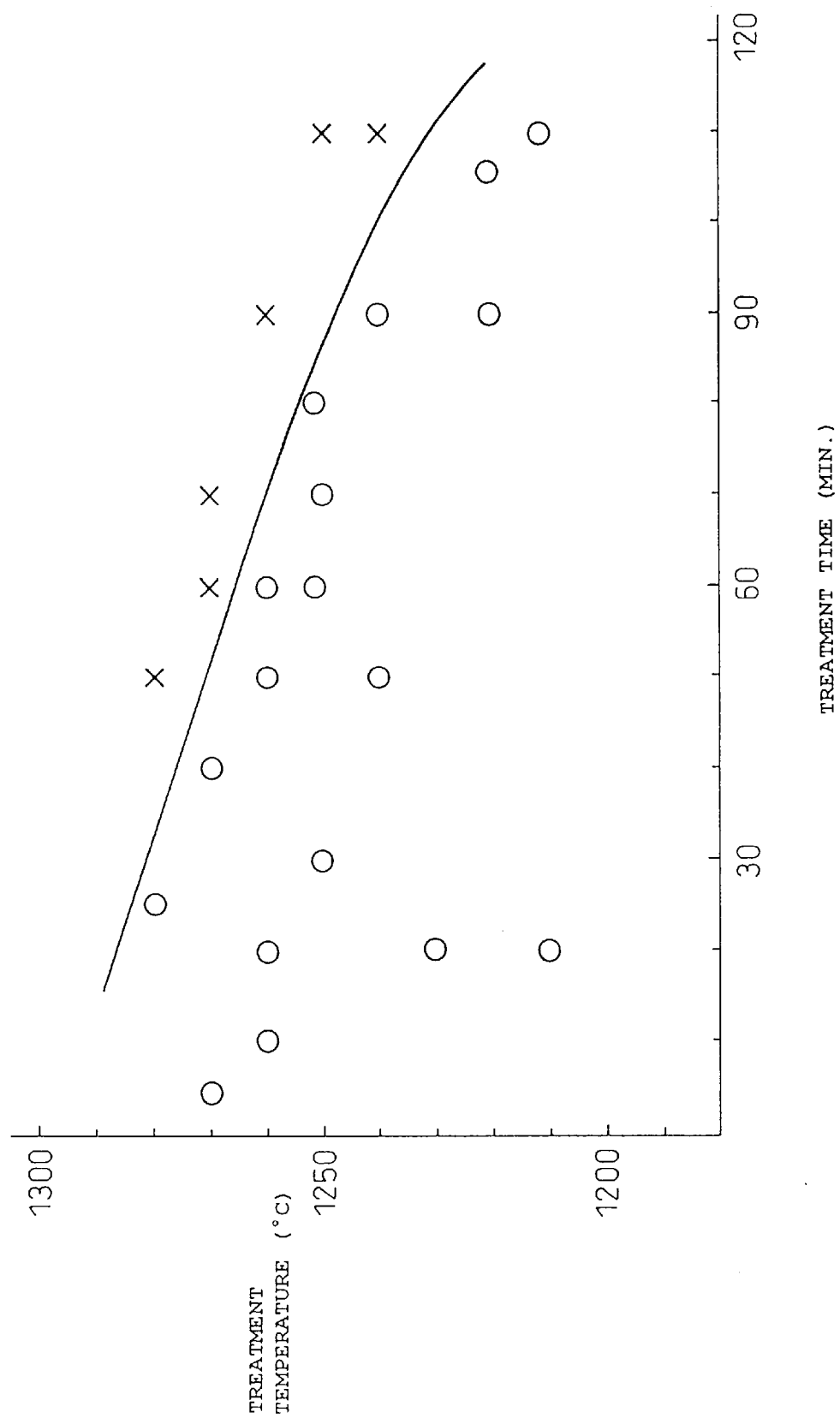

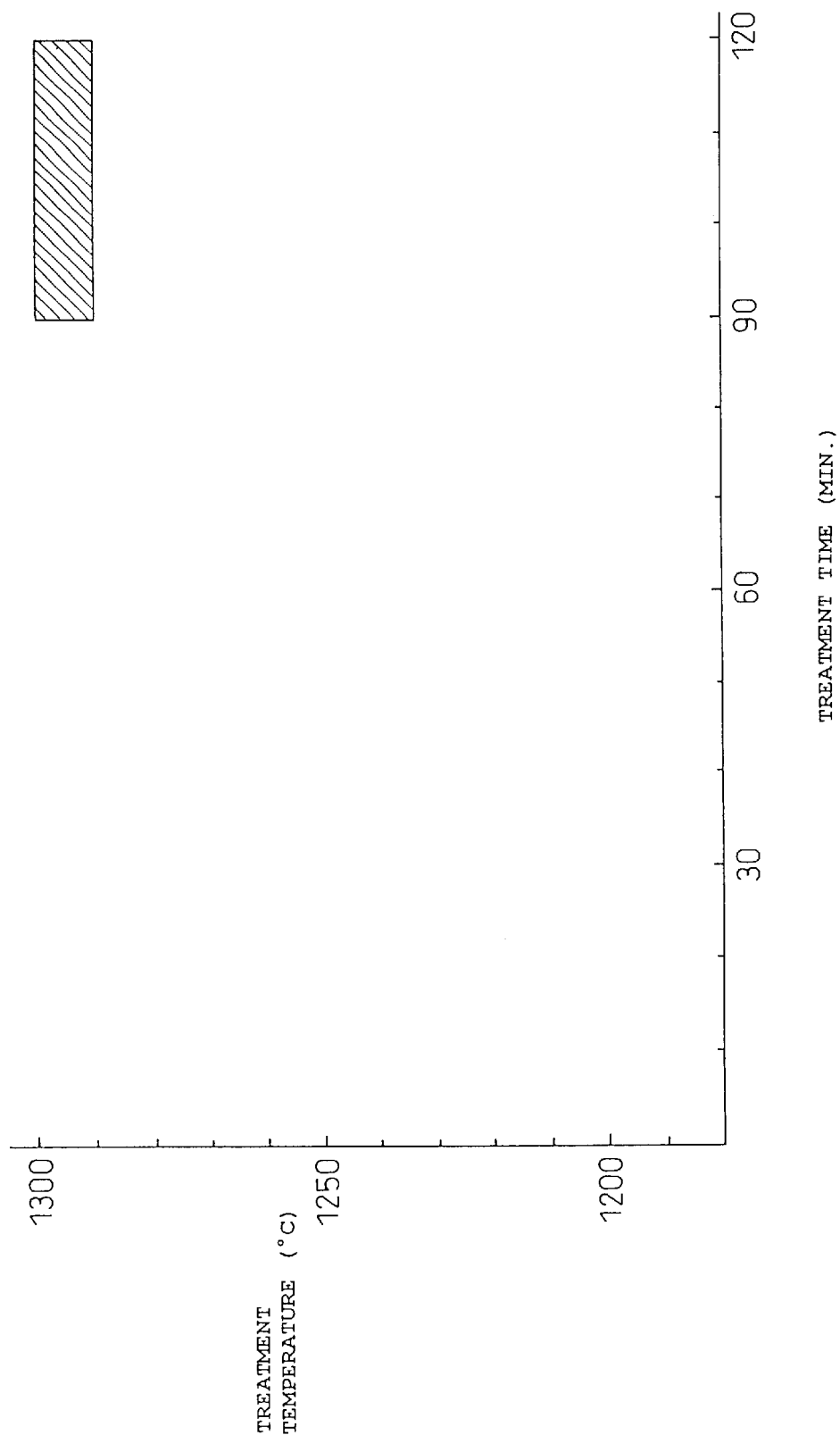

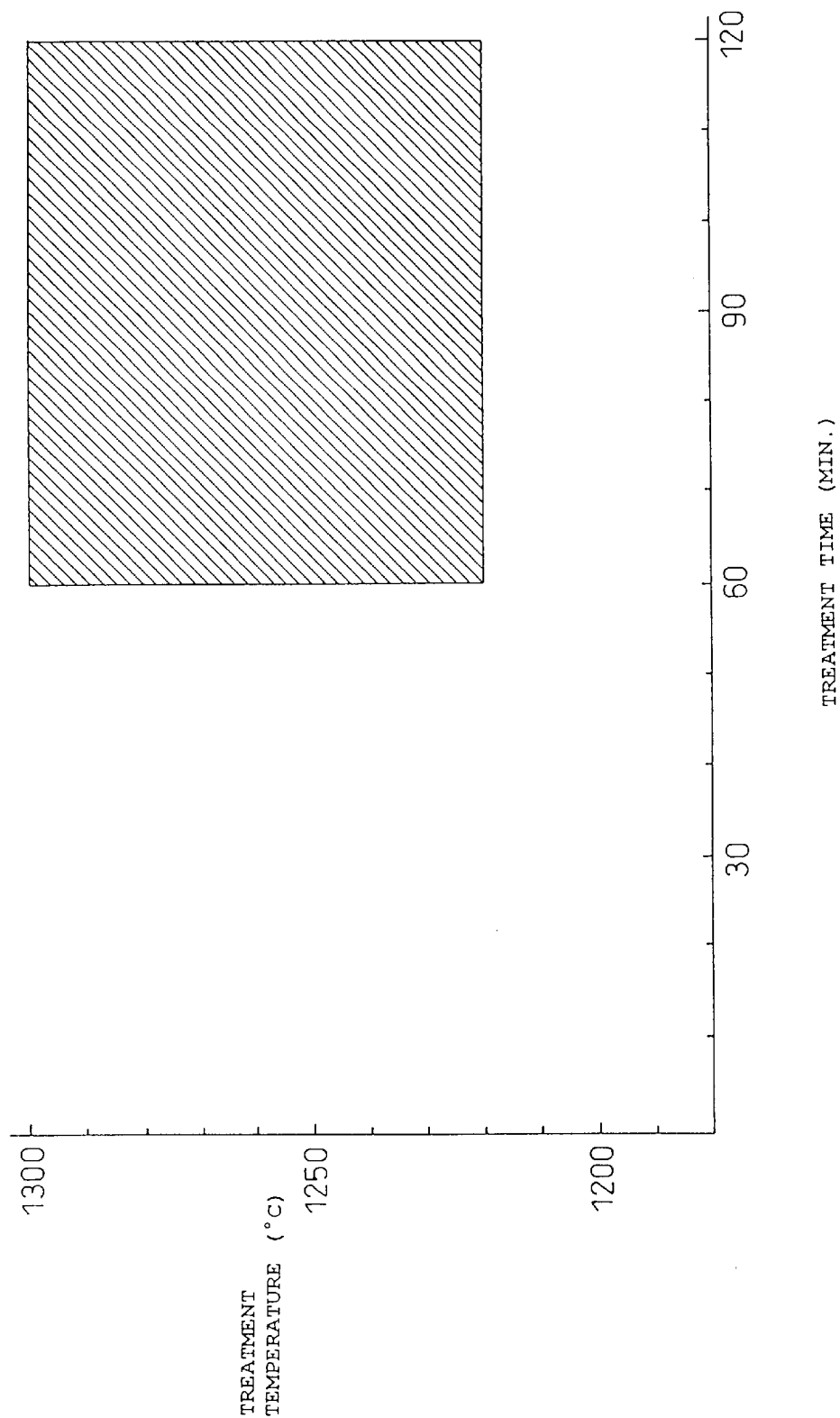

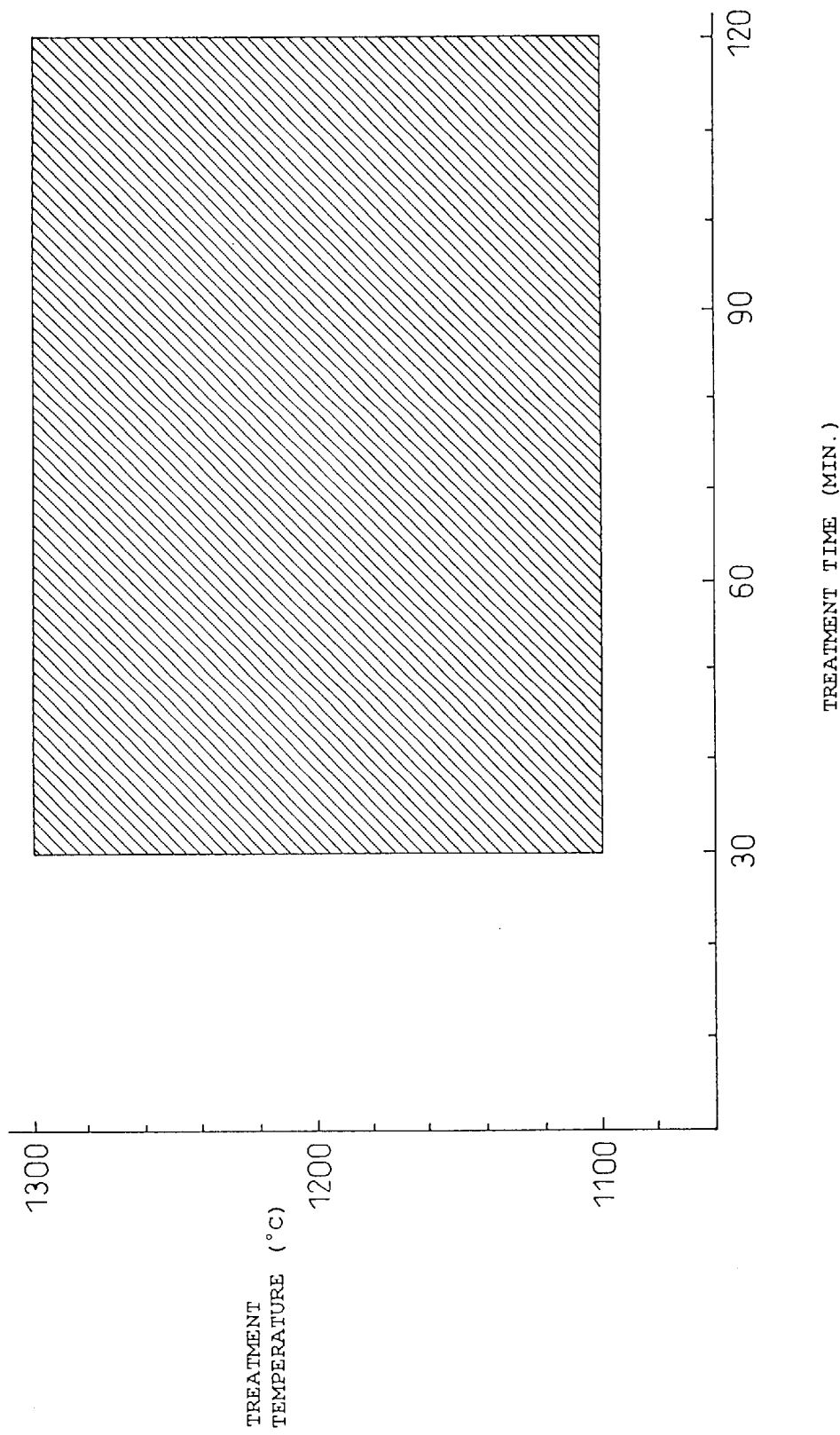

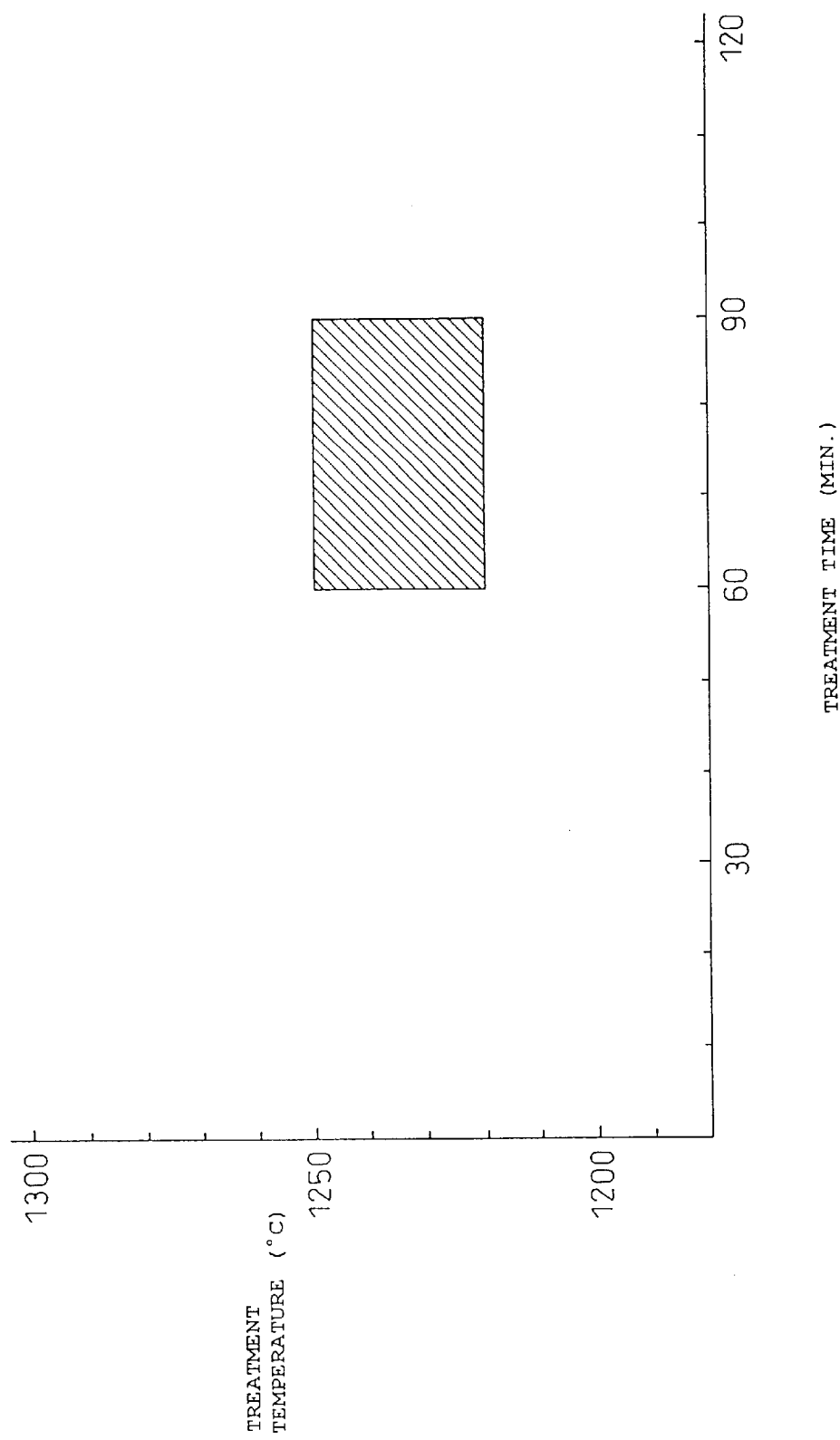

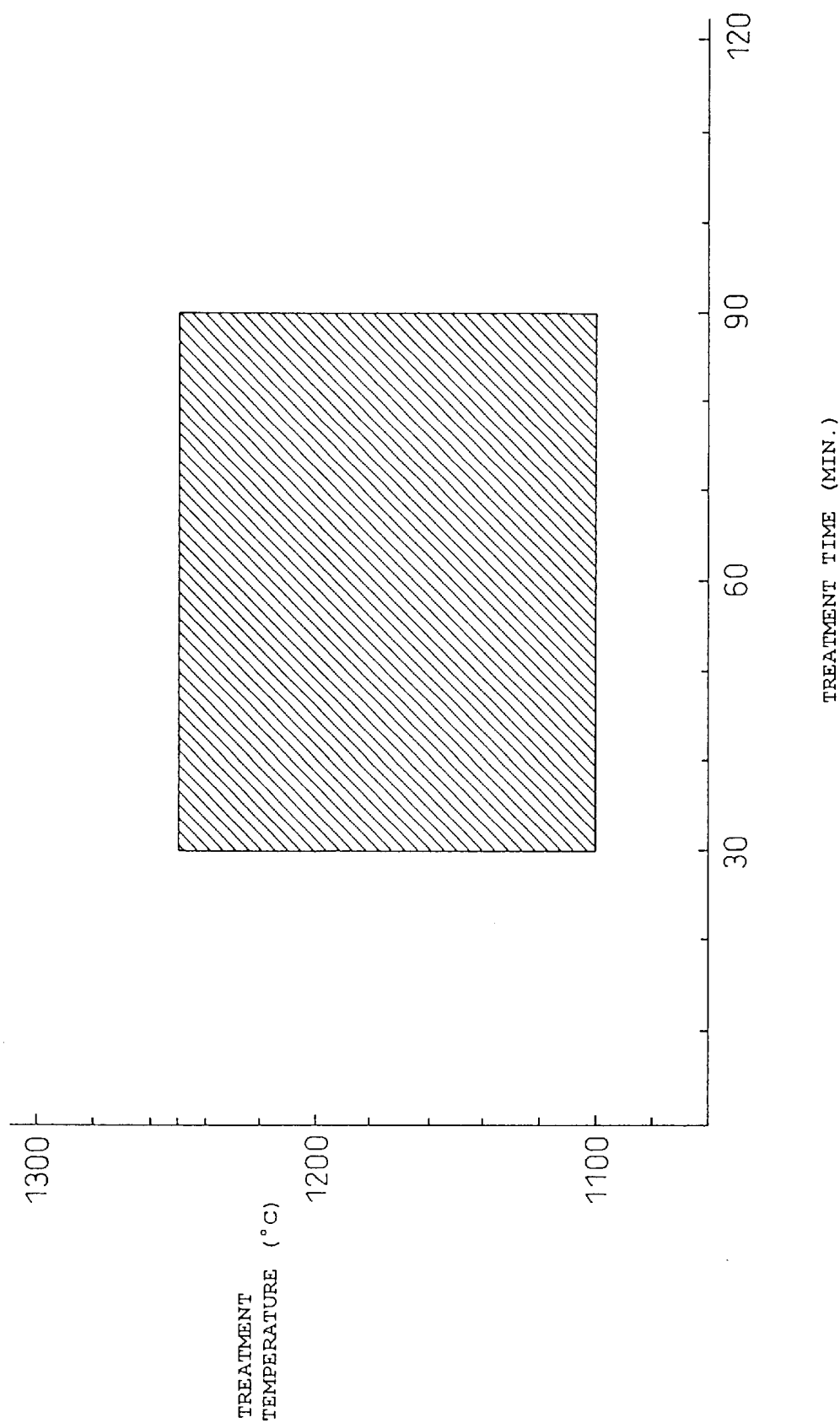

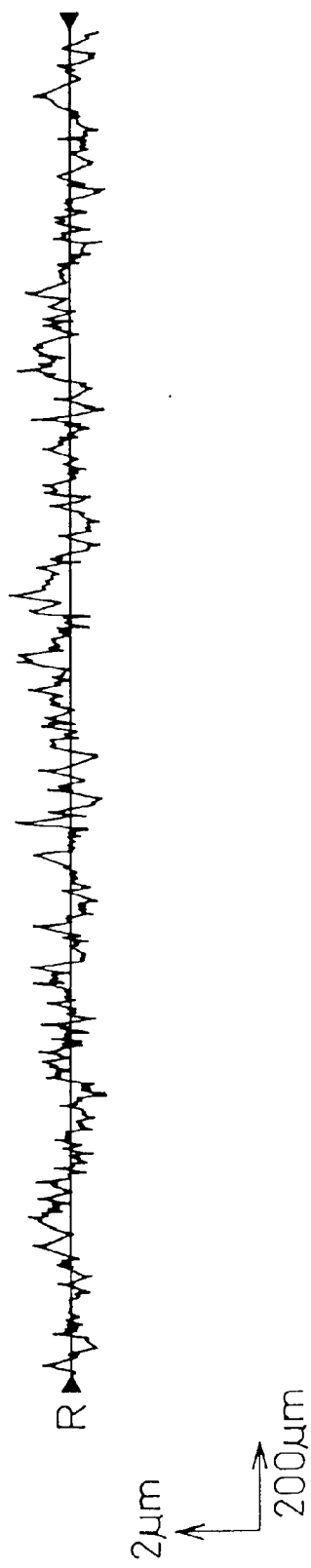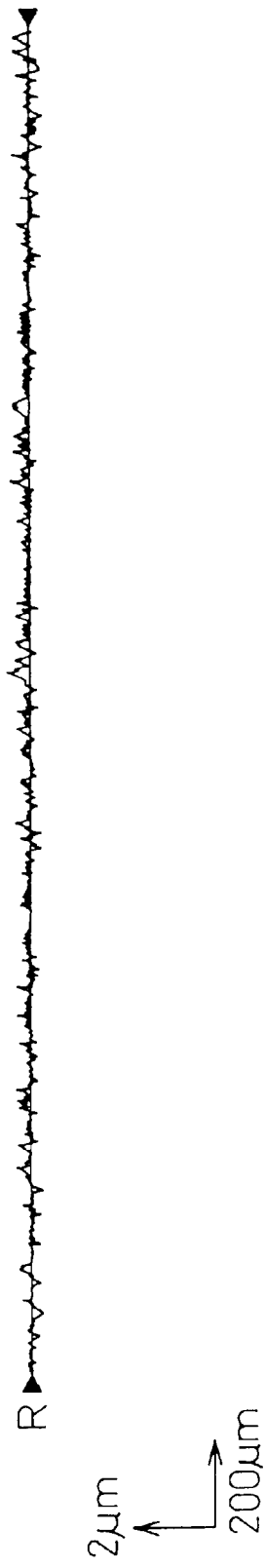

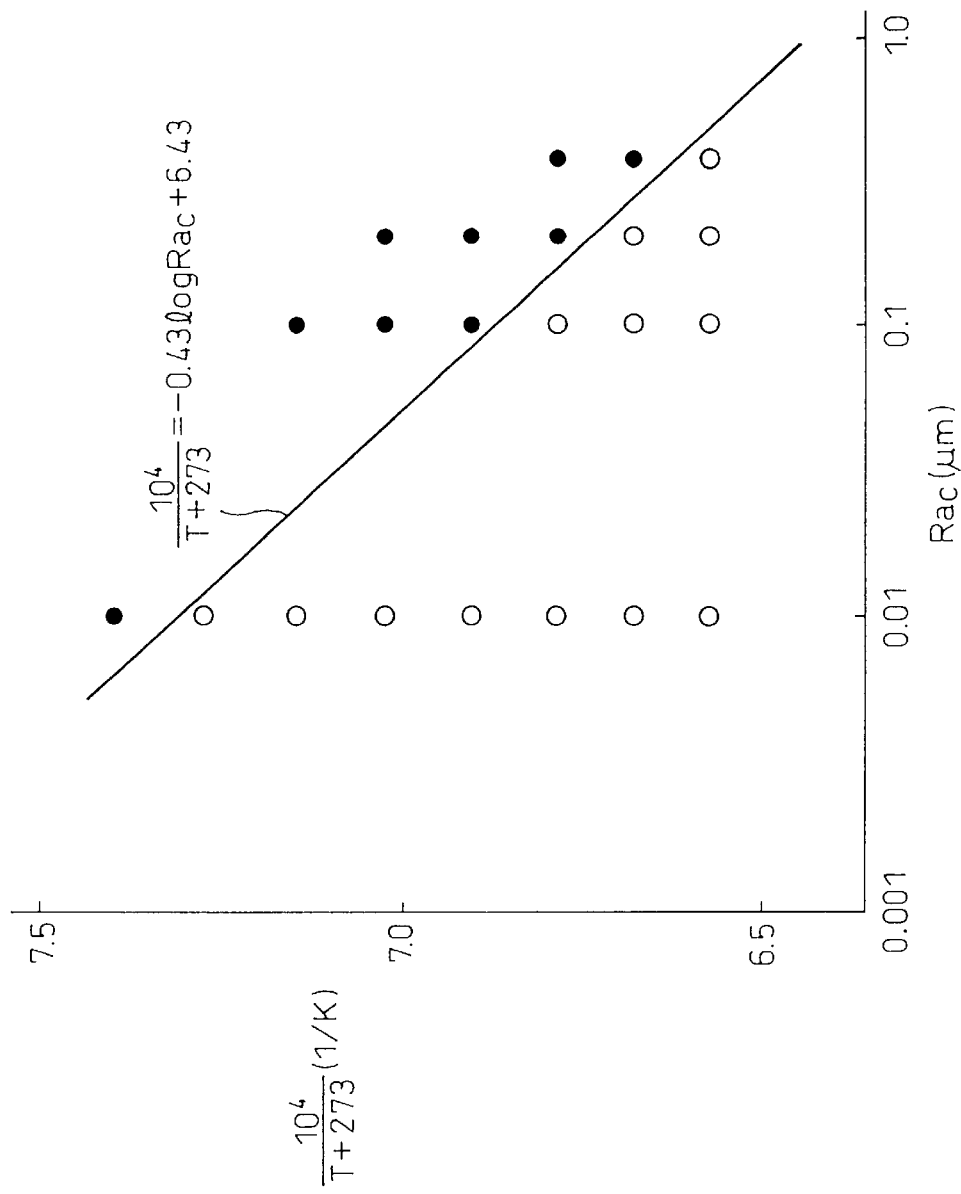

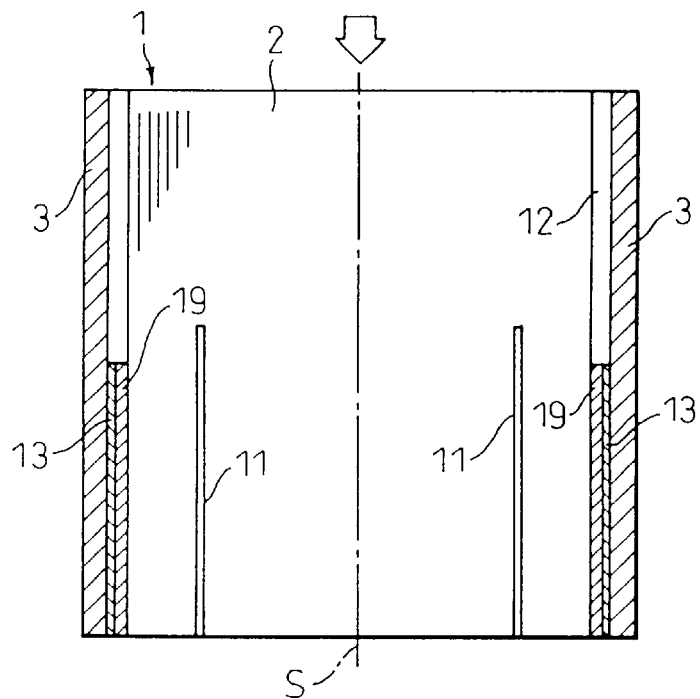
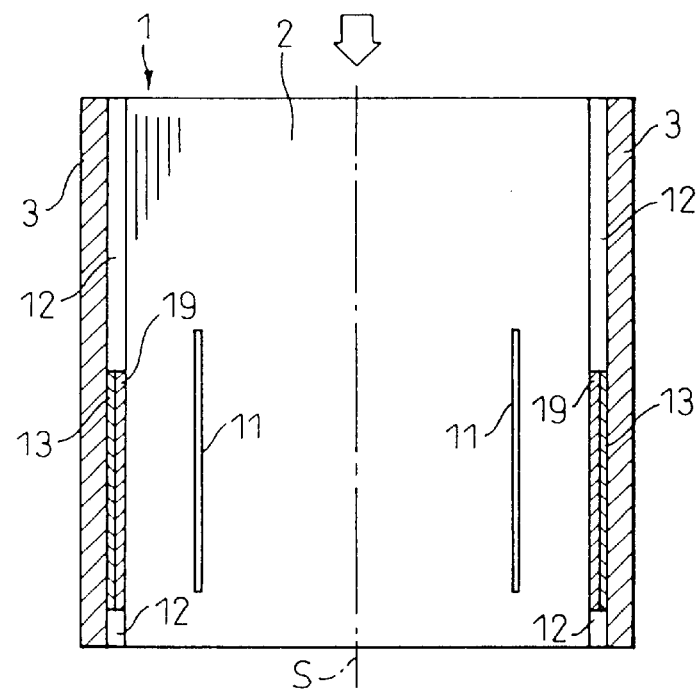

METAL HONEYCOMB BODY FOR EXHAUST GAS PURIFICATION CATALYST AND METHOD FOR PRODUCING THE SAME

TECHNICAL FIELD

This invention relates to a metal honeycomb body for supporting a catalyst for purifying an exhaust gas emitted from an internal combustion engine such as an automobile engine, and a method for producing the same.

BACKGROUND ART

A metal support having excellent initial purification performance of an exhaust gas and a small exhaust resistance has been used recently, in many cases, for a catalyst device of an automobile. The metal support of this kind uses a cylindrical honeycomb body produced by superposing a metal flat foil with a metal corrugated foil, that is obtained by subjecting the metal flat foil to plastic processing into a corrugation form, with one another, and winding them into a spiral shape, or a honeycomb body produced by superposing alternately plane-wise the flat foil and the corrugated foil. The metal honeycomb body is then assembled into a casing such as a metal outer cylinder and the two parts are mutually bonded. After a catalyst is fitted to and supported by the metal honeycomb body, the resulting catalyst device is used as an exhaust gas purification apparatus for the automobile.

As shown in FIG. 1, for example, a conventional metal support 1 is produced by assembling a metal honeycomb body 2 formed of heat-resistant stainless steel foils into an outer cylinder 3 made of a metal. The metal honeycomb body 2 is produced mainly by superposing an about 50 $\mu$m-thick belt-like flat foil 5 with a belt-like corrugated foil 6, that is obtained by subjecting the flat foil 5 to corrugation shaping, and winding these foils into a spiral shape round a take-up axis S indicated by arrow B in a direction as shown in FIG. 2. A ridgeline 7 of each corrugation is formed on the belt-like corrugated foil 6 in a width-wise direction. The circular cylindrical metal honeycomb body 2 wound into the spiral shape has a large number of vent holes 4 in the axial direction of the circular cylinder. The catalyst is supported by these vent holes, forming a catalyst converter.

The catalyst support must have excellent durability in order to withstand severe heat cycles, due to a high temperature exhaust gas from an engine, and also to withstand vigorous vibration from the engine. Therefore, in the metal support 1 according to the prior art, the contact portions between the flat foil 5 and the corrugated foil 6 of the honeycomb body 2 are bonded, and the outer periphery of the metal honeycomb body 2 and the inner periphery of the outer cylinder 3 are bonded, too.

Generally, the metal foil that constitutes the metal honeycomb body mostly uses a high heat-resistant stainless steel formed of Cr—Al—Fe. For, aluminum (Al) in the foil is selectively oxidized on the surface to form $Al_2O_3$, improving thereby the oxidation resistance. Therefore, the Al amount in the metal foil exerts significant influences on durability of the metal support.

Bonding inside the metal honeycomb body is executed by fixing a Ni type powdery brazing material to the contact portions between the flat metal foil and the corrugated metal foil through an organic material such as a binder, and conducting a brazing treatment inside a vacuum furnace. In this case, Al in the metal foils tends to combine extremely strongly and firmly with Ni in the brazing material, and Al segregates near the brazing portion. On the other hand, Al in the proximity of the segregation portion becomes lean. In consequence, the oxidation resistance is deteriorated locally and invites a problem in durability. Furthermore, the brazing material is extremely expensive from the aspect of the production cost, and impedes the supply of economical metal supports to users.

Therefore, several methods of producing the metal support without using the brazing material have been proposed. For example, Japanese Unexamined Patent Publication (Kokai) No.1-266978 discloses a method of producing a metal honeycomb body by bonding a metal flat foil and a metal corrugated foil by a solid phase diffusion bonding method at a treating temperature of 1,200° C. (850 to 1,200° C. in claims) and a vacuum of $10^{-6}$ Torr ($10^{-2}$ to $10^{-6}$ Torr in claims). However, this method has failed to secure durability that is required for an exhaust gas. Since this reference does not describe the treating time and the Al amount after the treatment, the relationship of these factors to an exhaust gas purification performance is not clear, either. On the other hand, Japanese Unexamined Patent Publication (Kokai) No. 5-168947 proposes a method that conducts the treatment at a high temperature (1,400° C.). However, since this method uses a jig for preventing Al evaporation, the method is not completely free from problems from the aspects of productivity and production cost.

Generally when diffusion bonding is executed, materials to be bonded are brought into close contact with each other, and a surface pressure is always applied to them during heating, too, by using a press device or a weight. However, it is not possible to apply, from the outside, such a surface pressure to the metal honeycomb body 2 wound spirally as described above. Therefore, the surface pressure is applied during winding by applying a back-tension to the flat foil 5 in a direction of arrow A as shown in FIG. 2, or by inserting the honeycomb body 2 into the outer cylinder 3 and then reducing the diameter of the outer cylinder 3.

However, back-tension during the-winding operation cannot apply a sufficient surface pressure to the outer peripheral portion of the metal honeycomb body 2, and contraction of the diameter of the outer cylinder 3 cannot provide a sufficient surface pressure, either. Even when they are used in combination, the surface pressure cannot be applied sufficiently to the intermediate portion between the center of the honeycomb body 2 and its outer peripheral portion. If the back-tension is raised in order to impart the surface pressure. necessary for the intermediate portion, the vent holes 4 at the center undergo buckling. If the contraction ratio is raised, on the other hand, the vent holes at the outer peripheral portion undergo buckling.

To solve this problem, the inventors of the present invention have found that diffusion bonding can be achieved satisfactorily from the center to the outer peripheral portion by reducing the surface coarseness of the flat foil 5 and the corrugated foil 6, and applying the back-tension and conducting contraction of the outer cylinder diameter to such a range in which the intermediate portion of the metal honeycomb body 2 does not undergo buckling. Consequently, the present invention sets the surface coarseness of the flat foil 5 and the corrugated foil 6 to 0.001 $\mu$m to 0.2 $\mu$m in terms of the mean coarseness (Ra). The present inventors have described this proposal in Japanese Unexamined Patent Publication (Kokai) No. 8-38912.

This prior art reference limits the surface coarseness of the flat foil 5 and the corrugated foil 6 to 0.001 to 0.2 $\mu$m in terms of mean coarseness Ra, but does not mention the measuring direction of the surface coarseness. The reference also limits the contact width of the flat foil 5 and the corrugated foil 6 to at least 30 μm in the length-wise direction. According to an Example of this reference, when the contact width of the flat foil and the corrugated foil is 20 μm, contact defects occur even when Ra is 0.1 μm.

According to observations by the present inventors, durability of the diffusion bond portion is not sufficient if the surface coarseness measured in the crossing direction (D direction) is great even though the surface coarseness measured in the longitudinal direction of the belt-like flat foil 5 and the corrugated foil 6 is within the range described above.

Japanese Unexamined Patent Publication (Kokai) No. 5-131144 proposes the construction in which each of the peak and the valley of each corrugation of the corrugated foil 6 defines a parallel portion having a width greater than the foil thickness, and after this corrugated foil 6 is superposed with the flat foil 5, both foils are wound spirally so as to bring them into planar contact, and thereafter the foils are diffusion-bonded to improve the bonding strength.

The technology of Japanese Unexamined Patent Publication (Kokai) No, 8-38912 described above reduces the surface coarseness of the flat foil 5 and the corrugated foil 6 and limits the contact width to at least 30 μm. However, concrete examples of the contact width are 30 μm and 200 μm that are disclosed in Examples. Incidentally, this reference does not mention the measuring direction of the surface coarseness. According to the observation of the present inventors, even when the surface coarseness of the belt-like flat foil 5 and the corrugated foil 6 falls within the range described above, durability of diffusion bonding is not sufficient even at a contact width of 200 μm, if the surface coarseness measured in the crossing direction (D direction) is great.

In the technology proposed in Japanese Unexamined Patent Publication (Kokai) No. 5-131144 mentioned above, the parallel portion is formed on each corrugation of the corrugated wave in order to bring the flat foil 5 and the corrugated foil 6 into surface contact. However, the reference stipulates only that the width of the parallel portion be at least the foil thickness, but does not describe the concrete size.

Furthermore, as to heating at the time of diffusion bonding, high temperature heating at 1,250° C. or above has been employed in the past, but diffusion bonding at a lower temperature has also been desired.

Generally, when the catalyst support is used while being mounted and fixed to the exhaust gas system of the automobile engine, for example, the catalyst support receives vibration during the engine operation and is heated by the exhaust gas and by the catalytic reaction. It is rapidly heated at the start of the engine and at the time of acceleration, and is rapidly cooled at the time of braking and stopping. In this way, the heat cycle of rapid heating—rapid cooling is repeated during driving, and the metal support expands and shrinks with such a heat cycle.

When the metal support is rapidly heated, the center portion of the metal honeycomb body, at which the flow velocity of the exhaust gas is the highest, is heated most rapidly. Therefore, the temperature difference is created with the outer cylinder exposed to the atmosphere and the outer peripheral portion of the metal honeycomb body keeping touch with the outer cylinder. Owing to this temperature difference, the stress resulting from the difference of heat expansion concentrates on the bond portion near the outer peripheral portion of the metal honeycomb body or on the bond portion between the metal honeycomb body and the outer cylinder, inviting breakage, buckling or peeling. When the metal support is rapidly cooled, a temperature difference occurs between the center portion of the metal honeycomb body, the temperature of which drops with the drop in temperature of the exhaust gas, and the outer peripheral portion of the metal honeycomb body, the temperature drop of which is retarded. The stress resulting from this difference of heat expansion concentrates at the portions near the outer peripheral portion of the metal honeycomb body and invites similarly breakage, buckling and peeling.

To cope with the problems described above, a method has been proposed which bonds only a part of the contact portions between the flat foil and the corrugated foil of the metal honeycomb body, or bonds them while leaving a part of the contact portion unbonded, in order to mitigate the stress concentration resulting from the difference of heat expansion and to improve durability. Japanese Unexamined Patent Publication (Kokai) No. 5-131144, for example, applies a bonding-preventing agent to a predetermined portion of the corrugated foil having parallel portions of a predetermined width greater than the foil thickness at the peak and valley of each corrugation, and winds the corrugated foil in superposition with the flat foil so that only desired portions of both foils can be diffusion-bonded strongly and firmly. Japanese Unexamined Patent Publication (Kokai) No. 7-328778 applies a diffusion-preventing agent to predetermined portions of the flat foil, and winds the flat foil in superposition with the corrugated foil so that only predetermined portions of both foils can be diffusion-bonded.

As another counter-measure, Japanese Unexamined Patent Publication (Kokai) No. 8-229411 describes a method of mitigating the stress concentration by partially bonding the metal honeycomb body and the outer cylinder. The bond portions between the metal honeycomb body and the outer cylinder are limited to the portions that have high diffusion-bonding strength in the axial direction of the metal honeycomb body, and the rest portions are left as the unbonded portion in order to prevent the occurrence, and growth, of cracks in the axial direction of the metal honeycomb body. A plurality, and a suitable number, of unbonded portions are disposed in the spaced-apart relation from the outermost periphery to the metal honeycomb body opposing the registration portions in order to prevent the growth of the cracks in the diametric direction of the metal honeycomb body.

Japanese Unexamined Patent Publication (Kokai) No. 5-131144 described above discloses concretely the metal supports having two kinds of structures. In the first structure, the several turns of the outer peripheral portion of the metal honeycomb body and the portion on the upper end face are diffusion-bonded with the center portion on the lower end face side being left unbonded. In the second structure, the several turns of the outer peripheral portion of the metal honeycomb body and the portions on both upper and lower end face sides are diffusion-bonded with the remaining center portion being left unbonded.

The inventors of the present invention have conducted cooling-heating durability tests by ordinary rapid heating—rapid cooling cycles by actually mounting the metal supports having two kinds of structures described in Japanese Unexamined Patent Publication (Kokai) No. 5-131144 described above to the exhaust system of the gasoline engine. As a result, the present inventors have confirmed that the metal supports have excellent durability, but they are not entirely satisfactory in cooling-heating durability tests under a severe condition of between a high temperature of 950° C. or above and 150° C., for example.

The metal support described concretely in Japanese Unexamined Patent Publication (Kokai) No. 8-229411 does not have satisfactory durability, either, in the cooling-heating durability test under such a severe condition.

The technology described in Japanese Unexamined Patent Publication (Kokai) No. 7-328778 indicates that bonding at the unbonded portions can be prevented more reliably by applying the diffusion-preventing agent to the flat foil than to the corrugated foil. However, this reference does not describe concretely at which portions the unbonded portions are to be formed.

As another counter-measure for preventing breaking, buckling and peeling of the metal support due to expansion and shrinkage inside the honeycomb body resulting from the heat cycle of rapid heating—rapid cooling described above, Japanese Unexamined Utility Model Publication (Kokai) No.3-61113 proposes a method which elongates the flat foil constituting the metal honeycomb body, winds it round the honeycomb body in such a manner as to form a multi-layered structure of the flat foil, and fuses the distal end portion of this flat foil to the outer cylinder. In this way, the device of this reference absorbs the expansion and shrinkage resulting from the heat cycle by the multi-layered structure of the flat foil, increases the bonding strength with the outer cylinder, and prevents the occurrence of clearance and cracks on or in the proximity of the outermost peripheral portion of the metal honeycomb body.

Another reference, i.e. Japanese Unexamined Utility Model Publication (Kokai) No. 5-9638, proposes a technology for improving outer shape accuracy of a metal support formed by laminating alternately flat sheets and corrugated sheets to form a layered member, and bending the layered member into an S shape, by elongating at least one of the corrugated sheet and the flat sheet constituting the layered member to a length greater than the length of the other of the corrugated sheet or flat sheet, and winding this extra-length portion round the outermost periphery.

A catalyst converter exhibits its function in the reaction for rendering detrimental gases in the exhaust gas nontoxic only when the temperature exceeds the activation temperature of the catalyst. Therefore, heating of the catalyst converter is preferably made as rapidly as possible. It is advantageous for accomplishing this object to introduce the high temperature exhaust gas by fitting the catalyst converter near the engine, and to heat it rapidly to a high temperature. However, the problem of the difference of heat expansion becomes more remarkable under this high temperature rapid heating.

According to the technologies described in Japanese Unexamined Utility Model Publication (Kokai) Nos. 3-61113 and 5-9638, the layers of the flat foil or the layers of the corrugated foil are not mutually bonded in the layered structure of the flat foil and the corrugated foil wound on the metal honeycomb body. Therefore, durability is not always satisfactory under the severe condition where the catalyst converter is fitted near the engine and is heated more rapidly to a higher temperature.

SUMMARY OF THE INVENTION

It is therefore an object of the present invention to provide a metal honeycomb body that is more advantageous than the prior art devices in all aspects of exhaust gas purification performance, engine durability and the production cost, by stipulating first the foil thickness, stipulating next the heat-treatment condition of solid phase diffusion bonding, and insuring sufficient mutual bonding of stainless steel foils, particularly, Al-containing high heat-resistant ferrite type stainless steel foils.

It is another object of the present invention to improve the surface condition of the metal foils in order to advantageously execute solid phase diffusion bonding of the metal foils of a metal honeycomb body.

It is another object of the present invention to improve the shape of the contact portions between the metal foils in order to reliably execute solid phase diffusion bonding between the metal foils of the honeycomb body.

It is still another object of the present invention to provide a metal support that enables the metal honeycomb body to withstand the severe condition of rapid heating—rapid cooling heat cycles by the exhaust gas.

Hereinafter, means for accomplishing the objects described above will be explained.

The first feature of the present invention resides in a honeycomb body comprising a flat foil and a corrugated foil each formed of an Al-containing ferrite type stainless steel, wherein the thickness of at least one of the flat foil and the corrugated foil is limited to less than 40 $\mu$m, preferably 10 to 35 $\mu$m, and at least the portions of the foils that are subjected to mutual solid phase diffusion bonding contain at least 3.0 wt % of Al; and resides also in a method of producing a honeycomb body by heat-treating such a honeycomb body at a treatment temperature of 1,100 to 1,250° C. for a treatment time of 30 to 90 minutes and to a vacuum of $3 \times 10^{-4}$ to $5 \times 10^{-5}$ Torr upon arrival at the treatment temperature, subjecting the contact portions between the flat foil and the corrugated foil of the honeycomb body to solid phase diffusion bonding, and producing the honeycomb body.

In other words, the foil thickness of the metal honeycomb body is limited to the foil thickness described above and the metal honeycomb body is heat-treated under the heat-treatment condition described above. In consequence, microscopic deformation occurs on the foil surface to such an extent as to fill unevenness on the surface of the foils, and macroscopic deformation is generated by deforming the top portions of the corrugated foil along the flat foil so as to drastically increase the contact area and to drastically improve solid diffusion bondability.

If the metal honeycomb body contains 3 to 10% of Al even after the heat-treatment described above, the amount of Al consumed during driving of the car (during the engine durability test), that is, about 3.0%, can be contained at the foil thickness of 10 $\mu$m even when the heat-treatment described above is applied to the metal honeycomb body. In consequence, durability can be improved.

In the metal honeycomb body, the second feature of the present invention resides in a metal honeycomb body, wherein the surface coarseness or roughness of the flat foil and the corrugated foil formed of the Al-containing ferrite type stainless steel is 0.001 to 0.3 $\mu$m in terms of the mean coarseness or roughness Rac in the direction of vent holes of the honeycomb body (in the width-wise direction of the foils), and/or the surface shape and condition or surface texture of the foils is at least 100 in terms of the number of peaks PPI per inch length in the direction of the vent holes, and the contact portions between the foils are bonded by diffusion bonding. Such diffusion bonding is preferably carried out at 1,100 to 1,250° C. As used in the specification, the term surface coarseness is synonymous with the term surface roughness. As used in the specification, the term surface shape and condition is synonymous with the term surface texture.

Such a surface condition of the foils can improve the diffusion bonding ratio of the bond portions, and can suppress the evaporation of the heat-resistant alloy elements of both foils because the diffusion bonding temperature is as low as 1,250° C. or below. The foil thickness is not limited, in particular. Particularly when the foil thickness is less than 40 μm, however, the heat-treatment time can be shortened and the heat-treatment temperature can be lowered. Also, because the time for reaching the catalyst activation temperature (300 to 350° C.) can be shortened, initial purification performance can be improved.

The honeycomb body described above is produced by the steps of corrugation-machining a belt-like flat foil having a surface coarseness of 0.001 to 0.3 μm in terms of the mean coarseness in the width-wise direction and/or having a number of peaks PPI of at least 100 per inch length in the width-wise direction, so that the ridgeline of each corrugation extends in the width-wise direction, superposing the corrugated foil with the flat foil, winding them spirally into a honeycomb body, and heat-treating the honeycomb body at a temperature within the range of 1,100 to 1,250° C. so as to bond the contact portions between these foils by diffusion bonding.

In the honeycomb body, the third feature of the present invention resides in the honeycomb body wherein the width of the contact portions between a belt-like flat foil and a corrugated foil, each formed of an Al-containing ferrite type stainless steel, in the longitudinal direction, is at least five times the thickness of each of the flat foil and the corrugated foil, and these foils are bonded by diffusion bonding. Preferably, back-tension of 0.2 to 1.5 kgf/cm per unit width of the flat foil, which is lower than in ordinary cases, is applied to the flat foil.

In the metal honeycomb body having such a construction, the contact width between the flat foil and the corrugated foil exceeds a specific width. Therefore, the metal vapor of Al, etc, fills the clearance of the contact portions between both foils, inhibits invasion of oxygen, and suppresses oxidation of $Al_2O_3$, etc, in the contact boundary. Consequently, the contact portions can be diffusion-bonded without particularly elevating the surface pressure.

The foil thickness in this case is not limited, in particular, in the same way as in the case of the "second feature".

The metal honeycomb body described above is produced by the steps of forming a parallel portion having a width at least five times the foil thickness at each of the top and valley of each corrugation of the belt-like corrugated foil, superposing the corrugated foil with the belt-like flat foil, and winding them spirally into the honeycomb body while applying back-tension of 0.2 to 1.5 kgf/cm per unit width of the flat foil, to the flat foil. This honeycomb body is heat-treated at a vacuum heat-treatment temperature of 1,100 to 1,250° C. and preferably at a temperature T satisfying the following relation, in accordance with the mean coarseness Rac (μm) of the flat foil in the width-wise direction:

$$10^4/(T+273) \leq -0.43 \log Rac + 6.43$$

Therefore, the diffusion bonding effect can be further obtained by using the foils having the surface coarseness described in the "second feature" described above.

In the metal honeycomb body comprising foils formed of an Al-containing ferrite type stainless steel, the fourth feature of the present invention resides in the construction wherein a unbonded portion, at which the contact portion of the flat foil and the corrugated foil is not bonded, is formed at one or more positions that are spaced apart by at least ½ of the radius from the center axis of the metal honeycomb body and inside the outer periphery, in such a fashion as to extend from one of the ends on a gas exit side, as a start point, to a position falling within the range of length of 9/20 to 9/10 of the full length of the metal honeycomb body in the direction of the center axis, as an end point, to cover at least one turn round the full periphery, and the rest of contact portions between the flat foil and the corrugated foil are bonded by solid phase diffusion bonding.

Preferably, the bonded portion having a length not greater than ½ of the full length in the longitudinal direction of the metal honeycomb body is formed in the boundary between the metal honeycomb body and the outer cylinder with a position, that is spaced apart by at least ⅓ of the full length of the metal honeycomb body in the axial direction from one of the ends on a gas entry side being as the start point towards the other end on a gas exit side being an end point, and the rest of the portions of the boundary are unbonded portions.

When the unbonded portion is formed inside the metal honeycomb body under such a condition, the metal foil portions existing on the side of the center axis from the unbonded portion undergo shrinkage towards the gas exit side in accordance with the rapid heating—rapid cooling cycle by the exhaust gas, mitigating the stress concentration. Consequently, the metal honeycomb body has excellent durability to such a heat cycle. The foil thickness in this case is not particularly limited in the same way as in the "second feature".

To produce the metal honeycomb body, the diffusion-preventing agent is applied to the unbonded portion, and after the belt-like metal foils are wound, the diffusion bonding treatment is carried out. In this case, after the belt-like metal foils are wound to form the metal honeycomb body, the honeycomb body is inserted into the outer cylinder. Then, after the brazing material is bonded to the bonding portion and the diffusion-preventing agent is applied to other positions, the diffusion bonding treatment can be carried out.

Therefore, the excellent metal support can be obtained by forming the unbonded portion in the metal honeycomb body described in each of the "first to third features" described above.

The fifth feature of the present invention is that a shell is formed by winding at least two turns a flat foil or a corrugated foil round the outer periphery of a metal honeycomb body comprising these flat and corrugated foils each being formed of an Al-containing ferrite type stainless steel, and the flat foils or the corrugated foils forming the shell are bonded to one another.

The metal honeycomb body formed in this way is inserted into the outer cylinder, and the foils are bonded mutually and the outer peripheral surface of the foils and the inner peripheral surface of the outer cylinder are bonded. In this way, the metal support is produced, and a catalyst is supported to form a catalyst converter. When this catalyst converter is used, a temperature difference occurs between the metal honeycomb body and the outer cylinder depending on the rapid heating and cooling cycles, and the stress resulting from the temperature difference concentrates on or near their boundary. However, the firm and integral shell can prevent breaking of the metal honeycomb body. Therefore, this metal support can improve durability against deviation in its axial direction.

The stress concentration occurring in the metal honeycomb body can be drastically mitigated by firmly protecting the periphery of the metal honeycomb body having therein the unbonded portions described in the "fourth feature", by the shell described above and consequently, higher durability can be obtained against the deviation in the axial direction of the honeycomb body. The foil thickness in this case is not particularly limited in the same way as in the case of the "second feature".

The metal support described above is produced by the steps of winding further at least one turn a belt member of the flat foil or the corrugated foil, that forms the metal honeycomb body, round the outer periphery of the metal honeycomb body described above, assembling the resulting metal honeycomb body into the outer cylinder, conducting the bonding treatment, diffusion-bonding the metal foils constituting the metal honeycomb to one another and the metal foils constituting the shell to one another, and brazing the outer periphery of the shell and the outer cylinder by the brazing material.

Diffusion bonding described above is executed by vacuum heating treatment at a temperature within the range of 1,100 to 1,250° C. However, the vacuum heat-treatment is preferably carried out at a temperature (T°C.) within the range given below in accordance with the foil thickness (t $\mu$m) of the metal honeycomb body. The foil thickness of the metal honeycomb body is preferably less than 40 $\mu$m. When the shell is formed by separately winding the foil belt, a foil having a thickness of 50 to 100 $\mu$m may be used:

$$1,100 \leq T \leq 1.7t+1,165$$

BRIEF DESCRIPTION OF THE DRAWINGS

FIG. 5 is a graph showing a vacuum treatment condition (degree of vacuum: $1\times10^{-4}$ Torr) when at least 4% of Al remains in metal foils having a foil thickness of less than 35 $\mu$m.

FIG. 6 is a graph showing a heat treatment condition where solid diffusion bonding takes place between flat foils and corrugated foils of 50 $\mu$m thickness.

FIG. 7 is a graph showing a heat treatment condition where solid diffusion bonding takes place between flat foils and corrugated foils of less than 40 $\mu$m thickness.

FIG. 8 is a graph showing a heat treatment condition where solid diffusion bonding take place between flat foils and corrugated foils of not greater than 35 $\mu$m thickness.

FIG. 9 is a graph showing a heat treatment condition where solid diffusion bonding takes place between flat foils and corrugated foils and at least 4% of Al remains in both foils in the case of foils of less than 40 $\mu$m thickness.

FIG. 10 is a graph showing a heat treatment condition where solid diffusion bonding takes place between flat foils and corrugated foils and at least 4% of Al remains in both foils in the case of foils of less than 35 $\mu$m thickness.

FIGS. 11(a) to 11(c) are enlarged explanatory views showing various examples of the bonding state of the flat foil and the corrugated foil constituting a honeycomb body, wherein FIG. 11(a) and FIG. 11(b) illustrate emphatically the difference in foil thickness.

FIG. 12(a) shows a surface coarseness before a vacuum heat-treatment and FIG. 12(b) shows the surface coarseness after the vacuum heat-treatment.

FIGS. 15(a) and 15(b) are conceptual views each showing a bond portion between a flat foil and a corrugated foil in the present invention, wherein FIG. 15(a) shows the state before bonding and FIG. 15(b) does the state after bonding.

FIG. 23 is a graph showing the relation between a mean coarseness representing a preferred condition of diffusion bonding and a vacuum heat-treatment temperature in the present invention.

FIG. 36 is a sectional view showing still another example of the metal support in the present invention.

FIG. 37 is a sectional view showing another still example of the metal support in the present invention.

FIGS. 43(a) and 43(b) are schematic views showing the extrusion shape of the honeycomb body of the metal support obtained by the push test shown in FIG. 42, wherein FIG. 42(a) shows the case where fall-off does not occur and FIG. 42(b) shows the case where fall-off occurs.

BEST MODE FOR CARRYING OUT THE INVENTION

Figure 1:
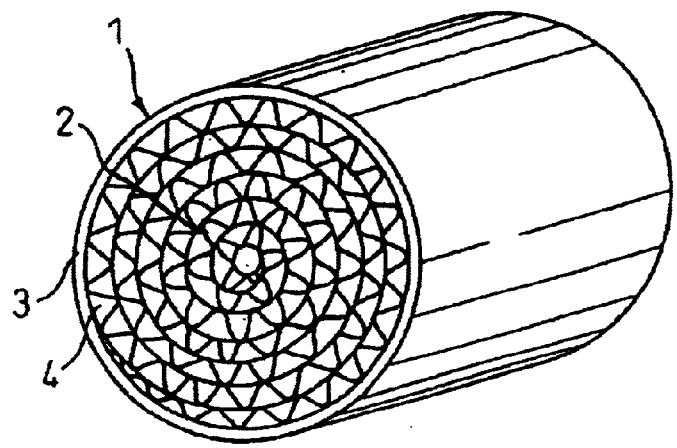
FIG. 1 is a perspective view showing a metal support according to the prior art as a whole.

Diffusion bonding used in the present invention attains bonding as atoms diffuse, in a direction in which surface energy is decreased, mainly on a contact surface between two surfaces. Factors of this bonding condition include surface treatment, coarseness of metal surfaces, treatment temperature, treatment time, and pressure of bonding surfaces. In addition, mechanical and metallurgical factors of the materials are also very important. Because the prior art inventions mainly lay stress on the treatment temperature and the temperature time, they are not free from metal evaporation of Al.

In contrast, the first invention of this application (hereinafter called the "present invention") pays specific attention to the mechanical factors of the materials. The thicknesses of the metal foils of the metal honeycomb body that constitutes the metal support are generally from 40 to 100 $\mu$m. It has been customary to apply a tension to the metal flat foil when the flat foil and the corrugated foil are superposed with each other and are wound. Therefore, when the metal foils having such a foil thickness are wound and diffusion-bonded, fitting becomes low at the contact portions between the corrugated foil and the flat foil due to rigidity resulting from the foil thickness. In consequence, creep of the metal foils and mutual diffusion of the atoms do not occur readily during the diffusion bonding treatment, and the satisfactory solid phase diffusion phenomenon does not occur easily, either.

The present invention produces the honeycomb body by the solid phase diffusion bonding method using a metal foil having a foil thickness of less than 40 $\mu$m for at least one of the metal flat foil and the metal corrugated foil. When a metal foil having a foil thickness of less than 40 $\mu$m is wound under a certain predetermined tension, the top portion of the corrugated foil is crushed by the flat foil and undergoes deformation. Because the flat foil also undergoes deformation along the corrugated foil, the area at the contact portion between the flat foil and the corrugated foil becomes macroscopically greater, so that the mutual diffusion phenomenon is promoted.

When a metal foil having a foil thickness of not greater than 35 $\mu$m is held at a temperature of 1,100° C. or more, the volume of the base metal decreases. Consequently, the quantity of surface energy brought forth by the surface coarseness at the contact portion of both foils becomes relatively greater. This surface energy serves in turn as the driving force that creates diffusion of the atoms and causes microscopic deformation to such an extent as to fill the unevenness on the surfaces with the result of a drastic increase of the contact area.

It has been recognized that macroscopic deformation and microscopic deformation described above drastically improve solid phase diffusion bondability in the metal foils having a foil thickness of not greater than 40 $\mu$m.

As the foil thickness exceeds 35 $\mu$m and approaches 40 $\mu$m, microscopic deformation of such an extent as to fill the surface unevenness decreases and the treatment time becomes longer. When the foil thicknesses of both the flat foil and the corrugated foil drop below 35 $\mu$m, microscopic deformation increases, and fitting of the contact portion can be drastically improved with a shortening of the treatment time. When the foil thickness is less than 10 $\mu$m, rigidity of the foils during winding cannot be maintained. Because the production of the foils themselves becomes difficult in this case, the practical lower limit of the foil thickness is 10 $\mu$m. For these reasons, the thickness of both the flat foil and the corrugated foil in the present invention is most preferably within the range of 10 to 35 $\mu$m.

Another feature of the present invention is that at least 3.0% of Al remains in the metal foils of the metal honeycomb body. The inventors of the present invention have carried out experiments by mounting a metal support produced from 5%Al—20%Cr—Fe high heat-resistant ferrite type stainless steel foils (with a foil thickness of 10 $\mu$m) to an actual car and conducting approximately 100,000 km of driving tests. The experimental result has revealed that the Al content is 4.85% before the start of the test but falls to 0.96% after completion of the test. In other words, about 4.0% of Al is consumed during the durability test. The absolute amount of Al in the metal foils changes with the thickness of the foils, but the Al amount consumed during the engine durability test is the same. Therefore, the smaller the foil thickness, the durability becomes lower and the service life becomes shorter. Furthermore, the mounting position of the support is likely to be as close as possible to the engine, in order to improve purification performance at the start of the engine. This means that the environment of use of the support has become more severe. Durability against oxidation is affected by the thickness of the metal foils, but the Al consumption amount of the foils having a foil thickness of 10 $\mu$m, that is practically the smallest thickness, is adopted as the reference. For these reason, the present invention stipulates the condition that at least 3% of Al remains in the metal foils of the support.

The present invention also limits the vacuum treatment condition to a treatment time of 1,100 to 1,250° C., a treatment time of 30 to 90 minutes and a degree of vacuum of $3 \times 10^{-4}$ to $5 \times 10^{-5}$ Torr at the time of arrival at the treatment temperature. The lower limit values are the conditions for executing solid phase diffusion bonding, and the upper limit values are the condition for allowing at least 3% of Al to remain.

Hereinafter, the present invention will be explained further concretely.

Figure 2:
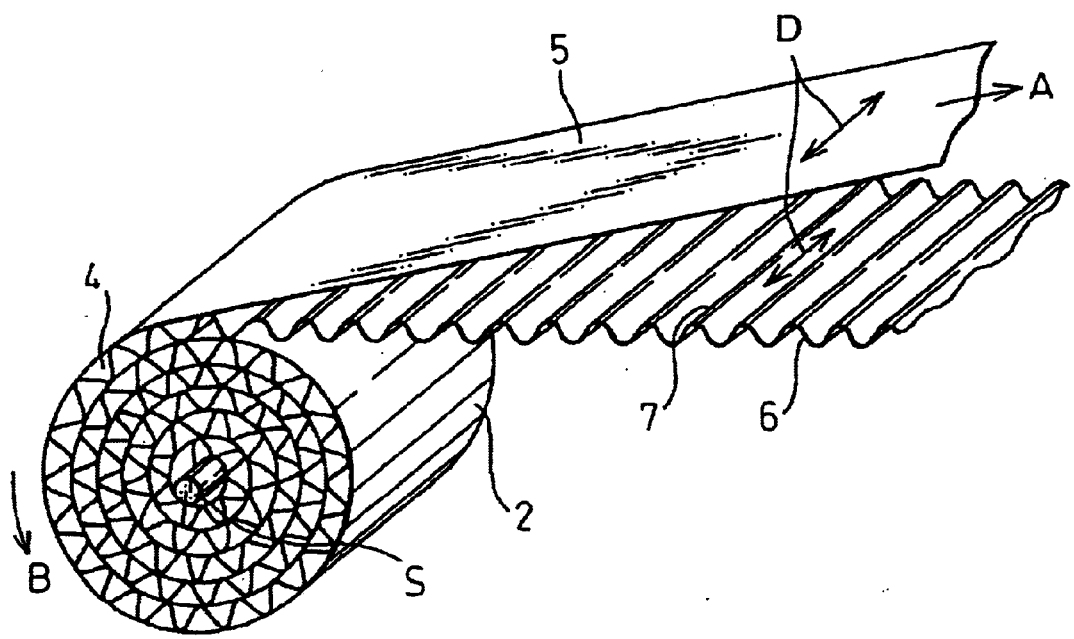
FIG. 2 is a perspective view showing a production example of a metal honeycomb body that constitutes the metal support shown in FIG. 1.

In a metal support 1 according to the present invention, a metal honeycomb body 2 is assembled into an outer cylinder 3 made of a metal, as shown in FIG. 1. The metal honeycomb body 2 is formed by superposing a belt-like flat foil 5 made of a heat-resistant stainless steel with a belt-like corrugated foil 6 obtained by subjecting the flat foil 5 to corrugation working, with one another, and winding them spirally, as shown in FIG. 2. A ridgeline 7 is formed on each corrugation of the belt-like corrugated foil 6 in a width-wise direction. The circular cylindrical metal honeycomb body 2 wound spirally has therefore a large number of vent holes 4 in the axial direction of the circular cylinder.

A ferrite type stainless steel containing 3 to 10% of Al and 15 to 25% of Cr as heat-resistant alloying elements, such as 20%Cr—5%Al—Fe steel, is used as the material of the metal honeycomb body 2. Because the requirement for the heat-resistance of the outer cylinder 3 is not so high as for the metal honeycomb body 2, a stainless steel not containing the heat-resistant alloying elements such as Al may be used for the outer cylinder 3.

When the metal flat foil and the metal corrugated foil together constituting the metal honeycomb body are solid phase diffusion-bonded, it is necessary to employ a vacuum treatment condition under which Al in the metal foils does not remarkably decrease. In the case of the metal support produced from the foils (about 50 μm thick) formed of the 20%Cr—5%Al—Fe high heat-resistant ferrite type stainless steel, a vacuum treatment condition of a relatively high temperature, relatively long time and a low vacuum has been necessary in the past when the flat foil and the corrugated foil are bonded by solid phase diffusion bonding. More typically, the vacuum treatment has been conducted at 1,300° C. and a vacuum of $1 \times 10^{-6}$ Torr for 90 minutes. Under such a vacuum treatment condition, however, Al in the metal foils remarkably decreases (due to metal evaporation) and this decrease is not desirable for the durability of the metal support.

Figure 3:
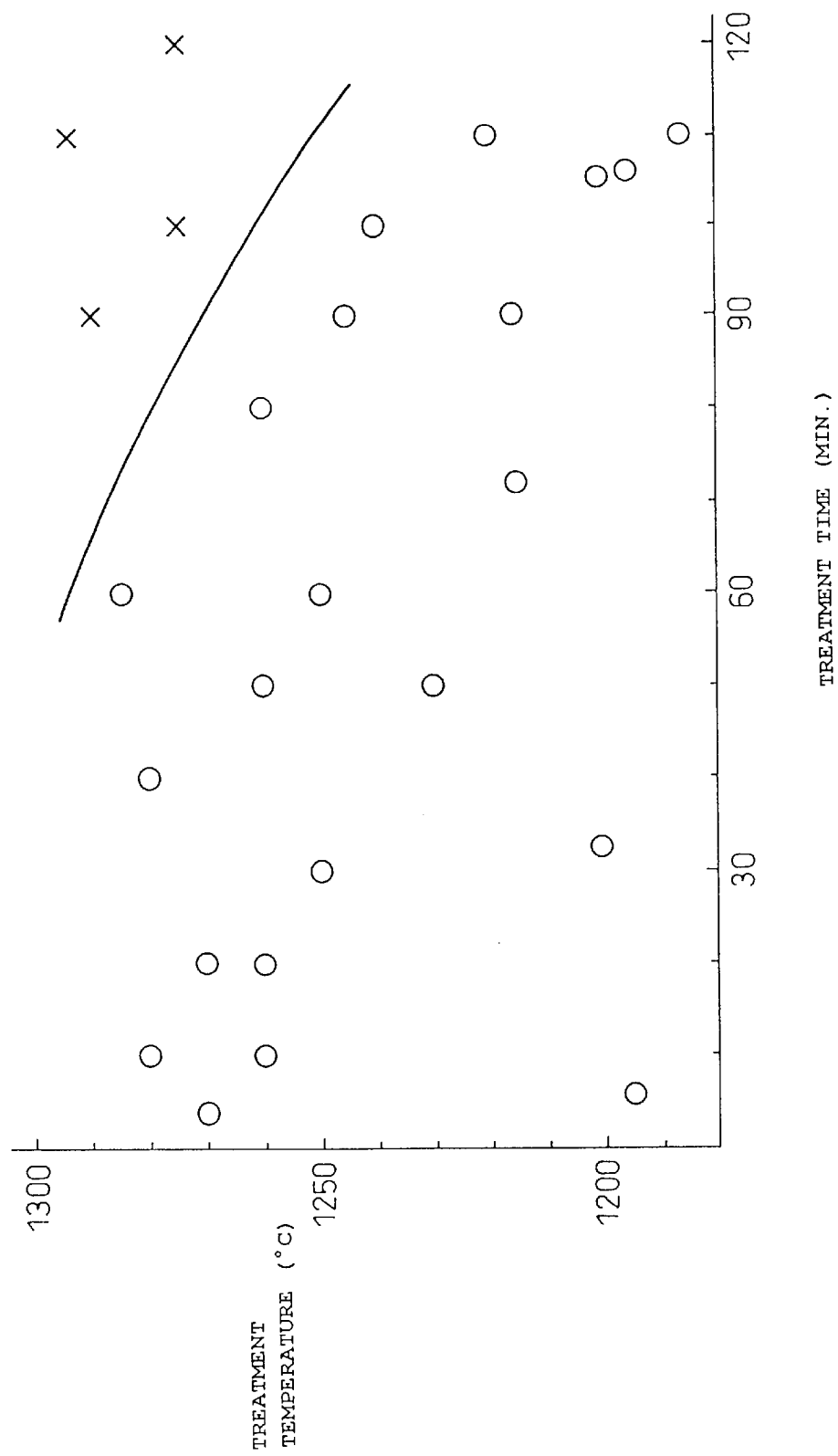
FIG. 3 is a graph showing a vacuum treatment condition (degree of vacuum: $1\times10^{-4}$ Torr) when at least 4% of Al remains inside metal foils having a foil thickness of 5 0 $\mu$m.
Figure 4:
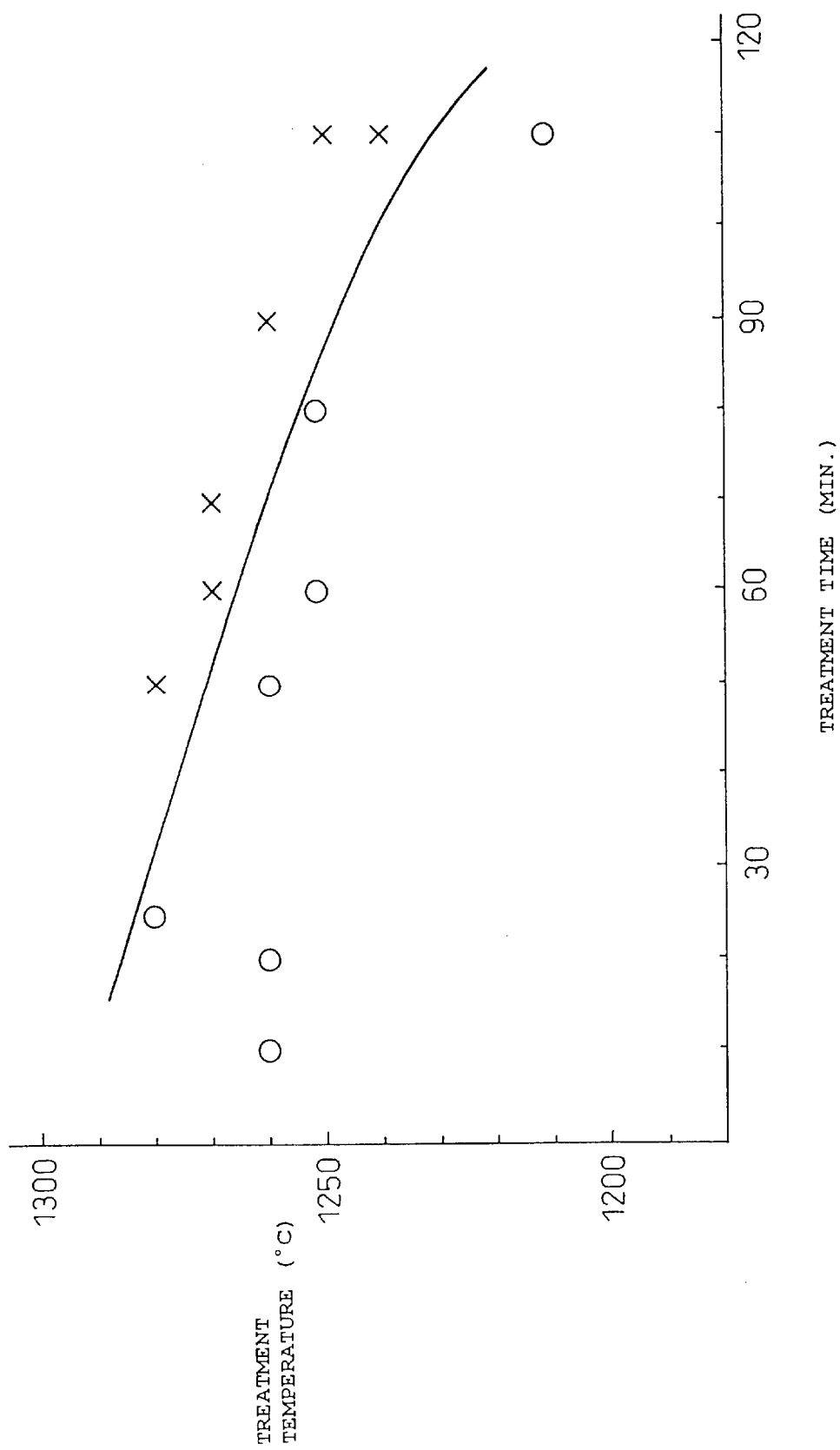
FIG. 4 is a graph showing a vacuum treatment condition (degree of vacuum: $1\times10^{-4}$ Torr) when at least 4% of Al remains inside metal foils having a foil thickness of less than 40 $\mu$m.

Therefore, the present inventors have examined for the condition under which at least 3% of Al remains. The result will be given next. FIG. 3 shows the result in the case of a 50 μm foil, FIG. 4 shows the result of 36 to 39 μm foils and FIG. 5 shows the result of 10 to 35 μm foils. According to FIG. 3, it has been confirmed that at least 1% of Al evaporates when the treatment is conducted at 1,250° C. or above for at least 90 minutes (the condition indicated by x in the graph). Next, the condition under which foils having a thickness of at least 50 μm is solid phase diffusion-bonded was sought. FIG. 6 shows its result. It can be appreciated clearly from FIG. 6 that the treatment temperature and the treatment time of at least 1,290° C. and at least 90 minutes are necessary. When the data shown in FIG. 3 is taken into consideration, too, it can be understood that the 50 μm-thick foil cannot be bonded by solid phase diffusion-bonding under the vacuum treatment condition under which at least 3% of Al remains in the metal foils. Incidentally, in FIGS. 3 to 5, symbol ○ represents the case where at least 3% of Al remains and X represents the case where 3% or more of Al does not remain. Solid line represents the boundary.

Similarly, the condition for solid phase diffusion bonding is examined for the case where either one of the corrugated foil and the flat foil has a foil thickness of less than 40 μm. The result is shown in FIG. 7. The condition for solid phase diffusion bonding, under which either one of the corrugated foil and the flat foil has a foil thickness of less than 40 μm and under which at least 3% of Al remains in the metal foils, is examined for by taking also the data of FIG. 4 into consideration. The result is shown in FIG. 9. According to this result, a suitable condition can be obtained when the treatment temperature is within the range of 1,220 to 1,250° C. and the treatment time is within the range of 60 to 90 minutes in the case where at least one of the corrugated foil and the flat foil has a foil thickness of less than 40 μm.

Furthermore, the condition for solid phase diffusion bonding is determined for the case where both of the corrugated foil and the flat foil are less than 35 μm thick. The result is shown in FIG. 8. FIG. 10 shows the condition for solid phase diffusion bonding under which both of the corrugated foil and the flat foil are less than 35 μm thick and at least 3% of Al remains in the metal foils, by taking the result of FIG. 5 into consideration in combination with the result of FIG. 8. According to this result, a suitable condition can be obtained when the treatment temperature is within the range of 1,100 to 1,250° C. and the treatment time is within the range of 30 to 90 minutes.

Next, the reason why the present invention uses the metal foils having a thickness of less than 40 μm are used will be explained.

Figure 11A:
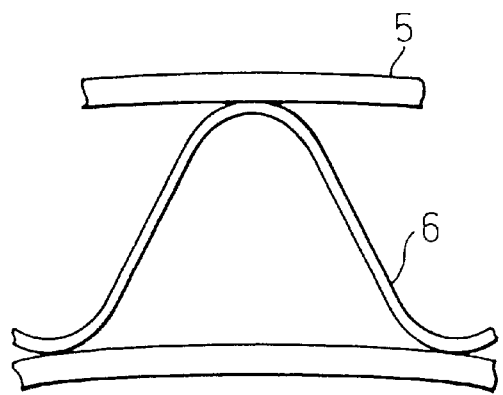
Figure 11B:
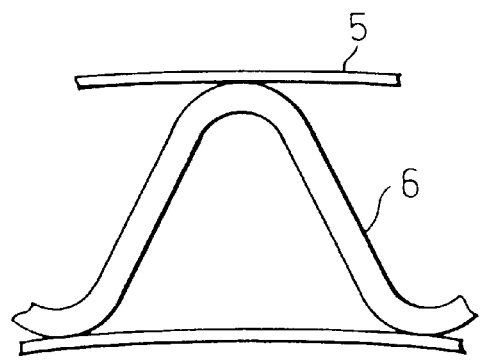

In the present invention, the metal foil having a thickness of less than 40 μm needs to be used for either one of the metal flat foil and the metal corrugated foil. It is further preferred, however, to use a foil less than 40 μm thick, particularly a foil less than 35 μm thick, for both of the flat foil and the corrugated foil. When a metal corrugated foil 6 less than 40 μm thick and a metal flat foil 5 at least 40 μm thick, which is the same thickness as in the prior art, for example, are wound under a predetermined tension to form a honeycomb body as shown in FIG. 11(a), the top of the corrugated foil 6 is crushed by the flat foil 5 having rigidity. In consequence, the contact area between both foils increases, and adhesion between both foils becomes high. On the contrary, when a metal flat foil 5 less than 40 μm thick and a metal corrugated foil 6 at least 40 μm thick are used as shown in FIG. 11(b), the flat foil undergoes deformation along the tops of the corrugated foil having rigidity. As a result, adhesion between both foils similarly becomes high.

Figure 11C:
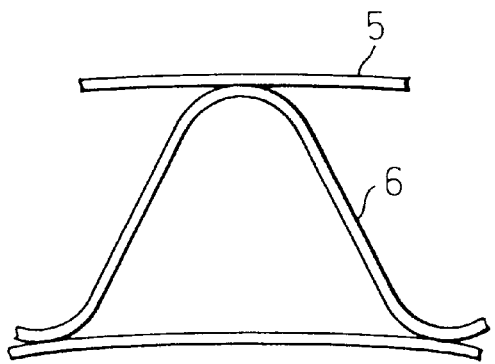

When both foils are less than 35 μm thick and are held at a high temperature of at least 1,100° C. as shown in FIG. 11(c), the level of surface energy that provides the surface coarseness becomes relatively great at the contact portions of both foils due to the decrease of the volume of the base metal. It is estimated hereby that this surface energy functions as the driving force for generating diffusion of the atoms and causes microscopic deformation to such an extent as to fill the roughness of the surface, so that the contact area is drastically increased.

To confirm this estimation, experiments regarding the surface coarseness Ra are carried out in the following way.

Sharp stripe-like scratches, that profile the polishing scratches of rolls of a rolling mill, exist in the foil surface before heat-treatment as shown in FIG. 12(a), and this surface coarseness Ra is reduced by vacuum heat-treatment as shown in FIG. 12(b). The temperature at which this surface coarseness Ra reaches 0.1 μm or below is determined. Incidentally, the surface coarseness is measured by a contact type coarseness meter with a scanning distance of 3 m.

Figure 13:
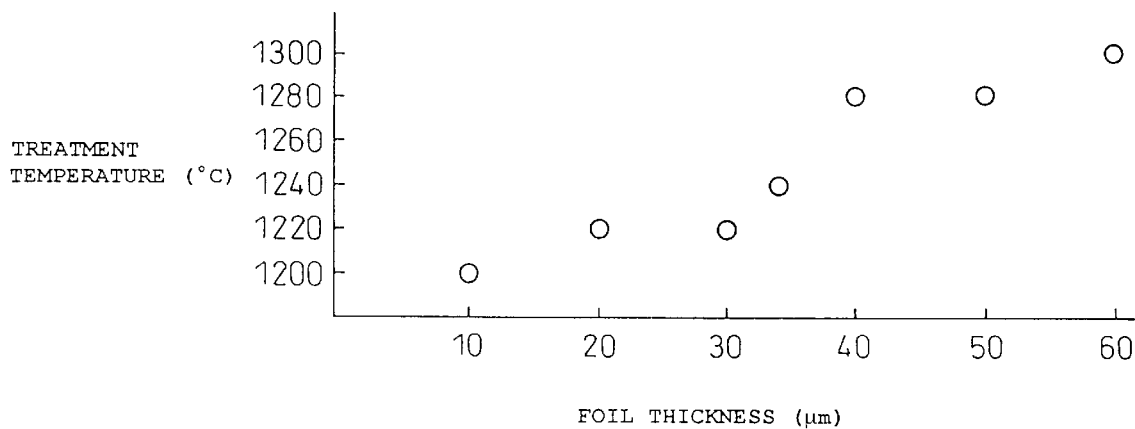
FIG. 13 is a graph showing the relation between a heat-treatment temperature associated with surface diffusion and a foil thickness.

A raw material for the metal support is a 5%Al—20%Cr—Fe steel with a foil surface coarseness Ra=0.1 μm, and metal foils having foil thickness of 10 to 60 μm are heat-treated at 1,200 to 1,300° C. and $1 \times 10^{-5}$ Torr. The temperature at which the roll scratches on the foil surface disappear due to surface diffusion after this heat-treatment is determined. These results are shown in FIG. 13. It has been confirmed from FIG. 13 that surface diffusion becomes remarkable on the low temperature side when the foil thickness is less than 35 μm, that is, microscopic deformation occurs, and diffusion bondability can be improved. Incidentally, this effect can be observed similarly in the low temperature region of up to 1,100° C.

It has been recognized that, in metal foils having a thickness of less than 40 μm, solid phase diffusion bondability can be drastically improved due to macroscopic deformation described above. When the foil thickness falls below 35 μm, microscopic deformation increases and fitting of the contact portions can be drastically improved, and the treatment time becomes shorter.

When the foil thickness is less than 10 μm, rigidity of the foils cannot be maintained during winding. In this case, a problem occurs during the production of the honeycomb body, and the production of the foils by themselves becomes difficult, too. Therefore, the lower limit of the thickness of the metal foils is limited to 10 μm. For these reasons, the thickness of both of the flat foil and the corrugated foil is most suitably within the range of 10 to 35 μm.

Next, another means for improving solid phase diffusion bondability between the flat foil and the corrugated foil constituting the metal honeycomb body will be explained as the second invention of the present application.

The second invention of the present application (hereinafter called the "present invention") relates to the surface condition of the metal foil. One of the inventions relates to the surface coarseness of the metal foil formed of a ferrite type stainless steel for further improving exhaust gas purification performance particularly when the foil thickness is less than 40 μm.

As described above, the metal honeycomb body is produced by winding the flat foil 5 and the corrugated foil 6. For example, an about 50 μm thick belt-like flat foil 5 is produced by cold rolling, and a belt-like corrugated foil 6 is produced by subjecting such a flat foil 5 to corrugation working.

Figure 14:
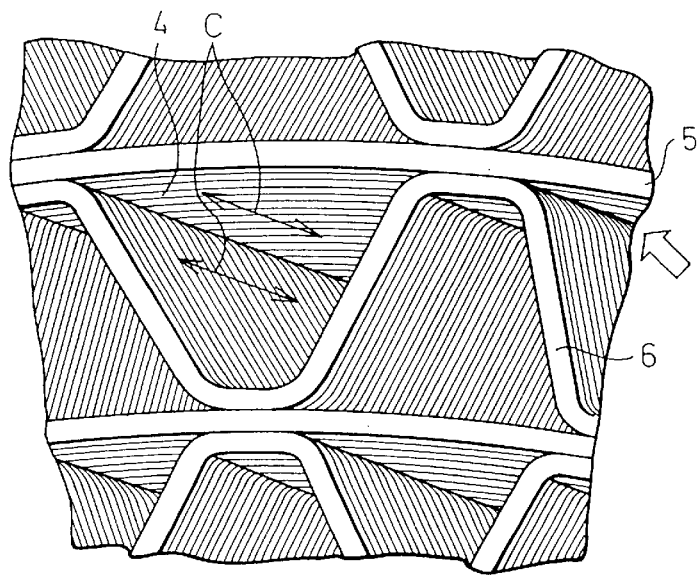
FIG. 14 is a partial enlarged perspective view of a metal honeycomb body according to one embodiment of the present invention.

Therefore, in the metal honeycomb body 2, the direction of the vent holes 4 defined by the flat foil and the corrugated foil 6 cross orthogonally the rolling direction, that is, the width-wise direction (C direction) of both metal foils, as shown in an enlarged view of FIG. 14.

The inventors of the present invention have confirmed that the mean coarseness Rac in the direction of the vent holes 4 plays an extremely important role in diffusion bonding both metal foils with each other.

In other words, the mean roughness Rac is defined as the mean roughness measured in the direction crossings lines along the rolling direction printed by cold rollers with scratch lines on their surface.

Figure 15A:
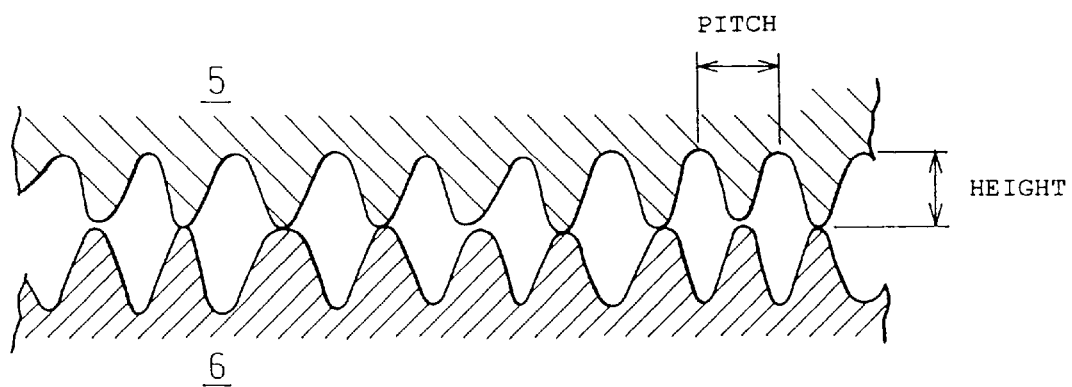
Figure 15B:
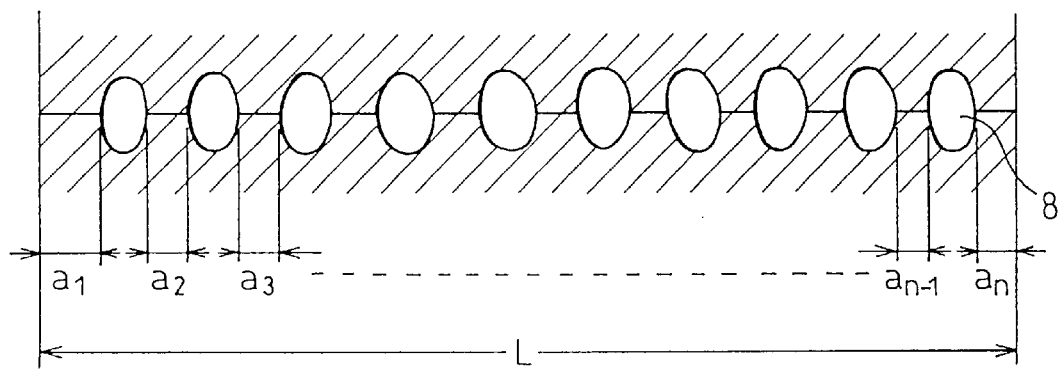

FIG. 15 is a microscopic conceptual view of the bond portion between the flat foil 5 and the corrugated foil 6 of the metal honeycomb body 2 when the bond portion is viewed from the direction crossing the vent holes 4, that is, in the direction indicated by a white arrow in FIG. 14. Spaces encompassed by coarseness curves of the flat foil and the corrugated foil exist before bonding, as shown in FIG. 15(a). Voids 8 resulting from these spaces occur after bonding as shown in FIG. 15(b).

The bonding strength can be increased by decreasing the number or the size of these voids 8. In other words, the bonding strength can be improved by increasing a ratio of the total length Σai of the bonding portions a to the full length L of the contact portion in the width-wise direction of the metal foils (called a "diffusion bonding ratio").

Here, the diffusion bonding ratio=Σai/L can be determined by observing with a microscope the section of the bond portion in the direction of the vent holes 4.

In the metal support according to the present invention, the mean coarseness Rac in the C direction is limited to 0.001 to 0.3 μm. Consequently, the height of the spaces encompassed by the coarseness curves shown in FIG. 15(a) is lowered, diffusion bondability is improved at the contact portions between the flat foil 5 and the corrugated foil 6, and the voids 8 after bonding are decreased to improve the diffusion bonding ratio. Therefore, high durability can be improved when the metal support according to the present invention is used as the catalyst converter.

Figure 16:
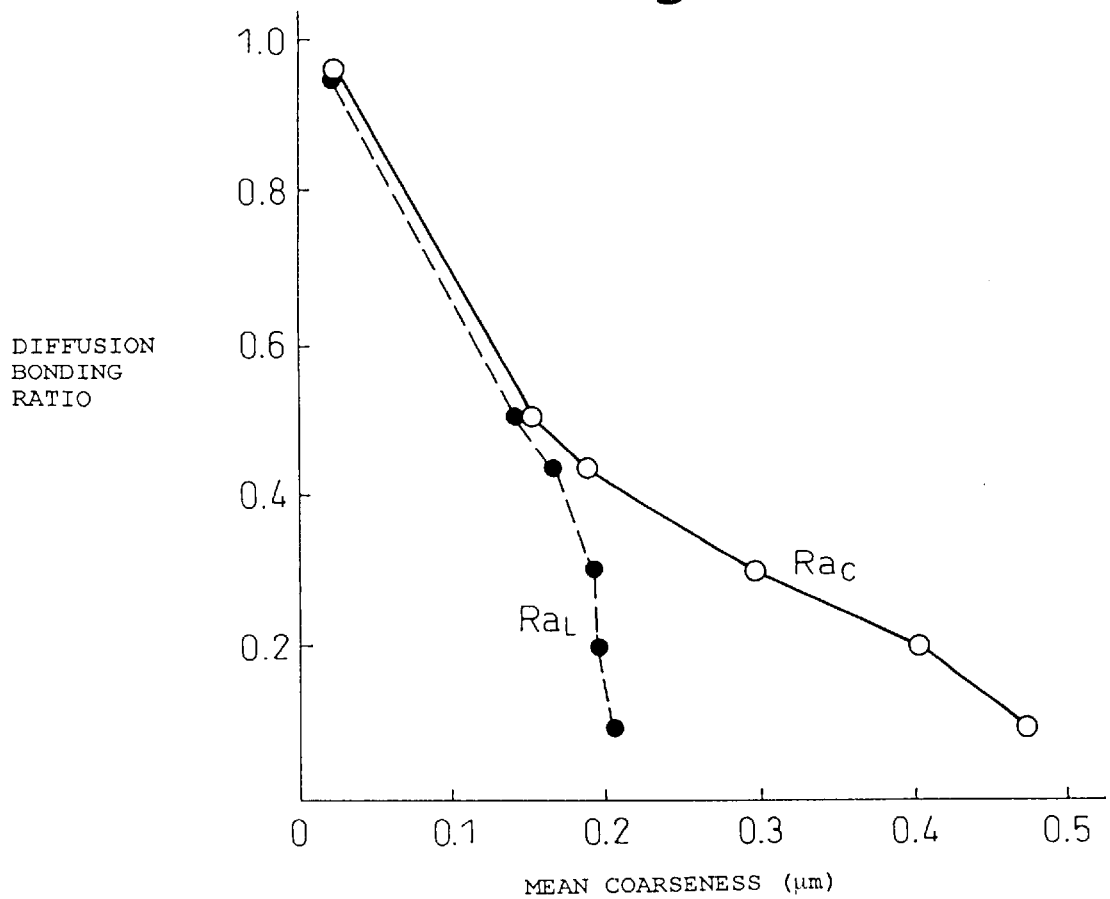
FIG. 16 is a graph for explaining the reasons for limitation of a surface coarseness Rac in the present invention.

The section of the bond portion between the flat foil 5 and the corrugated foil 6 of each metal honeycomb body produced tentatively by changing variously the means coarseness Rac is observed through a microscope. Diffusion bonding is conducted at a vacuum of $10^{-4}$ Torr and a temperature of 1,250° C. for 90 minutes. As a result, it has been found that the diffusion bonding ratio of at least 0.3 can be obtained by limiting Rac to not greater than 0.3 μm as shown in FIG. 16. It has been confirmed that no problem occurs in durability at the diffusion bonding ratio of at least 0.3 when the catalyst converter is mounted to the automobile engine. Burdens on the production conditions become great industrially if Rac is limited to less than 0.001 μm. Therefore, Rac is limited as described above.

Figure 17:
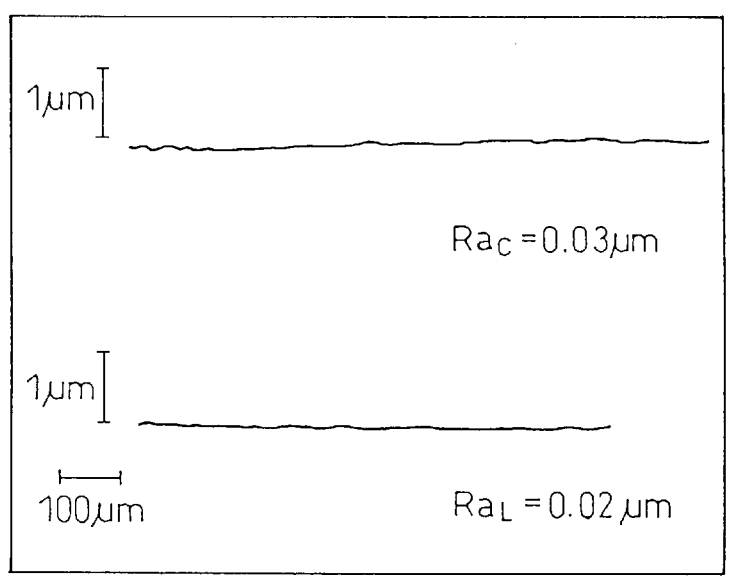
FIG. 17 is an explanatory view showing the coarseness of the flat foil and the corrugated foil in an embodiment of the present invention.
Figure 18:
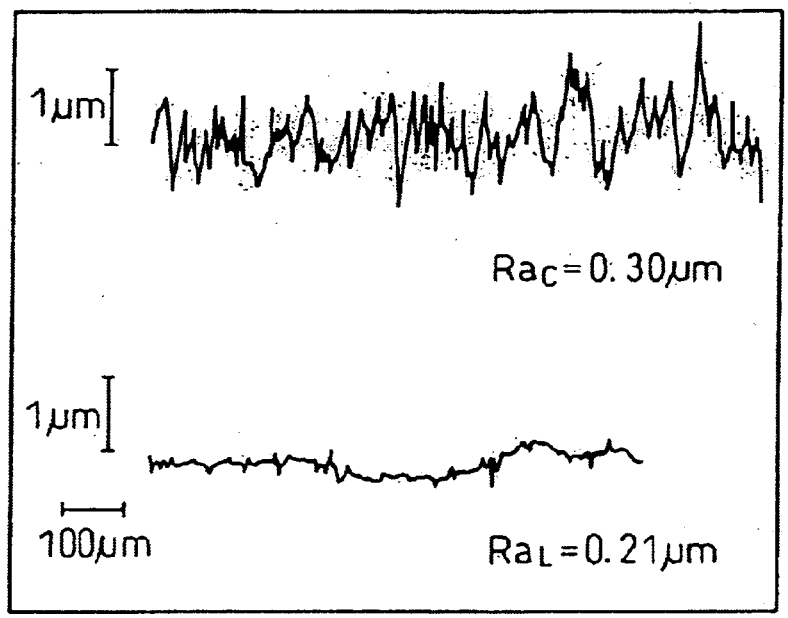
FIG. 18 is an explanatory view showing the coarseness of the flat foil and the corrugated foil in another embodiment of the present invention.
Figure 19:
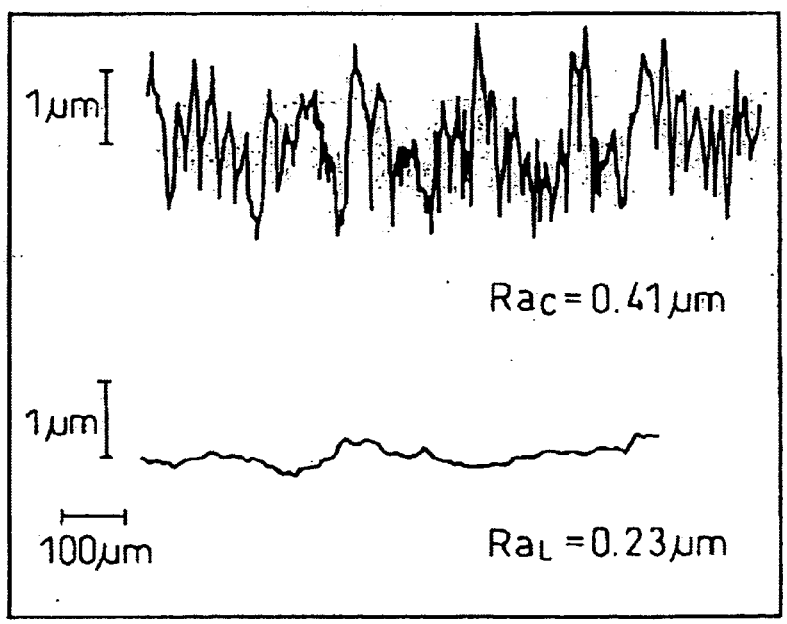
FIG. 19 is an explanatory view showing the coarseness of the flat foil and the corrugated foil in a prior art example.

Incidentally, black circle ● in FIG. 16 represents the mean coarseness in the longitudinal direction (L direction) of the belt-like flat and corrugated foils 5 and 6, and no correlation can be observed at a coarseness of about 0.2 μm or below. FIGS. 17, 18 and 19 show the surface coarseness curves when Rac=0.03 μm, 0.30 μm and 0.41 μm in FIG. 16, respectively.

The surface coarseness is measured for the arithmetic mean coarseness (Ra) stipulated by JIS B 0601-1994 in accordance with JIS using a contact needle coarseness meter stipulated by JIS B 0651-1976. In order to conduct precise measurement by excluding the influences of foil deformation, specific attention is paid to adhesion between the sample material and a stool. The contact needle used has a radius of curvature of 1 μm at the tip, and measurement is made with a cut-off value of 0.8 mm, a contact needle scanning speed of 0.3 mm/sec and a gauge length of 4 mm.

Since the metal support according to the present invention has excellent diffusion bondability as described above, it becomes possible to lower the heating temperature to 1,250° C. or below or to shorten the heating time. Therefore, even when Al, etc, is contained in the foil material, evaporation of these heat-resistant alloying elements can be suppressed, and durability during the use as the catalyst converter is excellent.

Next, still another invention relating to the surface condition of the metal foils will be explained.

This invention has its feature in that the surface shape and condition of the flat foil 5 and the corrugated foil 6 is such that the number of peaks per inch length PPI in the direction of the vent holes 4 is at least 100, and the contact portions between the flat foil 5 and the corrugated foil 6 are bonded by diffusion bonding.

The number of peaks per unit length, such as PPI, is not stipulated as the surface coarseness by JIS. Therefore, the present invention calls it the "surface shape and condition". Measurement can be made by a contact needle type coarseness meter, and under the same condition as that of Rac described above.

The metal support according to this invention limits PPI in the C direction to at least 100 in order to narrow the pitch of the spaces encompassed by the coarseness curves in FIG. 15($a$) and to improve diffusion bondability at the contact portions between the flat foil 5 and the corrugated foil 6. The voids 8 after bonding are decreased in order to improve the diffusion bonding ratio. Therefore, durability during use as a catalyst converter is excellent in the same way as in the invention of the surface roughness described above.

Figure 20:
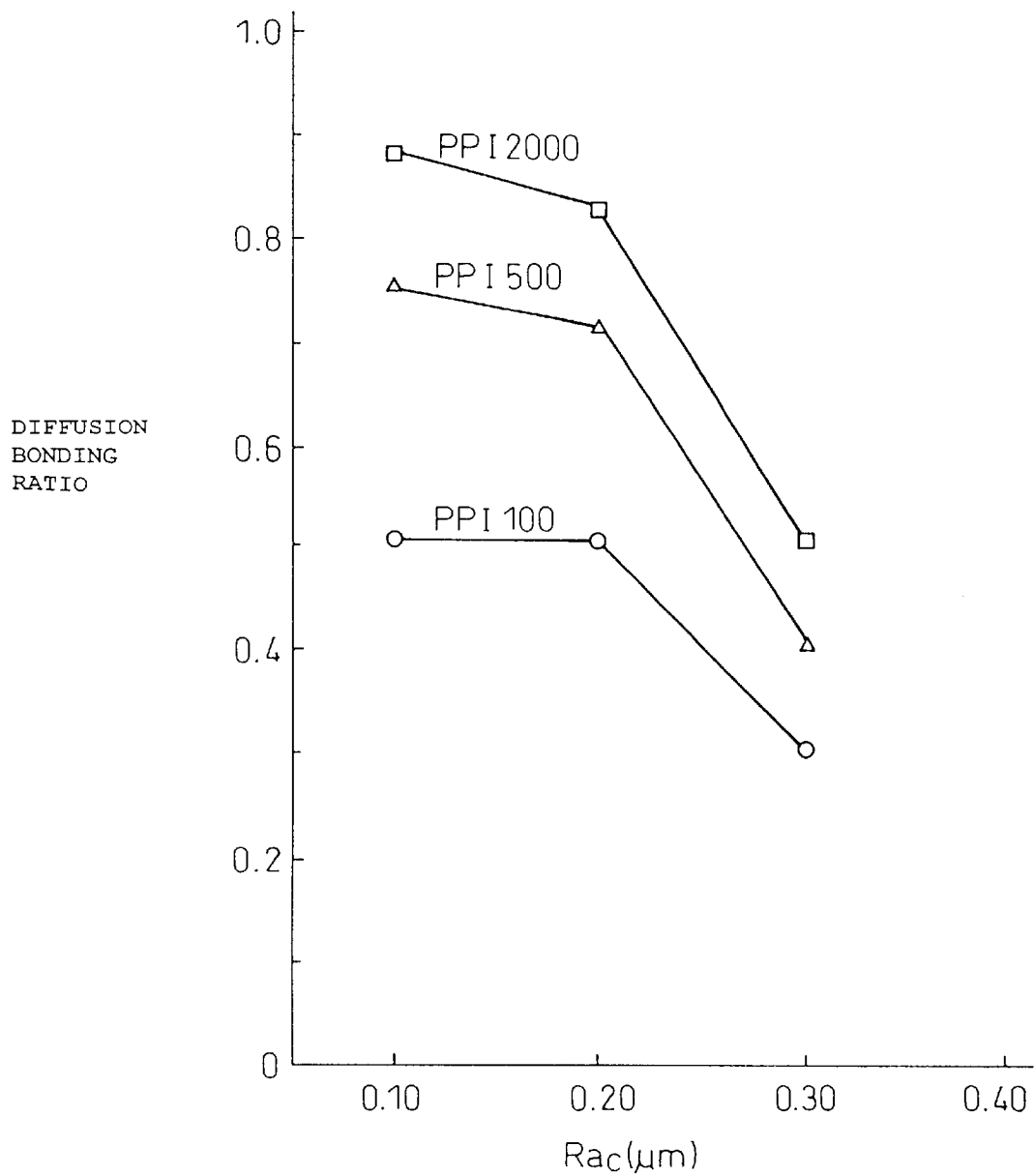
FIG. 20 is a graph for explaining the reasons for limitation of the surface coarseness PPI in the present invention.

The section of the bond portion between the flat foil 5 and the corrugated foil 6 of each of the metal honeycomb bodies produced tentatively at various PPIs is observed through a microscope. Diffusion bonding is conducted at a vacuum of $10^{-4}$ Torr and a temperature of 1,250° C. for the retention time of 90 minutes. As a result, the diffusion-bonding ratio of at least 0.3 can be secured by setting PPI to at least 100 as shown in FIG. 20. Incidentally, though the upper limit of PPI is not limited, in particular, the range that can be employed without remarkably increasing the burdens to the industrial production is up to about 2,000.

Since the metal support of this invention has excellent diffusion bondability as described above, evaporation of the heat-resistant alloying elements such as Al can be suppressed during heating of the diffusion bonding treatment and hence, the durability is excellent.

Therefore, in this invention of the surface condition of the metal foil, the surface coarseness of the flat and corrugated foils 5 and 6 is preferably 0.001 to 0.3 $\mu$m in terms of the mean coarseness in the direction of the vent holes 4. The surface shape and condition of the flat and corrugated foils 5 and 6 is preferably such that the number of peaks per inch length PPI in the direction of the vent holes 4 is at least 100. Under such a condition, diffusion bondability can be much more improved, the diffusion bonding ratio can be further improved, evaporation of the heat-resistant alloying elements can be much more suppressed, and the durability of the metal support becomes higher.

To obtain the flat foil 5 having the surface coarseness described above, work rolls having a small mean coarseness in the roll length-wise direction are used for cold rolling. The work rolls are worn out in the course of rolling and their surface coarseness becomes small. For this reason, the mean coarseness in the length-wise direction need not be kept always below 0.3 $\mu$m, and it is only necessary that the mean coarseness is not greater than 0.3 $\mu$m in at least the condition immediately before final pass rolling. The flat foil 5 described above can be obtained by managing the work rolls in accordance with the number of passes of finishing rolling and a reduction ratio.

To obtain the flat foil 5 having the surface shape and condition described above, a work roll having a small PPI value in the longitudinal direction of the roll is used for cold rolling. Since the work roll is worn out during rolling as described above, the PPI value in the longitudinal direction need not always be set to at least 100, and may be at least 100 under the condition before at least the final pass rolling. The flat foil 5 can be obtained by managing the work roll in accordance with the number of passes of fining rolling and with the reduction ratio.

The flat foil and corrugated foil having the surface condition described are superposed and wound spirally with each other, giving the honeycomb body. The honeycomb body so produced is fitted into the outer cylinder, and is then heated in vacuum (degree of vacuum of $3\times10^{-4}$ to $5\times10^{-5}$ Torr), or in a non-oxidizing atmosphere, at a temperature within the range of 1,100 to 1,250° C. for a retention time of 30 to 90 minutes so as to execute the diffusion bonding treatment.

According to the present invention, the diffusion bonding ratio of the bond portion between both foils can be improved and evaporation of the heat-resistant alloying elements can be suppressed. Therefore, when the metal support is used for the catalyst converter, its durability can be improved remarkably.

Next, still another means for improving solid phase diffusion bondability between the flat foil and the corrugated foil will be explained as the third invention of the present application.

The third invention of the present application (hereinafter called the "third invention") stipulates the width of the contact portion between the flat foil and the corrugated foil. This third invention can impart a sufficient bonding strength, even when the honeycomb body is formed by winding the flat foil and the corrugated foil by applying a back-tension of 0.2 to 1.5 kgf/cm per unit width of the flat foil, that is smaller than ordinary back-tension, to the flat foil.

Figure 21:
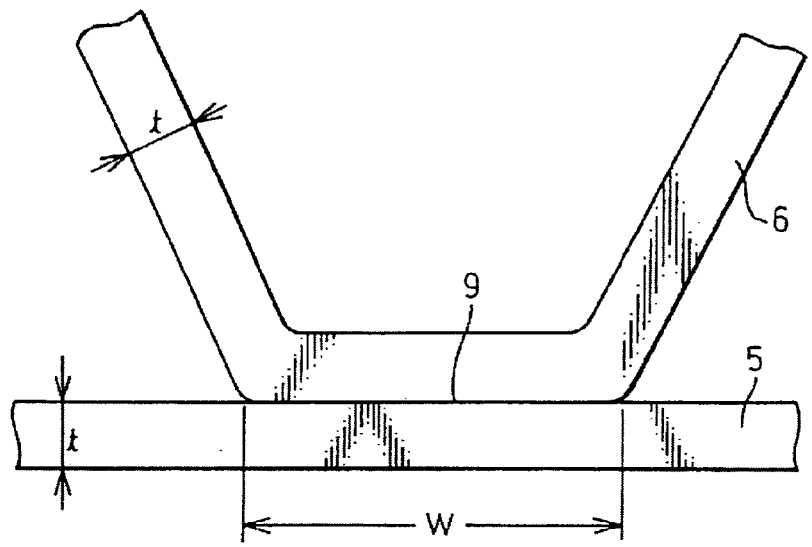
FIG. 21 is a front view showing an example of a bond portion between the flat foil and the corrugated foil in the metal honeycomb body in another embodiment of the present invention.

In the honeycomb body according to this invention, the contact width W between the flat foil 5 and the corrugated foil 6 in the length-wise direction is set to at least five times the thickness t of the flat and corrugated foils 5 and 6 as shown in FIG. 21. The honeycomb body is formed by diffusion-bonding this contact portion 9.

Figure 22A:
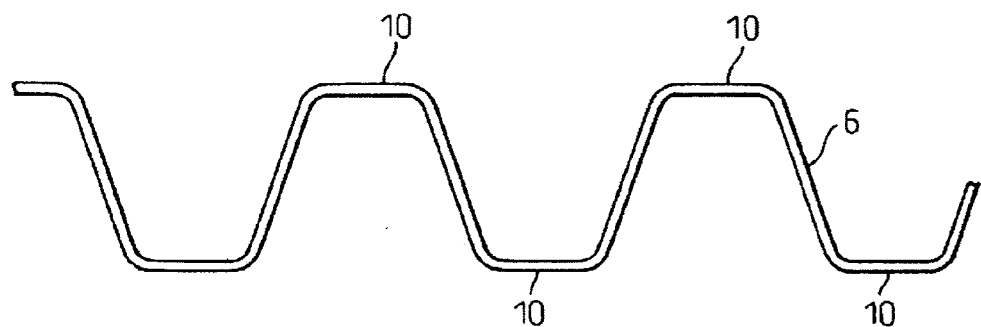
FIG. 22(a) is a side view showing an example of the shape of a corrugated shape (trapezoidal curve) in an embodiment of the present invention.
Figure 22B:
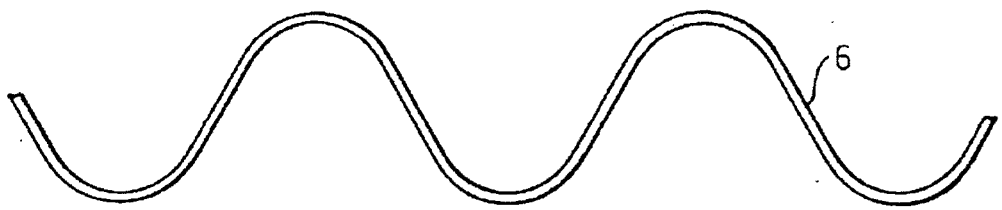
FIG. 22(b) is a side view showing the shape of a corrugated foil (sine curve) in a prior art example.

The contact width W can be formed to a width greater than at least 5 times the foil thickness t by, for example, forming the trapezoidal wave in the corrugated foil 6 as shown in FIG. 22($a$). In other words, parallel portions 10 having a width at least 5 times the foil thickness t may be formed at the top and the valley of the corrugated wave. As the contact width W is provided with a width of at least 5 times the foil thickness t as shown in FIG. 21, each contact portion 9 can be sufficiently diffusion-bonded without particularly elevating the surface pressure.

Next, the reasons will be observed. Diffusion bonding is effected by heating inside a vacuum furnace. However, the flat foil 5 and the corrugated foil 6 are oxidized by residual oxygen at an ordinary degree of vacuum of about $10^{-4}$ Torr. The present inventors have confirmed the formation of $Al_2O_3$ on the foil surface when the foil formed of a ferrite type stainless steel containing Al as the heat-resistant alloying element is heated to 1,250° C. at a degree of vacuum of about $2\times10^{-4}$ Torr. This phenomenon indicates that the oxygen exists in the heating atmosphere and the metal vapor of Al, etc, occurs from the foil during vacuum heating and is oxidized.

If the contact width W between the flat foil 5 and the corrugated foil 6 is small, as in the prior art devices, oxygen flows into the contact portion. In consequence, $Al_2O_3$ is formed in the contact boundary, functions as a barrier and presumably impedes diffusion bonding. When the contact width W is expanded to the width at least 5 times the foil thickness t, however, the metal vapor of Al, or the like, fills up the space between both foils at the contact portion and restricts the formation of $Al_2O_3$ in the boundary interface. Therefore, diffusion bonding is presumably effected in a satisfactory way in the present invention without particularly elevating the surface pressure. For these reasons, the metal support according to the present invention limits the width W of the contact portion 9 between the flat foil 5 and the corrugated foil 6 to 5 to 50 times the foil thickness t.

As described above, it is not necessary in the metal support according to the present invention to elevate particularly the surface pressure at the contact portion 9 between the flat foil 5 and the corrugated foil 6. When the belt-like flat foil 5 and the belt-like corrugated foil 6 are superposed and wound as shown in FIG. 2, the back-tension applied to the flat foil 5 in the A direction can be reduced in comparison with the prior art devices. Consequently, possible buckling of the vent holes 4 of the metal honeycomb body 2 at the time of winding can be eliminated. After such a metal honeycomb body 2 is fitted into the outer cylinder 3, the reduction of the diameter of the outer cylinder 3 for imparting the surface pressure is not necessary.

As described above, the metal support according to the present invention has high diffusion bondability of the contact portion 9 between the flat foil 5 and the corrugated foil 6, and the diffusion bonding ratio of the bond portion is high. In other words, a diffusion bonding ratio of at least 0.3 can be obtained.

According to the present invention, heating at the time of diffusion bonding can be carried out at a temperature within the range of 1,100 to 1,250° C. Preferably, however, the vacuum heat-treatment for diffusion bonding can be carried out at a temperature T (°C.) within the range that satisfies the following relational formula in accordance the mean coarseness Rac ($\mu$m) in the width-wise direction of the flat foil 5:

$$10^4/(T+273) \leq -0.43 \log Rac + 6.43 \quad (1)$$

Here, Rac represents the mean coarseness measured in the width-wise direction of the flat foil 5, that is, in the C direction shown in FIG. 2.

If the thickness of the belt-like flat foil 5 is less than 40 $\mu$m, exhaust gas purification performance can be particularly improved, but the foil thickness may be greater than this value, for example, about 50 $\mu$m. Since the foil is produced by cold rolling, stripes are generally observed on the surface of the foils in the rolling direction, as described above. Therefore, approval/rejection of diffusion bonding is judged by changing the vacuum heat-treatment temperature T for samples having different surface coarseness in the direction crossing these stripes, that is, in the C direction shown in FIG. 2. As a result, the samples falling within the range satisfying the formula (1) given above provide the good results as shown in FIG. 23.

Figure 24:
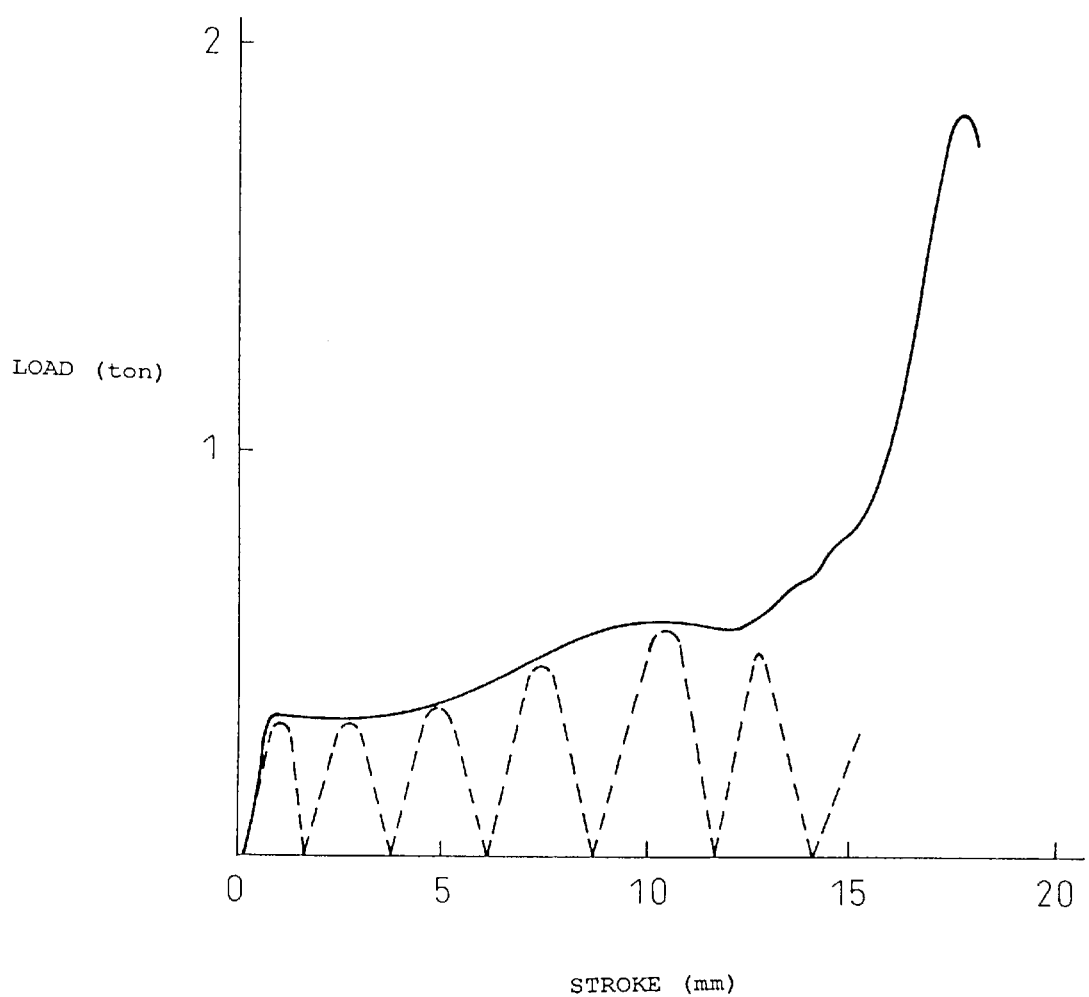
FIG. 24 is a graph showing the result of a cold push test of an object material in the present invention.

The approval/rejection judgement is carried out by the cold pushing test. Symbol ○ represents approval and symbol ● represents rejection. The cold pushing test is conducted by placing the metal support 1 on the table of the pushing tester shown in FIG. 42, pushing a punch equipped with a load cell, and recording a stroke-load curve as shown in FIG. 24. Approval/rejection can be judged from observation of the deformation portion after pushing and from the shapes of the curves. The samples, in which deviation resulting from inferior bonding does not occur in the metal support 1, describe the curves represented by solid line, and are judged as being approved. The samples in which the deviation occurs at the bond portion describe the curves represented by broken lines, and are judged as being rejected.

When the diffusion bonding treatment is carried out at the vacuum heat-treatment temperature T in accordance with the surface coarseness Rac of both the flat foil 5 and the corrugated foil 6 as described above, the diffusion bonding ratio of the resulting metal support can be stably improved, and evaporation of the heat-resistant alloying elements such as Al can be stably suppressed.

Incidentally, higher diffusion bondability can be obtained by using the metal foils having the surface coarseness Rac stipulated by the second invention of the present application for this invention.

The heat-treatment condition for conducting diffusion bonding may be the same as that of the second invention.

To shape the corrugated foil 6 by machining the flat foil 5, a corrugating gear is generally used. To form the parallel portion at the top and the valley of each wave of the corrugated foil 6 as shown in FIG. 22(a), a corrugating gear having a greater radius of curvature at the tip or a corrugating gear having a flat distal end may be used.

Next, the invention relating to a metal support that is excellent in durability and capable of withstanding the cycles of rapid heating and rapid cooling by the exhaust gas of the automobile engine and vigorous vibration from the engine will be explained as the fourth invention of the present application (hereinafter called the "present invention").

Needless to say, when the present invention is applied to the support of each of the inventions described above, a support having more excellent durability can be obtained.

As one of the technologies for improving durability of the metal support of the present invention, the invention will be explained that forms unbonded portions 11, at which the contact portions between the flat foil 5 and the corrugated foil 6 are not bonded, inside the metal honeycomb body shown in FIG. 25.

Figure 25:
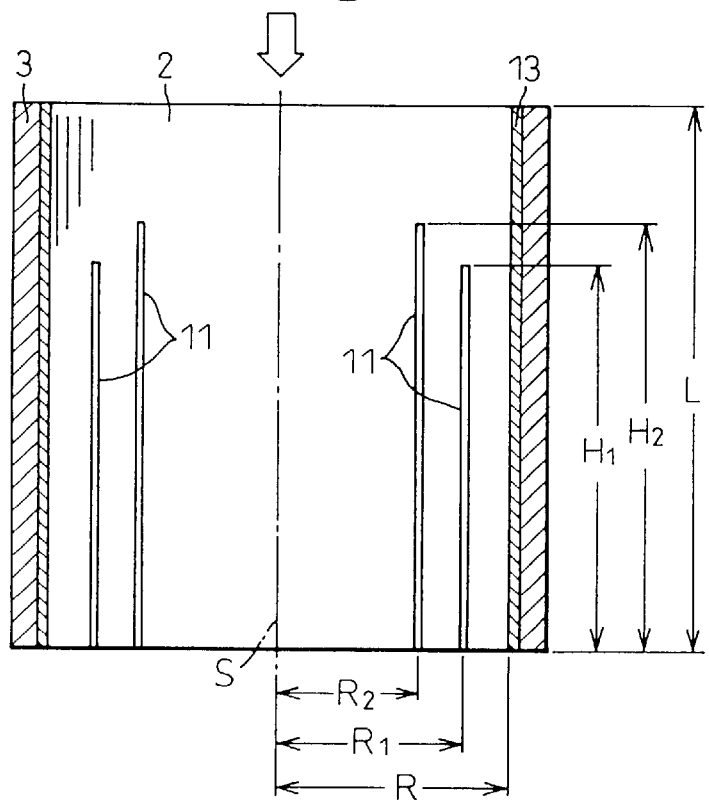
FIG. 25 is a sectional view of a metal support in another embodiment of the present invention.

Referring to FIG. 25, at least one (two, in the drawing) of the unbonded portion 11 is formed at a position spaced apart by a predetermined distance from the center axis S of the metal honeycomb body 2 in such a manner as to extend in a distance within a predetermined range and at least one turn around the outer periphery.

The unbonded portion 11 is formed at a position inside the outer periphery that is spaced apart by at least ½ of the radius R of the metal honeycomb body 2 from the center axis S. In other words, two unbonded portions 11 in FIG. 25 satisfy the relation $R/2 \leq R_1 \angle R$, $R/2 \leq R_2 \angle R$. The range of length of the unbonded portions 11 starts from the end of the metal honeycomb body 2 on the gas exit side, and ends up at the point having a distance of 9/20 to 9/10 of the total length L of the metal honeycomb body 2 in the axial direction, inside the honeycomb body 2 from the start point. In FIG. 25, when the gas enters the honeycomb body 2 from above in the direction indicated by white arrow and is discharged downward, the range of length is $9L/20 \leq H_1 \leq 9L/10$, $9L/20 \leq H_2 \leq 9L/10$.

The metal support according to the present invention has the honeycomb body unbonded portion 11 that is limited as described above. Therefore, when the metal support is mounted to, and used in, the exhaust gas system of the automobile engine, it has excellent durability against the rapid heating and rapid cooling cycles due to the exhaust gas.

Figure 26:
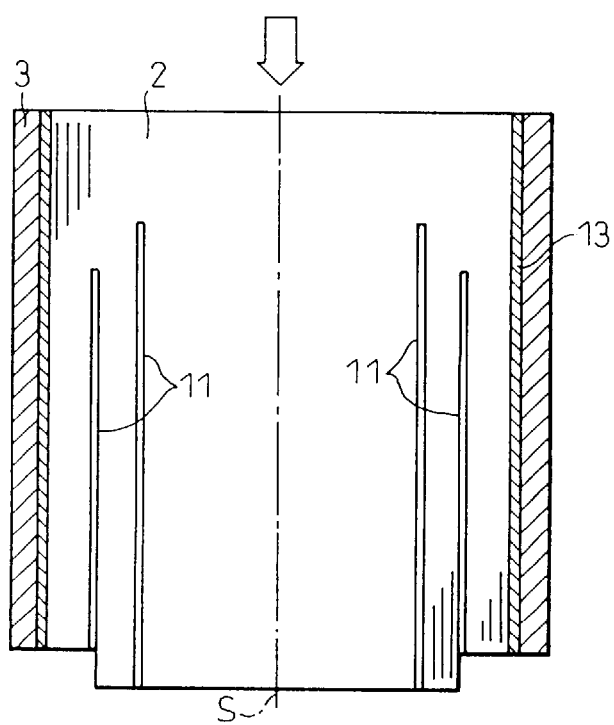
FIG. 26 is a sectional view showing the deformation condition when the metal support of the embodiment shown in FIG. 25 is used.

In other words, the center portion of the metal honeycomb body 2 in the diametric direction is quickly heated by the high temperature exhaust gas and by the catalytic reaction at the start of engine and acceleration. Even when the temperature difference from the outer peripheral portion becomes great in this case, the center axis side (S) extends towards the gas exit side with the unbonded portion 11 as the boundary as shown in FIG. 26, thereby mitigating the stress concentration. The center portion of the metal honeycomb body 2 is rapidly cooled at the time of stopping and braking, and generates the large temperature difference with the outer peripheral portion. In this case, the center axis side (S) contracts inward with the unbonded portion 11 as the boundary, and the stress concentration is likewise mitigated.

When the unbonded portion 11 is situated closer to the center axis S than ½ of the radius R, the stress concentration on the outer peripheral side of the unbonded portion cannot be mitigated easily. In consequence, the metal honeycomb body 2 cannot fully absorb the stress, and the improvement effect of durability cannot be exhibited. When the unbonded portion is disposed from the end portion of the metal honeycomb body 2 on its gas entry side, the honeycomb defect called "cracks" is likely to occur around the unbonded portion 11.

If the length of the unbonded portion 11 is less than 2/20 of the full length L of the metal honeycomb body 2, the force of restriction becomes great during extension and contraction resulting from the temperature difference on the center axis side S. Therefore, the stress concentration cannot be mitigated easily. If the length of the unbonded portion 11 exceeds 9/10 of the full length L of the metal honeycomb body 2, cracks occur in the metal honeycomb body 2 above the unbonded portion 11 due to the extension and contraction on the center axis side S. In an extreme case, the portion on the center axis side S is likely to fall off.

The unbonded portion 11 may be disposed at one position. If it is disposed at two positions as shown in FIG. 25, durability can be further improved, but the degree of improvement is not remarkable. The unbonded portion 11 may be disposed at three or more positions, but such a structure is not preferable because the production cost increases. At least one peripheral portion of each of the flat foil 5 and the corrugated foil 6 must be kept unbonded, and the unbonded portion may extend to maximum of two turns of the circumferences.

Figure 27:
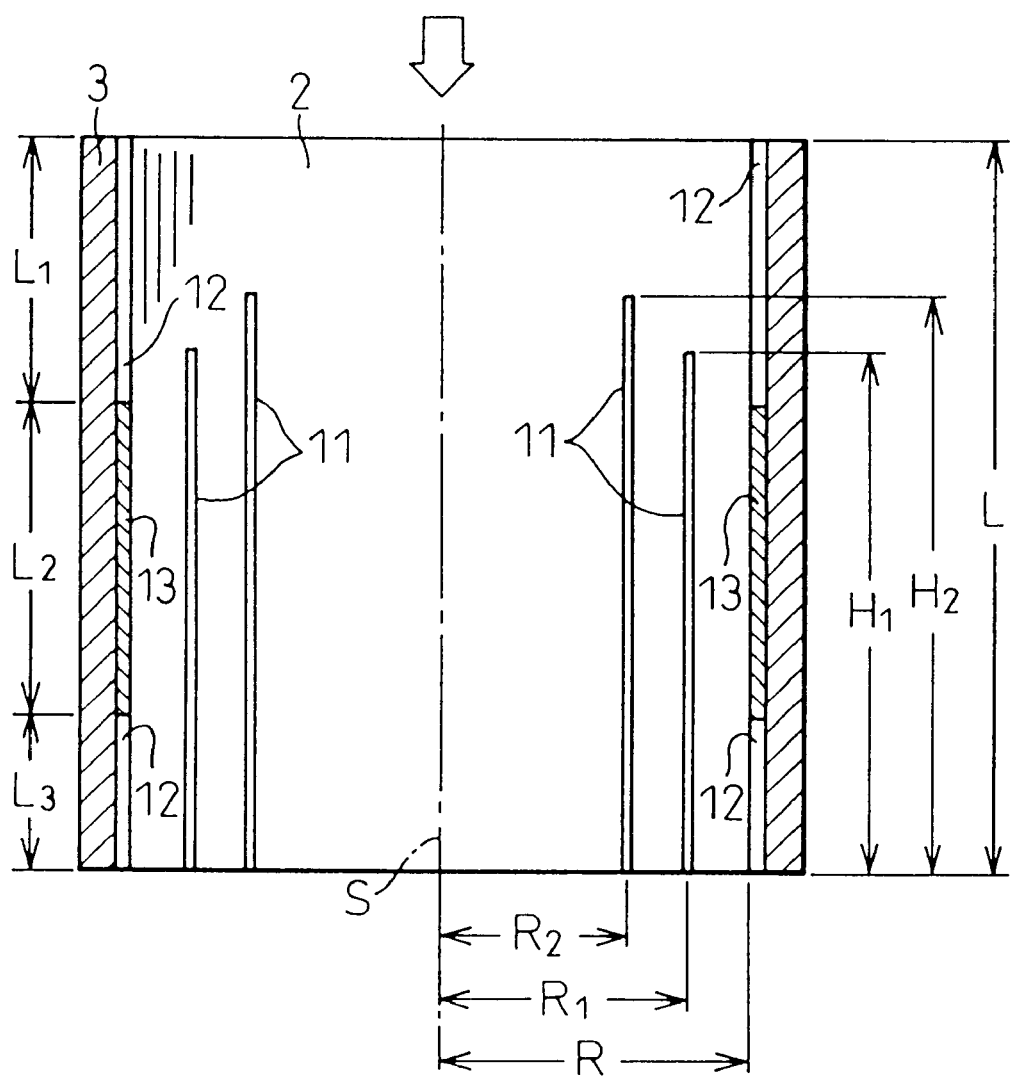
FIG. 27 is a sectional view showing another example of the metal support of the present invention.

Next, in the metal honeycomb body of the present invention, the unbonded portion 12 and the bonded portion 13 each having a predetermined length are preferably formed at the boundary between the outer periphery of the metal honeycomb body 2 and the inner periphery of the outer cylinder 3 as shown in FIG. 27. The bonded portion 13 is formed into a length of not greater than ½ of the total length L of the of the honeycomb body 2 in such a manner as to extend from a position, that is spaced apart by at least ⅓L from one of the ends of the honeycomb body 2 as the gas entry side towards the other end as the gas exit side. The rest of the portions of the boundary are the unbonded portion 12. In other words, $L_1 \geq L/3$ and $L_2 \leq L/2$ in FIG. 27, and $L_3$ may be 0.

Figure 28:
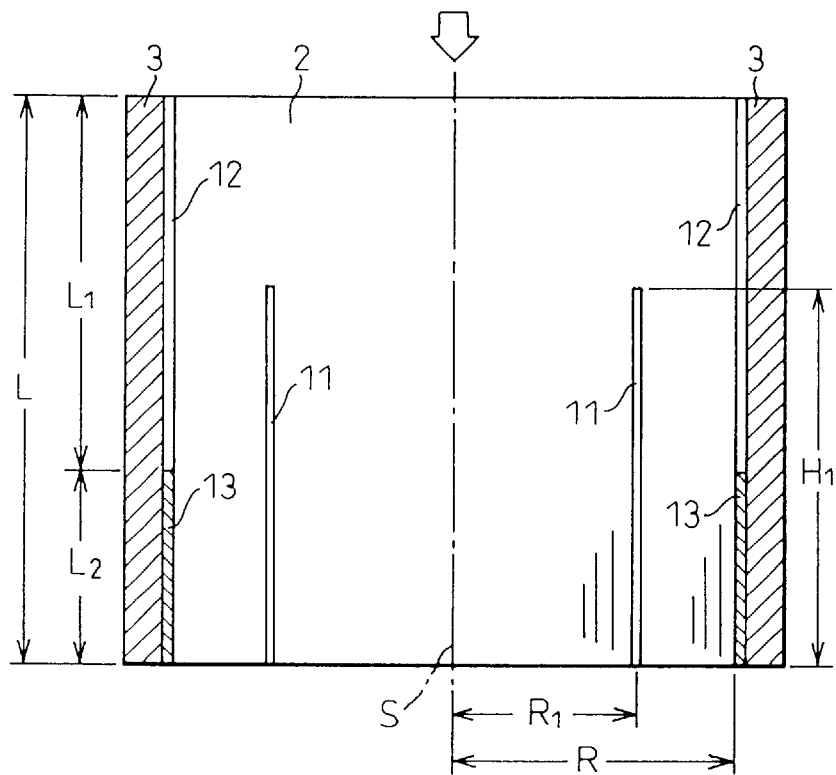
FIG. 28 is a sectional view showing still another example of the metal support in the present invention.
Figure 29:
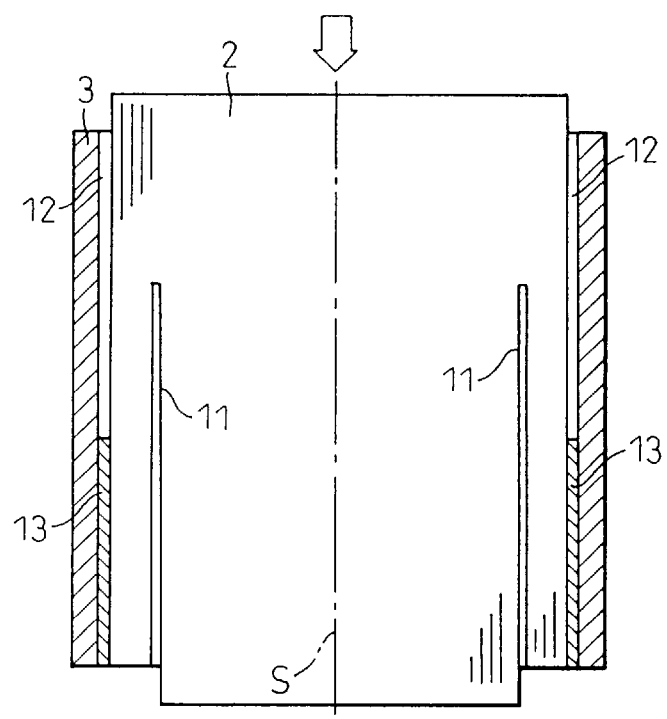
FIG. 29 is a sectional view showing the deformation condition when another example of the metal support is used in the present invention.

In other words, the embodiment in which the bonded portion 13 is so formed as to fall within the range of $L_2$ extending from one of the ends of the metal honeycomb body 2 on the gas exit side as the start point in the direction of the center axis of the metal honeycomb body, as shown in FIG. 28, is also embraced within the scope of the present invention.

Since such limited unbonded portion 12 and bonded portion 13 are formed at the boundary between the metal honeycomb body 2 and the outer cylinder 3 as described above, the metal support exhibits more excellent durability against the rapid heating and rapid cooling cycles of the exhaust gas when the metal support is mounted to, and used in, the engine exhaust gas system of the automobile.

For example, even when the center portion of the metal honeycomb body 2 is heated rapidly or cooled rapidly and the temperature difference with the outer peripheral portion becomes great, the center axis side S of the metal support shown in FIG. 28 extends or shrinks with the unbonded portion 11 being the boundary. In addition, the metal honeycomb body 2 extends or shrinks as a whole towards or from the gas entry side. As a result, the stress concentration can be much more mitigated.

If the length $L_1$ of the unbonded portion 12 on the gas entry side is less than ⅓ of the total length L of the metal honeycomb body 2 in FIG. 27, the force of restriction acts on extension/contraction of the entire metal honeycomb body 2 with respect to the gas entry side, and a higher effect of mitigating the stress concentration cannot be obtained easily. If the length $L_2$ of the bonded portion 13 exceeds ½ of the total length L of the metal honeycomb body 2, on the other hand, the force of restriction acts on extension/contraction of the entire honeycomb body 2 with respect to the outer cylinder 3, and a higher effect of mitigating the stress concentration cannot be obtained easily, either. The length $L_3$ of the unbonded portion 12 on the gas exit side is not limited. So long as $L_1$ and $L_2$ fall within the ranges described above, the metal honeycomb body 2 is allowed to extend and contract as a whole with respect to the gas entry side. Therefore, $L_3$ may be 0 as described already.

The upper limit of $L_1$ and the lower limit of $L_2$ need not be limited. It is only necessary that the metal honeycomb body 2 be bonded to the outer cylinder 2, and the length $L_2$ of the bonded portion 13 may be small. However, when the bonded portion 13 is damaged and the metal honeycomb body 2 possibly falls off, the lower limit of $L_2$ is preferably set to 1/20 of the total length L of the metal honeycomb body 2. When the lower limit of $L_2$ is set in this way, the upper limit of $L_1$ is 19/20L.

Figure 30:
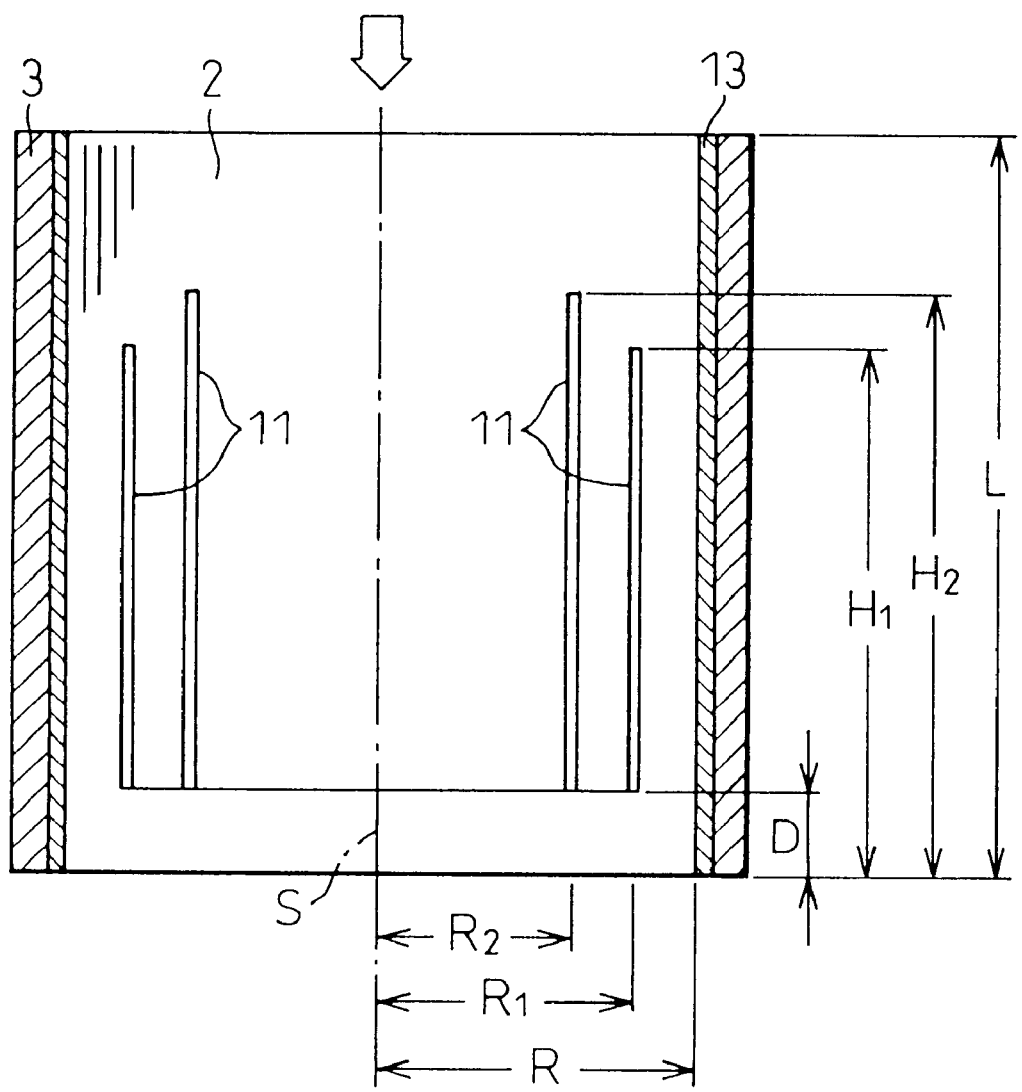
FIG. 30 is a sectional view showing still another embodiment of the metal support in the present invention.

The metal support according to the present invention may be shaped in such a fashion that both ends of the unbonded portion 11 exist inside the metal honeycomb body 12 as shown in FIG. 30. The range of length of the unbonded portion 11 extends from a position, as a start point, that is spaced apart by D, that is a length less than 1/10 of the total length L of the metal honeycomb body 2, from one of the ends of the metal honeycomb body 2 on the gas exit side, to a position, as an end position, that is spaced apart by a length $H_1$ or $H_2$ of 9/20 to 9/10 of the total length of the metal honeycomb body 2 from the end on the gas exit side. The rest of the constructions are the same as in the metal support of the embodiment shown in FIG. 25. In other words, $D < L/10$ and $9L/20 \leq H_1 \leq 9L/10$, and $9L/20 \leq H_2 \leq 9L/10$.

Because the unbonded portion 11 is formed in such a fashion as to be buried inside the honeycomb body 2, the metal honeycomb body 2 becomes more stabilized during its handling, up to fitting to the exhaust gas system of the automobile, and damage to the bond portions between the flat foil and the corrugated foil is unlikely to develop. Moreover, when the metal support is used after mounting, breakage occurs under the state in which the unbonded portion 11 extends to the portion having a length D on the exhaust gas exit side, due to the temperature difference between the center axis side S and the outside, reaching thereby the state similar to the state of the metal support of the embodiment shown in FIG. 25. In consequence, the function becomes also similar. When $D \geq L/10$, breakage under the extension state of the unbonded portion 11 hardly occurs.

Figure 31:
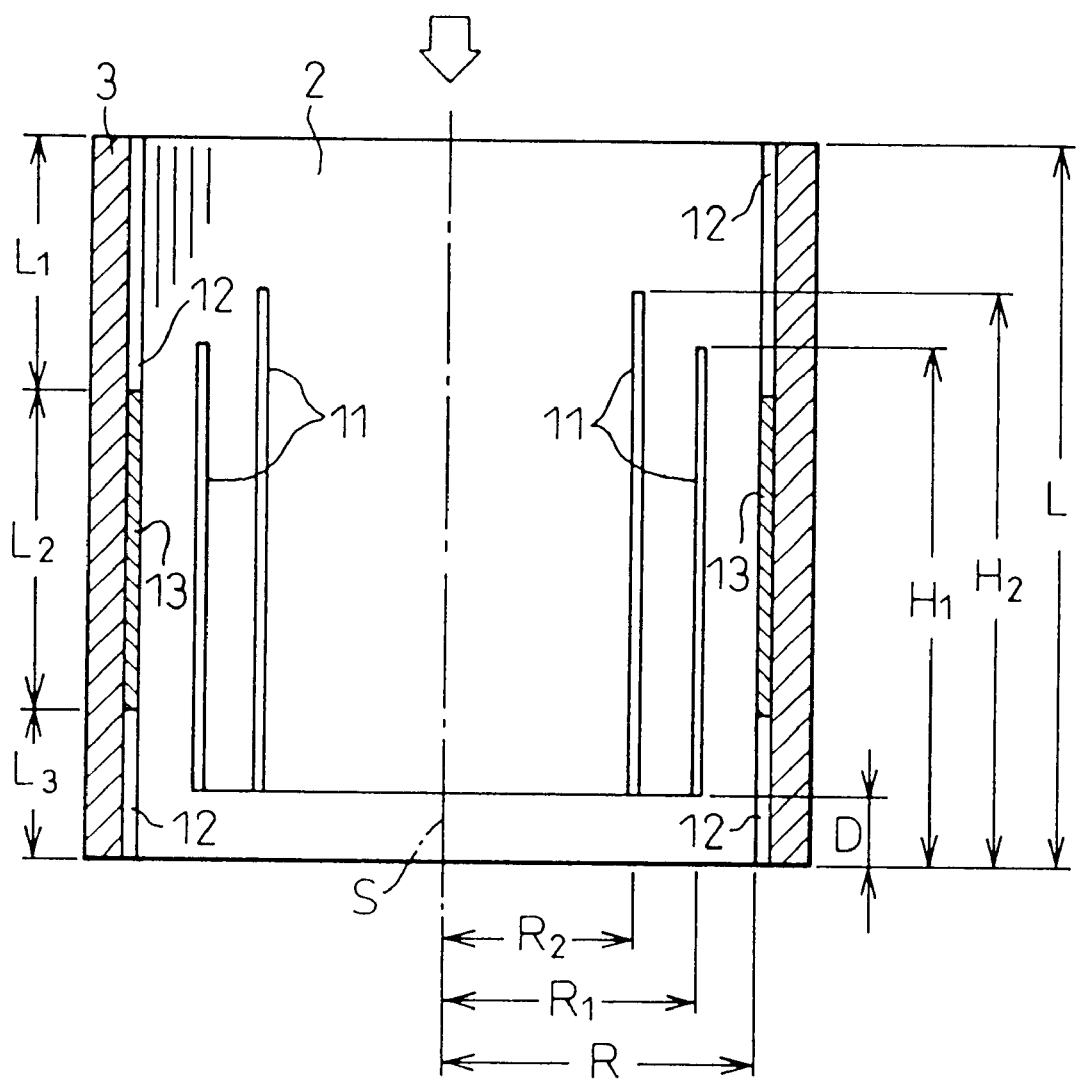
FIG. 31 is a sectional view showing still another example of the metal support in the present invention.

In the metal support of this embodiment, too, the unbonded portion 12 and the bonded portion 13 each having a predetermined length are preferably formed at the boundary between the outer periphery of the metal honeycomb body 2 and the inner periphery of the outer cylinder 3 as shown in FIG. 31. The position and the length of the bonded portion 13 are similar to those of the metal support of the embodiment shown in FIG. 27. In other words, $L_1 \leq L/3$ and $L_2 \leq L$ in FIG. 31. $L_3$ may be 0. The function of this metal support is similar to that of the metal support of the embodiment shown in FIG. 27.

When the metal support of this invention is produced, a diffusion-preventing agent is interposed into predetermined portions when the belt-like flat and corrugated foils 5 and 6 are superposed and wound with each other as shown in FIG. 2. The diffusion bonding treatment is carried out after the resulting metal honeycomb body 2 after winding is assembled into the outer cylinder 3. As a result, the portions among the contact portions between the flat foil 5 and the corrugated foil 6, at which the diffusion-preventing agent is applied, are not bonded. In consequence, the unbonded portions 11 are formed as shown in FIG. 25, and the rest of the portions are diffusion-bonded.

It is possible to use those materials which are thermally stable at the heating temperature for diffusion bonding, such as metal oxides typified by $TiO_2$ and $Al_2O_3$, or ceramic materials typified by SiC and BN, as the diffusion-preventing agent. To interpose the material between the flat foil 5 and the corrugated foil 6, the material is pulverized into powder, and after being mixed with water, the mixture is applied to the flat foil 5 or the corrugated foil 6. Alternatively, the material is formed into a sheet, and the resulting sheet is bonded or sandwiched.

Figure 32:
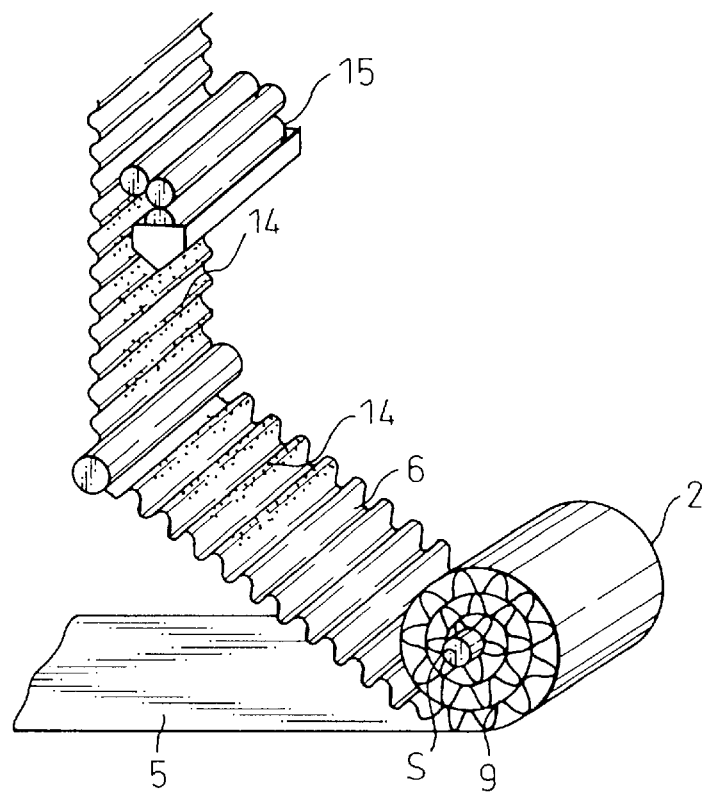
FIG. 32 is a perspective view showing a method of producing the honeycomb body of the metal support shown in FIG. 25.

FIG. 32 shows an example where the diffusion-preventing agent 14 prepared by mixing the powder described above with water is applied to the corrugated foil 6 by a roll transfer system using a coating machine 15. The diffusion-preventing agent 14 is applied to the wave peak portions of the corrugated foil 6 and, as the corrugated foil 6 is wound, the agent is interposed into the contact portions 9 with the flat foil 5. The diffusion-preventing agent 14 can be applied to only the predetermined portions by moving the transfer roll of the coating machine 15 or the corrugated foil 6.

The means for forming the bonded portion 13 and the unbonded portion 12 shown in FIG. 27 applies the brazing material to either one, or both, of the portions on the outer peripheral surface of the metal honeycomb body 2, which is to serve as the bonded portion 13 and the portions on the inner peripheral surface of the outer cylinder 3, which is to serve as the bonded portion 13, and applies the bonding-preventing agent to either one, or both, of the portions of the outer peripheral surface on the metal honeycomb body 2 to serve as the unbonded portion 12 and the portions on the inner peripheral surface of the outer cylinder 3 that are to serve as the unbonded portion 12, before the metal honeycomb body 2 is assembled into the outer cylinder 3.

After the brazing material and the diffusion-preventing agent are applied in this way, the metal honeycomb body 2 is assembled into the outer cylinder 3 and then the diffusion bonding treatment is carried out. As a result, the unbonded portion 11 is formed on the metal honeycomb body 2, and the portions applied with the brazing material are bonded at the boundary between the metal honeycomb body 2 and the outer cylinder 3, forming the bonded portion 13. However, the portions applied with the diffusion-preventing agent are not bonded, giving the unbonded portion 12.

Ordinary brazing materials can be used as the brazing material. To apply this brazing material to the outer peripheral surface of the metal honeycomb body 2 or to the inner peripheral surface of the outer cylinder 3, the brazing material in the powder form is mixed with a binder and the mixture is applied. Alternatively, after the binder is applied to the predetermined portions, the brazing material in the powder form is sprayed and the brazing material at unnecessary portions is shaken off. Still alternatively, the brazing material in the sheet form is bonded.

Figure 33:
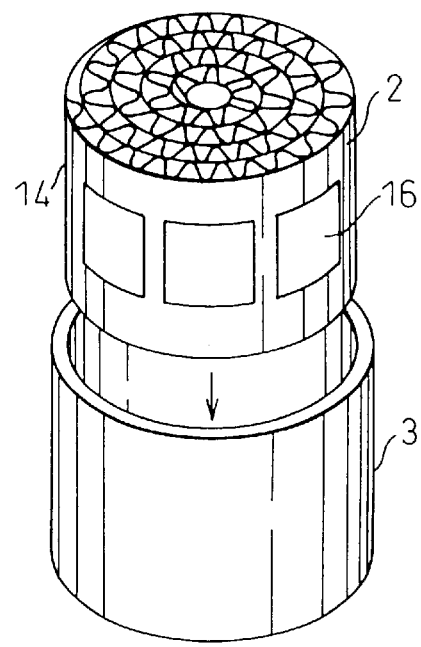
FIG. 33 is a perspective view showing another example of the method of producing the metal support in the present invention.

The diffusion-preventing agent can be applied in the same way as the means for interposing it between the flat foil 5 and the corrugated foil 6 that is described above. Coating or bonding can be employed as means for causing the brazing material to adhere. FIG. 33 shows an example where the sheet-like brazing material 16 is bonded to the outer peripheral surface of the metal honeycomb body 2, and the diffusion-preventing agent 14 is applied to the rest of the outer peripheral surface.

In the present invention, after the metal honeycomb body 2 is assembled into the outer cylinder 3, diameter reduction machining can be carried out in order to bring the outer cylinder 3 into close contact with the metal honeycomb body 2. The diffusion bonding treatment is conducted by high temperature heating in a non-oxidizing atmosphere such as in a vacuum furnace. In the case of vacuum heating, the diffusion bonding treatment is conducted at a degree of vacuum within the range of $3 \times 10^{-4}$ to $5 \times 10^{-5}$ Torr, at a temperature within the range of 1,100 to 1250° C. and for a retention time of 30 to 90 minutes.

Next, the invention which winds a shell 19 round the outer periphery of the metal honeycomb body 2 as another technology for improving durability of the metal support of the present invention will be explained with reference to FIG. 34.

Figure 34:
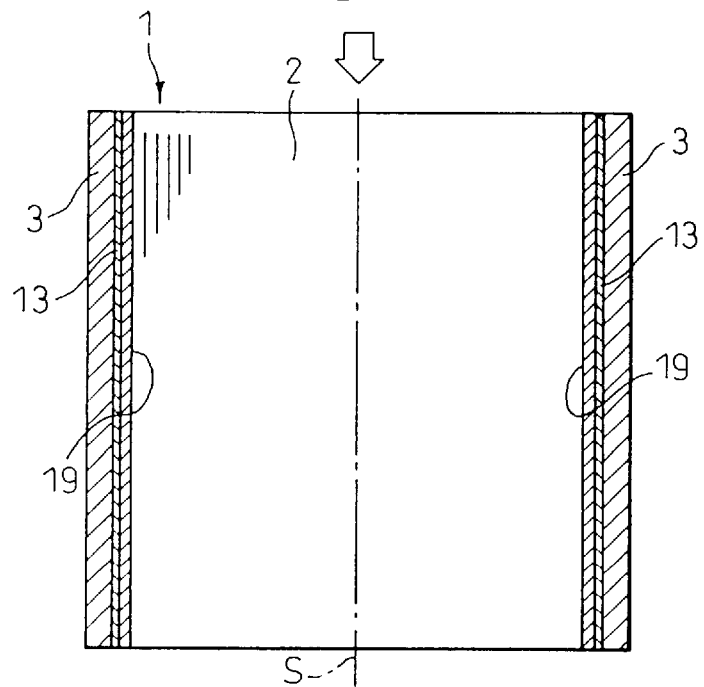
FIG. 34 is a sectional view showing still another example of the metal support in the present invention.

In FIG. 34, the shell 19 is formed by winding at least one turn the flat foil or the corrugated foil, and the flat foils or the corrugated foils constituting the shell 19 are mutually bonded. Incidentally, symbol S in FIG. 34 represents the center axis of the metal honeycomb body 2, and the exhaust gas is introduced in the direction represented by white arrow.

The flat foil or the corrugated foil for forming the shell may be integral with the flat foil 5 or the corrugated foil 6 for forming the metal honeycomb body 2, or may be separate. In the case of the former, either one of the flat foil 5 and the corrugated foil 6 is elongated in advance in a length corresponding to the formation length of the shell when the metal honeycomb body 2 is formed, as shown in FIG. 2. This elongated portion is additionally wound. In the latter case, the metal honeycomb body 2 is first formed, and then the separate flat or corrugated foil is wound additionally.

When the outermost periphery of the metal honeycomb body 2 before additional winding comprises the flat foil 5, the flat foil is additionally wound at least one turn, or the corrugated foil is additionally wound at least two turns. When the outermost periphery of the metal honeycomb body 2 before additional winding comprises the corrugated foil 6, the shell 19 is formed by winding additionally at least one turn the corrugated foil or winding additionally at least two turns the flat foil.

After the metal honeycomb body 2 having the shell 19 formed in this way is assembled into the outer cylinder 3, the contact portions between the flat foil 5 and the corrugated foil 6, that together constitute the metal honeycomb body 2, are bonded, the flat foils or the corrugated foils constituting the shell 19 are bonded with each other, and the outer peripheral surface of the shell 19 and the inner peripheral surface of the outer cylinder 3 are bonded. In this way, the metal support of this invention is formed.

The metal support of this invention includes the shell 19 round the outer periphery of the metal honeycomb body 2 as described above. Therefore, this metal support has higher durability against the cycles of rapid heating to a higher temperature and rapid cooling, than in the prior art devices. In other words, even when the stress concentrates on the portions in the proximity of the boundary due to the temperature difference between the metal honeycomb body 2 and the outer cylinder 3, the firm shell 19 formed by bonding the flat foils or the corrugated foils with each other into a unitary structure is not easily damaged. Therefore, the metal support has high durability against the deviation in the axial direction of the metal support.

Figure 35:
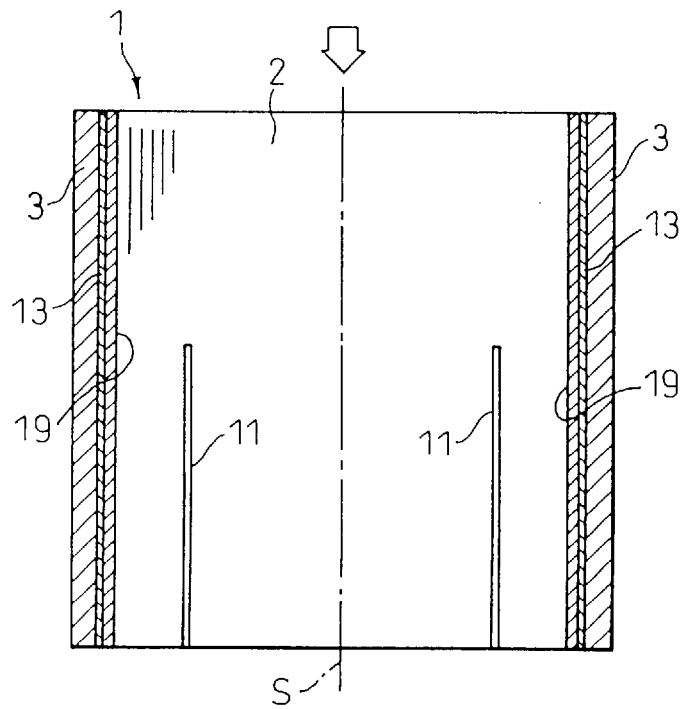
FIG. 35 is a sectional view showing still another example of the metal support in the present invention.

Next, another preferred embodiment of the metal support of the present invention is shown in the sectional view of FIG. 35. In this embodiment, the honeycomb unbonded portions 11 are formed inside the metal honeycomb body 2. As described above, the contact portions between the flat foil and the corrugated foil are not bonded at the metal honeycomb unbonded portion 11, but are bonded at other portions of the metal honeycomb body 2 by diffusion bonding. The honeycomb unbonded portion 11 is formed within the range of length, ending up at an end point, that is spaced apart from the end portion of the gas entry side of the metal honeycomb body 2, and is wound at least one turn throughout the full periphery and at least at one position.

In this preferred embodiment, the honeycomb unbonded portion 11 is formed inside the metal honeycomb body 2. Therefore, when the metal support is mounted to, and used in, the exhaust gas system of the automobile engine, etc, it has higher durability against the rapid heating—rapid cooling heat cycles due to the exhaust gas. In other words, the metal support has excellent durability against the deviation in the axial direction of the metal honeycomb body 2 owning to the firm shell 19. Moreover, the metal support can mitigate the stress concentration even when the temperature difference becomes great between the center portion in the diametric direction of the metal honeycomb body 2 and the outer peripheral portion. For, the honeycomb unbonded portion 11 allows the center axis side S to extend and contract in the direction of the center axis S with the honeycomb unbonded portion 11 as the boundary.

Still another preferred embodiment of the metal support of the present invention is shown in the sectional views of FIGS. 36 and 37. In this embodiment, the honeycomb unbonded portion 11 is formed inside the metal honeycomb body 2 and furthermore, the shell 19 is formed in such a manner as to extend from the gas exit side as the start point or from a position somewhat inward from the gas exit side. As shown in FIGS. 36 and 37, therefore, an unbonded portion 12 is formed between the honeycomb body 2 and the outer cylinder 3 on the gas entry side.

In the example shown in FIG. 37, the shell 19 is so formed as to extend from a position somewhat inward from the end face on the gas entry side, as the start point. Therefore, the end face on the gas entry side and the end face on the gas exit side have the same shape, and the problem may possibly occur in the working process up to mounting of the metal support to the exhaust gas system. In contrast, in the example shown in FIG. 36, the shell 19 is so formed as to extend from the end on the gas exit side as the start point, and the shapes of the end faces are clearly different. Therefore, the problem described above does not occur. Furthermore, the shell 19 can be formed more easily in the example of FIG. 36.

Figure 38:
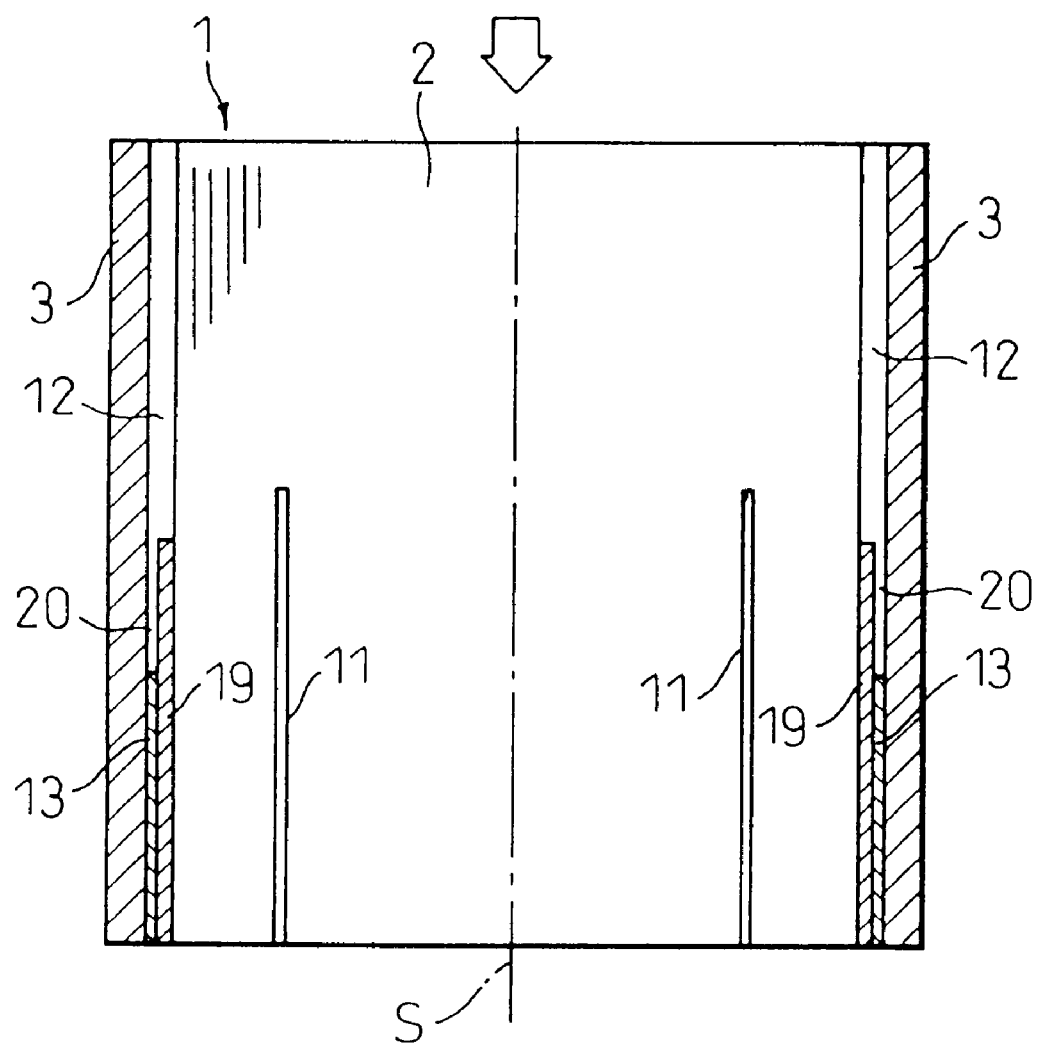
FIG. 38 is a sectional view showing still another example of the metal support in the present invention.

Next, still another preferred embodiment of the metal support of the present invention is shown in the sectional view of FIG. 38. In this embodiment, the bonded portion 13 and the boundary unbonded portion 20 are formed at the boundary between the shell 19 and the outer cylinder 3. The boundary unbonded portion 20 is so formed as to extend from the end portion on the gas entry side of the boundary as the start point, and the bonded portion 13 is so formed as to extend with the gas exit side as the start point. Though the example of FIG. 38 shows the application to the example of FIG. 36, it may be applied to the metal support of the examples shown in FIGS. 34, 35 and 37.

Because the boundary unbonded portion 20 is formed between the shell 19 and the outer cylinder 3, the thermal stress concentration between the shell 19 and the outer cylinder 13 can be mitigated, and durability can be further improved. At this time, the metal honeycomb body 2 can extend and contract to and from the gas entry side with respect to the outer cylinder 3 because the clearance exists between the shell 19 and the outer cylinder 3. In consequence, a higher effect can be obtained when the boundary unbonded portion 20 is formed on the gas entry side.

Figure 41:
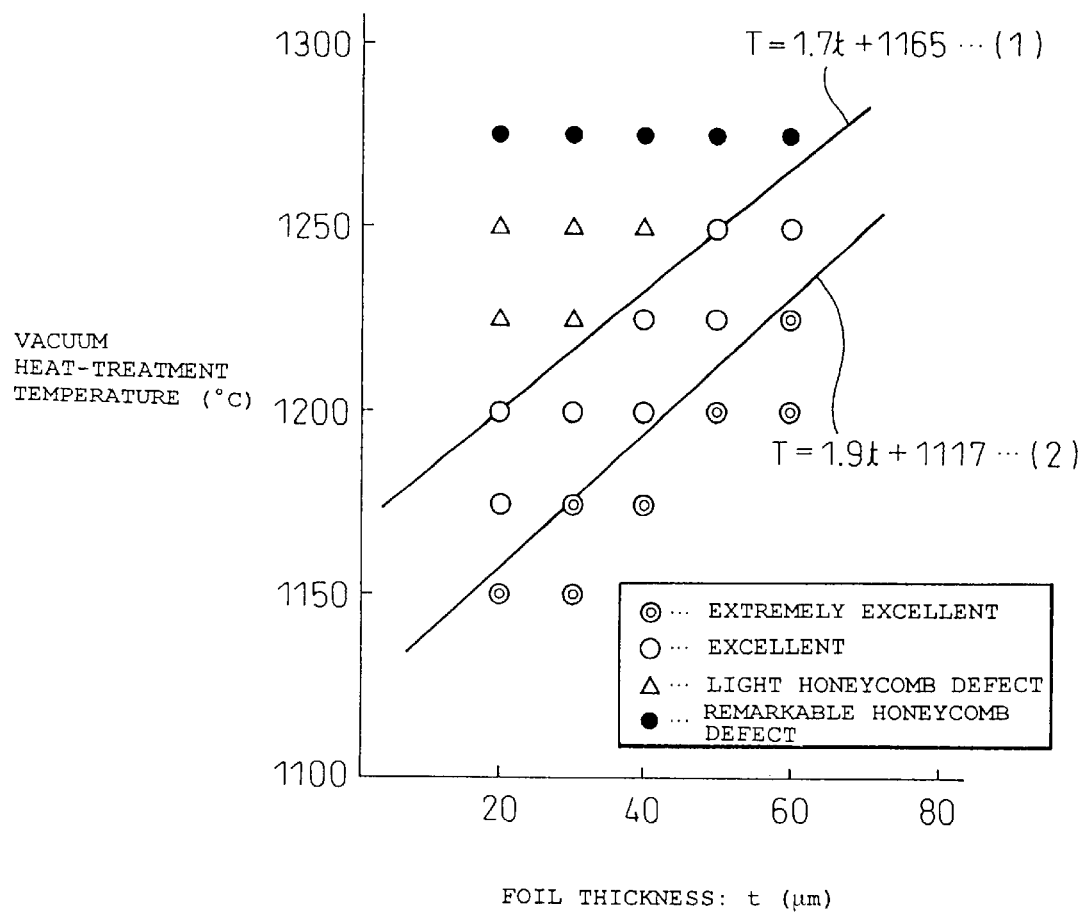
FIG. 41 is a graph for explaining the relation between a vacuum heat-treatment temperature and a foil thickness in the metal support in the present invention.

Diffusion bonding in this embodiment is made at a temperature within the range of 1,100 to 1,250° C. and at a vacuum of about $10^{-4}$ Torr in the same way as in the inventions described above. However, diffusion bonding is preferably carried out at a temperature (TOC) within the range of the following formula (2) in accordance with the foil thickness (t $\mu$m). In other words, when the foil thickness is great, a higher temperature is permitted to the upper limit of the vacuum heat-treatment temperature and when the foil thickness is small, it is limited to a lower temperature as shown in FIG. 41. According to the condition of the formula (2), the metal honeycomb body 2 of the metal support has improved heat-resistance and oxidation resistance. Incidentally, the condition of the formula (3) provides a more stabilized and improved metal support.

$$1{,}100 \leq T \leq 1.7 \times t + 1{,}165 \tag{2}$$

$$1{,}100 \leq T \leq 1.9 \times t + 1{,}117 \tag{3}$$

The method of forming the unbonded portion 11 inside the metal honeycomb body 11 is the same as the method described above.

Figure 39:
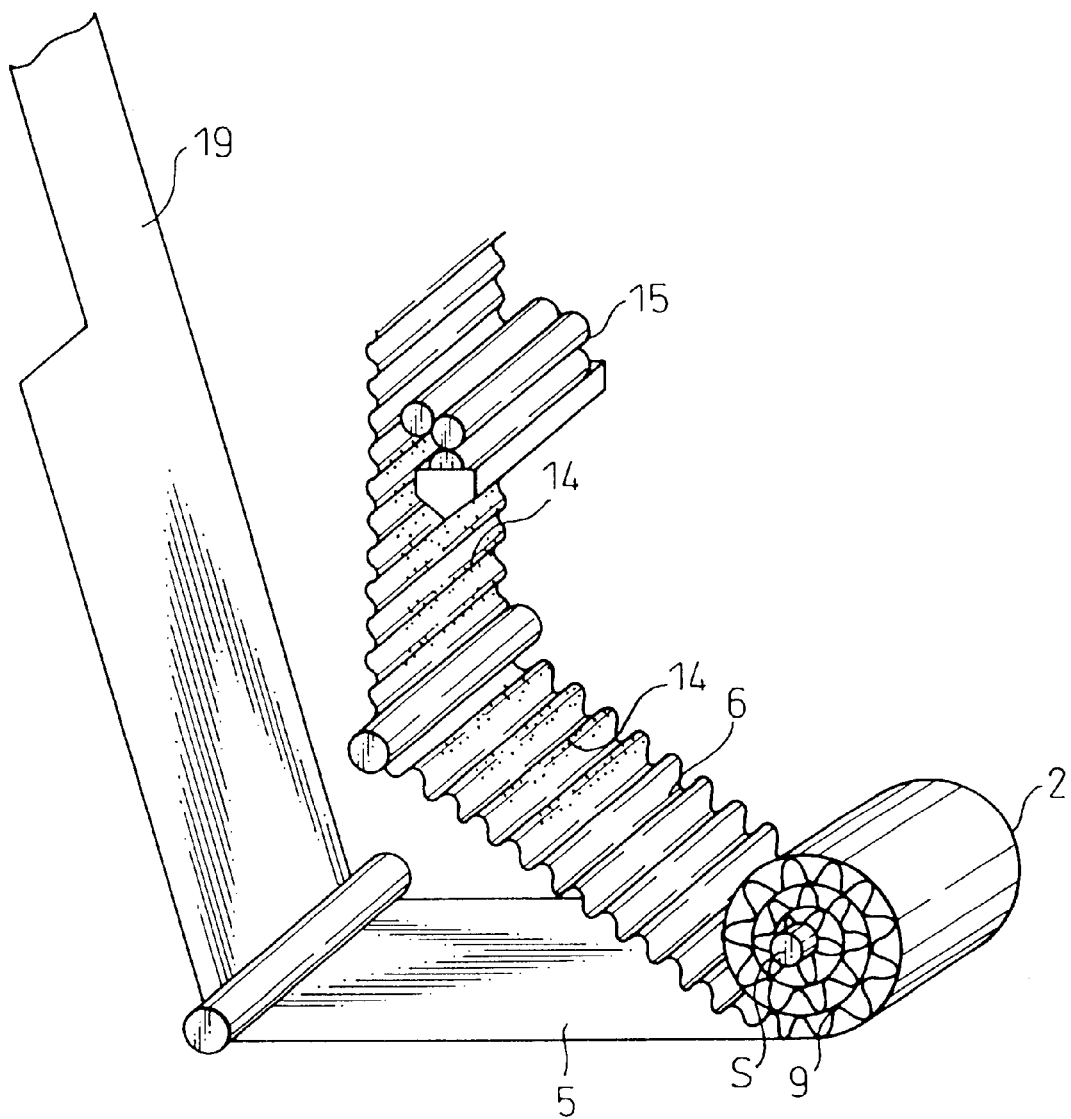
FIG. 39 is a perspective view showing a method of producing the honeycomb body of the metal support shown in FIG. 36.

A concrete example of the method of disposing the shell 19 on the outer periphery of the metal honeycomb body 2 will be explained with reference to FIG. 39. In this example, the shell 19 uses the flat foil that is integral with the flat foil 5 forming the metal honeycomb body 2. The diffusion-preventing agent 14 is applied to the peaks of the corrugated foil 6 by the coating machine 15, and is interposed at predetermined portions of the contact portions 9 with the flat foil 5 in order to form the honeycomb unbonded portions 11. The flat foil 5 is elongated by the distance necessary for forming the shell 19, and is cut off on its gas entry side to reduce its width and to form a narrow shell 19. To form the shell 19 for the metal support shown in FIG. 37, the flat foil for forming the shell is cut off from both ends in the width-wise direction. Similarly, the shell 19 can be formed by elongating the corrugated foil 6 by the distance necessary for forming the shell, and by then winding the elongated portion.

In still another preferred embodiment of the present invention, the bonded portion 13 and the boundary unbonded portion 20 are formed by applying the diffusion-preventing agent to either one, or both of the predetermined portion of the outer peripheral surface of the shell 19 and to the predetermined portion of the inner peripheral surface of the outer cylinder, and by applying the brazing material to either one, or both, of another predetermined portion of the shell 19 and another predetermined portion of the outer cylinder 3, before the metal honeycomb body 2 having the shell 19 formed thereon is assembled into the outer cylinder 3.

Figure 40:
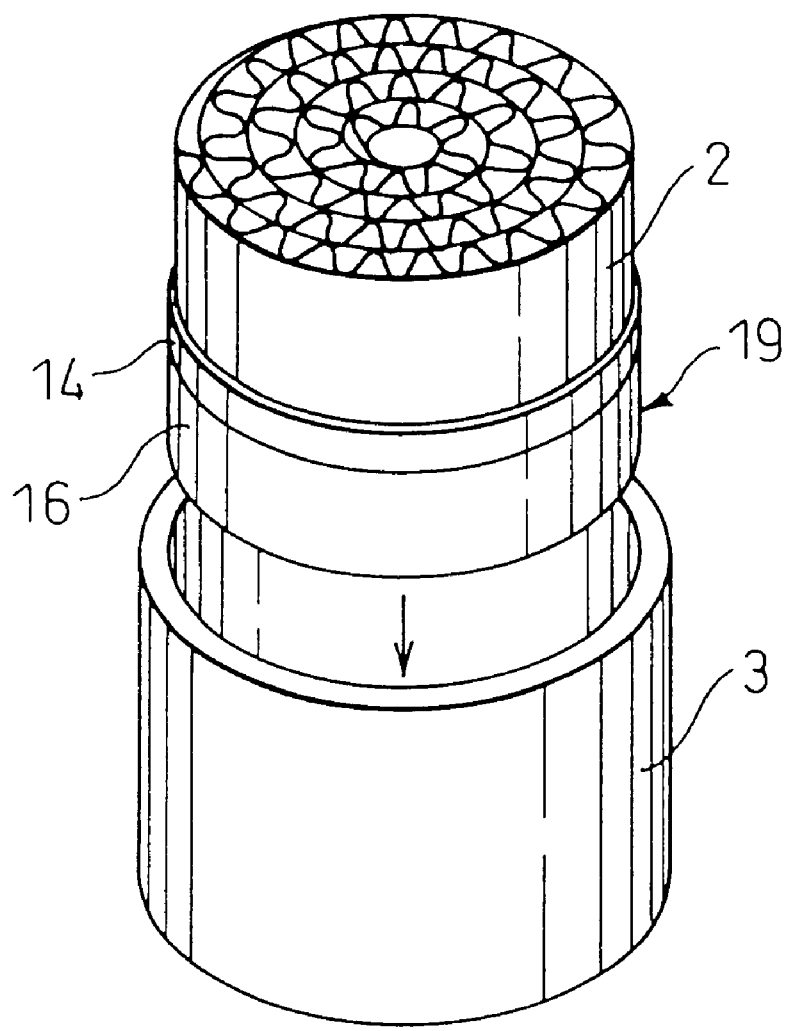
FIG. 40 is a perspective view showing the method of producing the metal support by inserting the honeycomb body produced in FIG. 39 into an outer cylinder.

Its concrete example is shown in FIG. 40. The shell 19 is formed on the gas exit side of the metal honeycomb body 2. After the diffusion-preventing agent 14 is applied to the gas entry side of the honeycomb body 2 while the brazing material 16, to the gas exit side, the honeycomb body 2 is assembled into the outer cylinder 3. The diffusion bonding treatment is then carried out. In consequence, the boundary unbonded portion 20 is formed at the portion to which the diffusion-preventing agent 14 is applied, while the bonded portion 13 is formed at the portion to which the brazing material 16 is applied. The diffusion-preventing material 14 and the brazing material 16 may be applied to the inner surface of the outer cylinder 3, or may be applied to both of the outer surface of the shell 19 and the inner surface of the outer cylinder 3.

In the method of the present invention, the thickness of the shell 19 is at least 50 $\mu$m, and is preferably from 100 to 500 $\mu$m. The thickness can be adjusted by adjusting the number of turns in accordance with the thickness of the flat foil or the corrugated foil, when the metal foil for forming the honeycomb body is elongated and wound, or in accordance with the thickness of the flat foil or the corrugated foil that is separately wound. Preferably, further, the flat foils or the corrugated foils that form the shell 19 are bonded mutually by solid phase diffusion bonding. After the metal honeycomb 2 having the shell 19 formed thereon is assembled into the outer cylinder, the assembly is heated to a high temperature in a non-oxidizing atmosphere such as inside a vacuum furnace. In this way, the contact portions between the flat foil and the corrugated foil forming the metal honeycomb body 2 and the flat foils or the corrugated foils forming the shell 19 can be bonded mutually by solid phase diffusion bonding. Brazing between the shell 19 and the outer cylinder 3 is effected at this time simultaneously. The heat-treatment condition for this solid phase diffusion bonding may be the same as that of the aforementioned technology for disposing the unbonded portion inside the honeycomb body.

The description given above explains the technologies for improving the metal honeycomb body for the catalyst converter used for purification of the exhaust gas. When any one of these technologies, or the their combination, is used, solid phase diffusion bondability of the metal foils forming the metal honeycomb body and engine durability can be drastically improved. The present invention has thus been explained mainly about the technology of producing the metal honeycomb body by superposing and winding together the flat foil and the corrugated foil. However, the present invention naturally includes within its scope the case where the metal foils are alternately laminated to form the metal honeycomb body.

EXAMPLES

Example 1

A flat foil and a corrugated foil (having a peak height of 1.25 mm and processed into a pseudo-sine curve having a pitch of 2.5 mm), each having a width of 120 mm and consisting of a high heat-resistant ferrite type stainless steel (5%Al—20%Cr—Fe) having a foil thickness of 50 $\mu$m (A foil), 40 $\mu$m (B foil), 35 $\mu$m (C foil), 30 $\mu$m (D foil) and 20 $\mu$m (E foil), were superposed with each other and wound while a tension of about 5 kg was imparted to the flat foil, providing a cylindrical honeycomb body having a length of 120 mm. The honeycomb body was then fitted into an outer cylinder having an inner diameter of 86 mm, a thickness of 1.5 mm and a length of 120 mm, and was bonded by solid phase diffusion bonding to give a metal support. The diffusion bonding condition between the flat foil and the corrugated foil for forming the honeycomb body was as follows.

heating temperature: 1,120° C.

degree of vacuum: 1.4×10$^{-4}$ Torr retention time: 60 minutes

Figure 42:
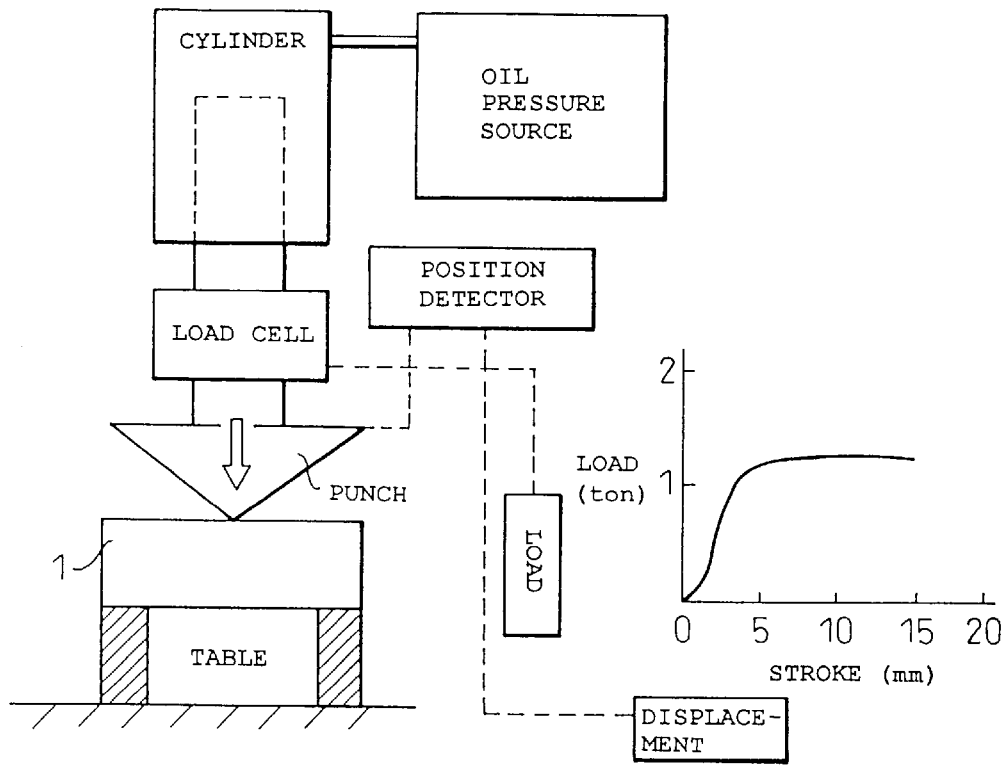
FIG. 42 is a block diagram of a push tester of the metal support.
Figure 43A:
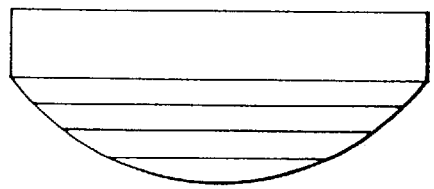
Figure 43B:
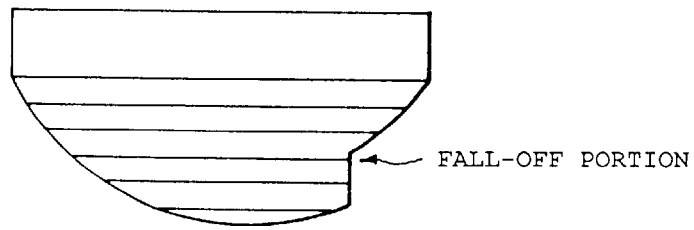

In order to examine solid phase diffusion bondability after the treatment, each of the metal supports was sliced into a ring shape having a thickness of 20 mm, and a push test of each metal support 1 was carried out using a conical punch and a base. FIG. 42 shows the outline of this push test, and Table 1 shows the test results. It can be seen from Table 1 that when the A foil and the B foil were used for both foils, bonding between the foils was not appropriate, and a fall-off portion occurred during the push test as shown in FIG. 43($b$). In contrast, the metal supports using the C foil, the D foil or the E foil for at least one of both foils retained the honeycomb shape even by the push test as shown in FIG. 43($a$). It was thus confirmed that solid phase diffusion bondability was excellent. Incidentally, when the contact portions of each foil was observed in magnification, enlargement of the contact portions could be observed in the C foil, the D foil and the E foil.

A heat cycle test (1,000 cycles between 800 and 60° C.) was carried out for each metal support using the foils having a thickness of 50 $\mu$m and 30 $\mu$m, by mounting the metal support to the exhaust gas system of a 200-cc gasoline engine in order to examine engine durability. In the metal support having a foil thickness of 50 $\mu$m, deviation of the honeycomb core occurred in at 70 cycles and the test was cut off. In contrast, in the metal support having the foil thickness of 30 $\mu$m, the bonding condition of the honeycomb body was excellent even after 1,000 cycles, and this metal support passed the engine durability test.

TABLE 1

| Corrugated foil | A foil | B foil | C foil | D foil | E foil | A foil | A foil | A foil | B foil | C foil | D foil | D foil | E foil |
|---|---|---|---|---|---|---|---|---|---|---|---|---|---|
| Flat foil | A foil | B foil | C foil | D foil | E foil | B foil | C foil | D foil | A foil | A foil | A foil | E foil | D foil |
| Maximum load | 75 kg | 100 kg | 150 kg | 120 kg | 85 kg | 105 kg | 160 kg | 140 kg | 100 kg | 140 kg | 130 kg | 95 kg | 90 kg |
| Presence of fall-off | Yes | Yes | No | No | No | Yes | No | No | Yes | No | No | No | No |
| Judgement | X | X | ◯ | ◯ | ◯ | X | ◯ | ◯ | X | ◯ | ◯ | ◯ | ◯ |

Remarks)
A foil: 50 $\mu$m,
B foil: 40 $\mu$m,
C foil: 35 $\mu$m,
D foil: 30 $\mu$m,
E foil: 20 $\mu$m

Example 2

Metal supports having an outer diameter of 100 mm and a length of 100 mm were produced by using the following materials and were subjected to the durability test.

Flat foil:
20Cr—5Al—Fe ferrite type stainless steel foil, 50 μm-thick; 20 μm thick and 100 mm wide for metal supports 7 and 9

Corrugated foil:
Produced by corrugating the flat foil described above; peak height 1.25 mm and pitch 2.54 mm Outer cylinder:
18Cr—8Ni heat-resistant stainless steel, thickness 1.5 mm, length 100 mm and outer diameter 102 mm (1) Metal Support 1 (Prior Art Example)

Surface coarseness of flat foil and corrugated foil: Rac=0.35 mm,

Surface shape and condition: PPI=80

While a back-tension of 10 kgf was applied to the flat foil, the flat foil and the corrugated foil were wound, and a metal honeycomb body having an outer diameter of 100 mm was produced. After a brazing material was applied to the entire inner surface of the outer cylinder, the metal honeycomb body was fitted into the outer cylinder. Thereafter, heat-treatment was carried out at a high temperature of 1,250° C. and high vacuum of $10^{-4}$ Torr for 90 minutes to produce the metal support.

(2) Metal Support 2 (Example of This Invention)

Surface coarseness of both flat and corrugated foils: Rac=0.10 μm,

Surface shape and condition: PPI=80

While a back-tension of 10 kgf was imparted to the flat foil, the flat foil and the corrugated foil were wound, giving a metal honeycomb body having an outer diameter of 100 mm. After the brazing material was applied to the entire inner surface of the outer cylinder, the metal honeycomb body was fitted into the outer cylinder. Thereafter, heat-treatment was carried out at a high temperature of 1,250° C. and high vacuum of $10^{-4}$ Torr for 90 minutes to give a metal support.

(3) Metal Support 3 (Example of This Invention)

Surface coarseness of both flat and corrugated foils: Rac=0.35 μm,

Surface shape and condition: PPI=500

While a back-tension of 10 kgf was imparted to the flat foil, the flat foil and the corrugated foil were wound to give a metal honeycomb body having an outer diameter of 100 mm. After a brazing material was applied to the entire inner surface of the outer cylinder, the metal honeycomb body was fitted into the outer cylinder. Thereafter, heat-treatment was carried out at a thigh temperature of 1,250° C. and high vacuum of $10^{-4}$ Torr for 90 minutes to give a metal support.

(4) Metal Support 4 (Example of This Invention)

Surface coarseness of both flat and corrugated foils: Rac=0.10 μm,

Surface shape and condition: PPI=500

While a back-tension of 10 kgf was imparted to the flat foil, the flat foil and the corrugated foil were wound to give a metal honeycomb body having an outer diameter of 100 mm. After a brazing material was applied to the entire inner surface of the outer cylinder, the metal honeycomb body was fitted into the outer cylinder. Thereafter, heat-treatment was carried out at a high temperature of 1,250° C. and high vacuum of $10^{-4}$ Torr for 90 minutes to give a metal support.

(5) Metal Support 5 (Example of This Invention)

Surface coarseness of both flat and corrugated foils: Rac=0.10 μm,

Surface shape and condition: PPI=100

While a back-tension of 10 kgf was imparted to the flat foil, the flat foil and the corrugated foil were wound to give a metal honeycomb body having an outer diameter of 100 mm. After a brazing material was applied to the entire inner surface of the outer cylinder, the metal honeycomb body was fitted into the outer cylinder. Thereafter, heat-treatment was carried out at a high temperature of 1,250° C. and high vacuum of $10^{-4}$ Torr for 90 minutes to give a metal support.

(6) Metal Support 6 (Example of This Invention)

Surface coarseness of both flat and corrugated foils: Rac=0.10 μm,

Surface shape and condition: PPI=500

While a back-tension of 10 kgf was imparted to the flat foil, the flat foil and the corrugated foil were wound to give a metal honeycomb body having an outer diameter of 100 mm. After a brazing material was applied to the entire inner surface of the outer cylinder, the metal honeycomb body was fitted into the outer cylinder. Thereafter, heat-treatment was carried out at a high temperature of 1,1500° C. and high vacuum of $10^{-4}$ Torr for 60 minutes to give a metal support.

(7) Metal Support 7 (Example of This Invention)

Thickness of flat and corrugated foils: 20 μm

A metal support was produced by heat-treatment at 1,100° C. for 30 minutes. The other conditions were the same as those of the metal support 6.

(8) Metal Support 8 (Example of This Invention)

Surface coarseness of both flat and corrugated foils: Rac=0.10 μm,

Surface shape and condition: PPI=500 While a back-tension of 10 kgf was imparted to the flat foil, the flat foil and the corrugated foil were wound by applying alumina in a length corresponding to one turn length so that $R_1$ attained 40 mm and $H_1$ attained 70 mm in FIG. 28, to give a metal honeycomb having an outer diameter of 100 mm. A brazing material was applied to the portion $L_2$ so that $L_1$ became 60 mm and $L_2$ attained 40 mm. The metal honeycomb body was fitted into the outer cylinder and heat-treatment was carried out at a high temperature of 1,150° C. and high vacuum of $10^{-4}$ Torr for 60 minutes to give a metal support.

(9) Metal Support 9 (Example of This Invention)

Thickness of flat and corrugated foils: 20 μm A heat-treatment was carried out at 1,150° C. for 40 minutes with the other conditions being the same as those of the metal support 8.

The resulting metal support 8 had the shape shown in FIG. 28. Namely, the unbonded portion 11 at which the flat foil and the corrugated foil were not bonded and which had a diameter $R_1$=40 mm and a length $H_1$=70 mm for one turn was formed inside the metal honeycomb body 2. The metal honeycomb body 2 and the outer cylinder 3 were bonded at the bond portion 13 having a length $L_2$ 40 mm, and the portion of $L_1$=60 mm above the bond portion 13 was another unbonded portion 12.

The cold push test was conducted for each of the Prior Art Example and the metal supports 1 to 7 of the present invention. Since deviation occurred in the metal support 1 of the prior art example, this metal support was rejected. However, no problem occurred at all in the metal supports 2 to 6 of the examples of the present invention, and they were approved. The cold push test was conducted by placing each metal support on the bed as shown in FIG. 42, pushing it from above by a punch equipped with a load cell, and recording the stroke-v-load curve.

The metal supports 8 and 9 of the examples shown in FIG. 28, each having a full bonded structure and a slit, were mounted to the exhaust system of the gasoline engine. A cooling-heating durability test was carried out with one cycle comprising heat at 950° C. for 10 minutes and cooling at 150° C. for 10 minutes. These metal supports were not damaged even when 900 cycles were imparted, and were approved.

Exhaust gas purification performance of the metal supports 7 and 9 could be improved by about 10% in comparison with the metal supports 6 and 8.

Example 3

A metal support having an outer diameter of 100 mm and a length of 100 mm was produced using the following materials, and the durability test was conducted:

Flat foil: 20Cr—5Al—Fe ferrite type stainless steel foil, 50 μ-thick, but foils 4 and 6 had a thickness of 20 μm and a width of 100 mm.

Corrugated foil: the same flat foil was corrugated; peak height 1.25 mm and pitch 2.54 mm, Outer cylinder: 18Cr—8Ni—Fe heat-resistant stainless steel, 1.5 mm thick, 100 mm long and 102 mm in outer diameter.

(1) Metal Support 1 (Prior Art Example)

Shape of corrugation: Side surface in the longitudinal direction described a sine curve as shown in FIG. 22(*b*).

While a back-tension of 10 kgf (that is, 1.0 kgf/cm) was applied to the flat foil, the flat foil and the corrugated foil were wound to produce a metal honeycomb body having an outer diameter of 100 mm. The contact width between the flat foil and the corrugated foil in the length-wise direction was 0.1 mm=2t (twice the foil thickness) (see FIG. 21). After a brazing material was applied to the entire inner surface of the outer cylinder, the metal honeycomb body was fitted into the outer cylinder. Thereafter, heat-treatment was carried out at a high temperature of 1,250° C. and high vacuum of $10^{-4}$ Torr for 90 minutes.

(2) Metal Support 2 (Example of This Invention)

Shape of corrugation: Side surface in the longitudinal direction described a trapezoidal curve shown in FIG. 22(*a*).

While a back-tension of 10 kgf (that is, 1.0 kgf/cm) was applied to the flat foil, the flat foil and the corrugated foil were wound to produce a metal honeycomb body having an outer diameter of 100 mm. The contact width W in the length-wise direction of the flat foil and the corrugated foil was 0.5 mm=lot (ten times the foil thickness). After a brazing material was applied to the entire inner surface of the outer cylinder, this metal honeycomb body was fitted into the outer cylinder. Thereafter, heat-treatment was conducted at a high temperature of 1,250° C. and high vacuum of $10^{-4}$ Torr for 90 minutes.

(3) Metal Support 3 (Example of This Invention)

Shape of corrugation: Side surface in the longitudinal direction described a trapezoidal curve shown in FIG. 22(*a*).

While a back-tension of 10 kgf (that is, 1.0 kgf/cm) was imparted to the flat foil, the flat foil and the corrugated foil were wound to produce a metal honeycomb body having an outer diameter of 100 mm. The width W of the contact portion of the flat foil and the corrugated foil in the length-wise direction was 0.5 mm=10 t (ten times the foil thickness). After a brazing material was applied to the entire inner surface of the outer cylinder, the metal honeycomb body was fitted into the outer cylinder. Thereafter, heat-treatment was conducted at a high temperature of 1,225° C. and high vacuum of $10^{-4}$ Torr for 90 minutes.

(4) Metal Support 4 (Example of This Invention)

Thickness of both flat and corrugated foils: 20 μm

The metal support was produced by the heat-treatment at 1,150° C. for 60 minutes. The rest of the conditions were the same as those of the metal support 3.

(5) Metal Support 5 (Example of This Invention)

Shape of corrugated foil: The side surface in the lengthwise direction described a trapezoidal curve shown in FIG. 22(*a*).

While a back-tension of 10 kgf (that is, 1.0 kgf/cm) was imparted to the flat foil and while alumina was applied in a length corresponding to one turn, the flat foil and the corrugated foil were wound into the shape shown in FIG. 28, that is, in such a manner as to attain $R_1$=40 mm and $H_1$=70 mm. In this way, a metal honeycomb body having an outer diameter of 100 mm was produced. The width W of the contact portion of the flat foil and the corrugated foil in the length-wise direction was 0.5 mm=10 t (ten times the foil thickness). A brazing material was applied to the inner surface of the outer cylinder in such a manner as to attain $L_1$=60 mm and $L_2$=40 mm. After alumina was applied to the portion 11, the metal honeycomb body was fitted into the outer cylinder. Thereafter, heat-treatment was conducted at a high temperature of 1,225° C. and high vacuum of $10^{-4}$ Torr for 60 minutes to produce the metal support.

(6) Metal Support 6 (Example of This Invention)

Length of both flat and corrugated foils: 20 μm

Heat-treatment was conducted at 1,200° C. for 40 minutes to produce a metal support. The rest of the conditions were the same as those of the metal support 5.

When the cold push test shown in FIG. 42 was applied to the metal support of the prior art example and to the metal supports 1 to 4 of the present invention, the metal support 1 of the prior art example was rejected because deviation occurred. However, the metal supports 2, 3 and 4 of the examples of the present invention had no problem at all and were approved.

When the metal supports 5 and 6 of the examples of the present invention, each having the full bonding structure with the slit shown in FIG. 28, were mounted to the exhaust system of the gasoline engine and were then subjected to a severe cooling-heating test with one cycle comprising heating to 950° C. for 10 minute and cooling to 150° C. for 10 minutes, these metal supports were not damaged and were approved.

Exhaust gas purification performance of the metal supports 4 and 6 could be improved by about 11% in comparison with that of the metal supports 3 and 5.

Example 4

A metal support having an outer diameter of 100 mm and a length of 100 mm was produced using the following materials and was subjected to the durability test.

Flat foil: 20Cr—5Al—Fe ferrite type stainless steel, 50 μm thick and 100 mm wide Corrugated foil: produced by corrugating the same flat foil, peak height 1.25 mm and pitch 2.54 mm Outer cylinder: 18Cr—8Ni—Fe heat-resistant stainless steel, 1.5 mm thick, 100 mm long and outer diameter of 102 mm (1) Metal Support 1 (Prior Art Example)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent was not interposed during winding. After the brazing material was applied to the entire inner surface of the outer cylinder, the metal honeycomb body was fitted into the outer cylinder. Thereafter, diffusion bonding heat-treatment was conducted at a high temperature of 1,250° C. and high vacuum of $10^{-4}$ Torr to produce the metal support.

(2) Metal Support 2 (Prior Art Example)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent 14 was applied to a predetermined range of the corrugated foil 6 during winding as shown in FIG. 32 so that an unbonded portion 11 having $R_1$=40 mm and $H_1$=70 mm in FIG. 25 could be formed. The unbonded portion 11 was formed at one position in such a manner as to extend round one periphery of the flat and corrugated foils. The diffusion-preventing agent 14 used $Al_2O_3$ powder. After a brazing material was applied to the entire inner peripheral surface of the outer cylinder, the metal honeycomb body was fitted into the outer cylinder, and diffusion bonding heat-treatment was conducted at a high temperature of 1,250° C. and high vacuum of $10^{-4}$ Torr to produce the metal support.

(3) Metal Support 3 (Prior Art Example)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent was not interposed during winding. A brazing material was applied to the position $L_2$ on the inner peripheral surface of the outer cylinder in such a fashion as to attain $L_1$=60 mm and $L_2$=40 mm in FIG. 28. The diffusion-preventing agent, $Al_2O_3$, was applied to the $L_1$ position, and then the metal honeycomb body was fitted into the outer cylinder. Thereafter, diffusion bonding treatment was conducted at a high temperature of 1,250° C. and high vacuum of $10^{-4}$ Torr for 90 minutes to produce the metal support.

(4) Metal Support 4 (Prior Art Example)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent 14 was applied to a predetermined range of the corrugated foil 6 during winding as shown in FIG. 25 in such a fashion as to form a unbonded portion 11 having $R_1$=40 mm and $H_1$=70 mm in FIG. 27. The unbonded portion 11 was formed at one position in a length corresponding to one periphery of the flat foil and the corrugated foil. The diffusion-preventing agent 14 used $Al_2O_3$ powder.

A brazing was applied to the $L_2$ position in such a fashion as to attain $L_1$=20 mm, $L_2$=40 mm and $L_3$=40 mm in FIG. 27. After $Al_2O_3$ was applied as the diffusion-preventing agent to the $L_1$ and $L_3$ positions, the metal honeycomb body was fitted into the outer cylinder. Thereafter, diffusion bonding treatment was conducted at a high temperature of 1,250° C. and high vacuum of $10^{-4}$ Torr for 90 minutes to produce the metal support.

(5) Metal Support 5 (Prior Art Example)

While a back-tension of 10 kgf was imparted to the flat foil, the flat foil and the corrugated foil were wound and a metal honeycomb body having an outer diameter of 100 mm (R=50 mm in FIG. 25). A diffusion-preventing agent 14 was applied to a predetermined range of the corrugated foil 6 during winding as shown in FIG. 32 so that an unbonded portion 11 having $R_1$=40 mm and $H_1$=50 mm could be formed in FIG. 28. The unbonded portion 11 was formed at one position in a length of one circumference of the flat foil and the corrugated foil. The diffusion-preventing agent 14 used $Al_2O_3$ powder.

A brazing material was applied to the $L_2$ position of the inner periphery of the outer cylinder in such a fashion as to attain $L_1$=60 mm and $L_2$=40 mm in FIG. 28. After $Al_2O_3$ was applied as the diffusion-preventing agent to the $L_1$ position, the metal honeycomb body was fitted into the outer cylinder. Thereafter, the diffusion bonding heat-treatment was conducted at a high temperature of 1,250° C. and high vacuum of $10^{-4}$ Torr for 90 minutes to produce the metal support.

(6) Metal Support 6 (Prior Art Example)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent 14 was applied to a predetermined range of the corrugated foil 6 during winding as shown in FIG. 32 so that an unbonded portion 11 having $R_1$=20 mm and $H_1$=70 mm could be formed in FIG. 28. The diffusion-preventing agent 14 used $Al_2O_3$ powder.

A brazing material was applied to the $L_2$ position in such a fashion as to attain $L_1$=60 mm and $L_2$=40 mm in FIG. 28, and $Al_2O_3$ was applied as the diffusion-preventing agent to the $L_1$ position. The metal honeycomb body was then fitted into the outer cylinder. Thereafter, diffusion bonding treatment was conducted at a high temperature of 1,250° C. and high vacuum of $10^{-4}$ Torr to produce a metal support.

(7) Metal Support 7 (Example of This Invention)

While a back-tension of 10 kgf was imparted to the flat foil, the flat foil and the corrugated foil were wound and a metal honeycomb body having an outer diameter of 100 mm (R=50 mm in FIG. 25) was produced. A diffusion-preventing agent 14 was applied to a predetermined range of the corrugated foil 6 during winding as shown in FIG. 32 so that an unbonded portion 11 having an $R_1$=40 mm and $H_1$=70 mm could be formed in FIG. 28. The unbonded portion 11 was formed at one position in a length corresponding to one periphery of the flat and corrugated foils. The diffusion-preventing agent 14 used $Al_2O_3$ powder.

A brazing material was applied to the $L_2$ position on the inner periphery of the outer cylinder in such a fashion a to attain $L_1$=60 mm and $L_2$=40 mm in FIG. 28, and $Al_2O_3$ was applied as a diffusion-preventing agent to the $L_1$ position. The metal honeycomb body was then fitted into the outer cylinder. Thereafter, diffusion bonding treatment was conducted at a high temperature of 1,250° C. and high vacuum of $10^{-4}$ Torr for 90 minutes to produce a metal support.

(8) Metal Support 8 (Example of This Invention)

A honeycomb body comprising the flat foil and the corrugated foil each having a foil thickness of 20 µm was diffusion-bonded at 1,150° C. for 90 minutes. The rest of conditions were the same as those of the metal support 7.

(9) Metal Support 9 (Prior Art Example)

Figure 44:
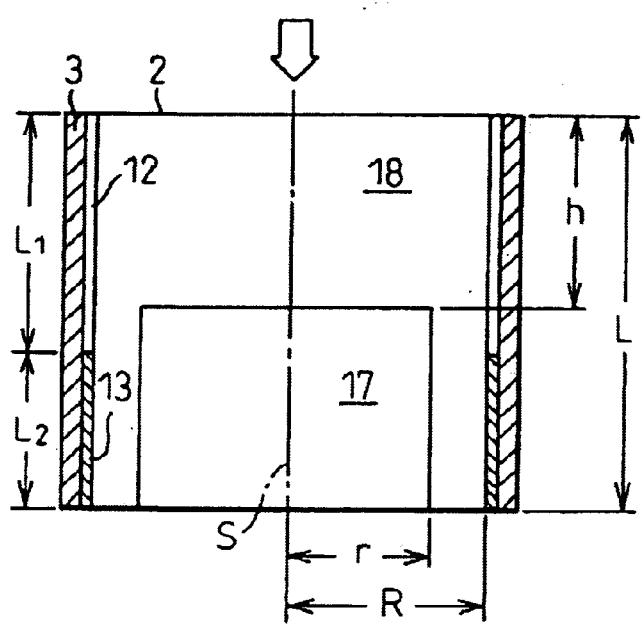
FIG. 44 is a sectional view showing an example of the metal support according to the prior art.

While a back-tension of 10 kgf was imparted to the flat foil, the flat foil and the corrugated foil were wound to produce a metal honeycomb body having an outer diameter of 100 mm (R=50 mm in FIG. 44). A binder was applied in place of the diffusion-preventing agent 14 to the corrugated foil 6 during winding as shown in FIG. 32. The application range was from one of the ends as a gas entry side to a width of 50 mm so that h=50 mm could be satisfied within the region of r≦40 mm in FIG. 44, and was the full width range within the region of 40 mm≦r≦50 mm. Thereafter, a brazing material in the powder form was sprayed and was allowed to adhere to the binder adhering portion.

A brazing material was applied to the $L_2$ position in such a fashion as to attain $L_1$=60 mm and $L_2$=40 mm in FIG. 44, and $Al_2O_3$ was applied as a diffusion-preventing agent to the $L_1$ position. The metal honeycomb body was then fitted into the outer cylinder, and diffusion bonding treatment was conducted at a high temperature of 1,250° C. and high vacuum of $10^{-4}$ Torr for 90 minutes. In the metal honeycomb body 2 of the metal support so formed, the unbonded zone 17 was formed at the center on the gas exit side, and the bonded zone 18 was formed at the rest of the regions.

A catalyst was supported by each of the metal supports of the prior art examples and the examples 1 to 9 of the present invention and was mounted to the exhaust system of a gasoline engine. A severe cooling-heating durability test with one cycle comprising heating to 950° C. for 10 minutes and cooling to 150° C. for 10 minutes was conducted. Even after 900 cycles were imparted, the metal supports 7 and 8 of the examples of the present invention did not exhibit any damage such as cracks on both entry and exit sides of the metal honeycomb body. Furthermore, no deviation occurred on the boundary surface between the metal honeycomb body and the outer cylinder. Therefore, these metal supports 7 and 8 were approved. However, the metal supports of the prior art examples were rejected because breaking of the metal honeycomb body and deviation occurred. The metal support 8, in particular, was unbonded at the center on the gas exist side of the metal honeycomb body, and consequently, local honeycomb defects (cracks) occurred at this portion.

Exhaust gas purification performance of the metal support 8 could be improved by about 10% in comparison with the metal support 7.

Example 5

A metal support having an outer diameter of 100 mm and a length of 120 mm in the axial direction was produced using the following materials, and a durability test was conducted.

Flat foil: 20Cr—5Al—Fe ferrite type stainless steel foil, 50 or 20 $\mu$m thick and 120 mm wide Corrugated foil: produced by corrugating the same flat foil, peak height of 1.25 mm and pitch of 2.54 mm Outer cylinder: 18Cr—8Ni—Fe heat-resistant steel pipe, 1.5 mm thick, 123 mm long and 102 in outer diameter.

Figure 45:
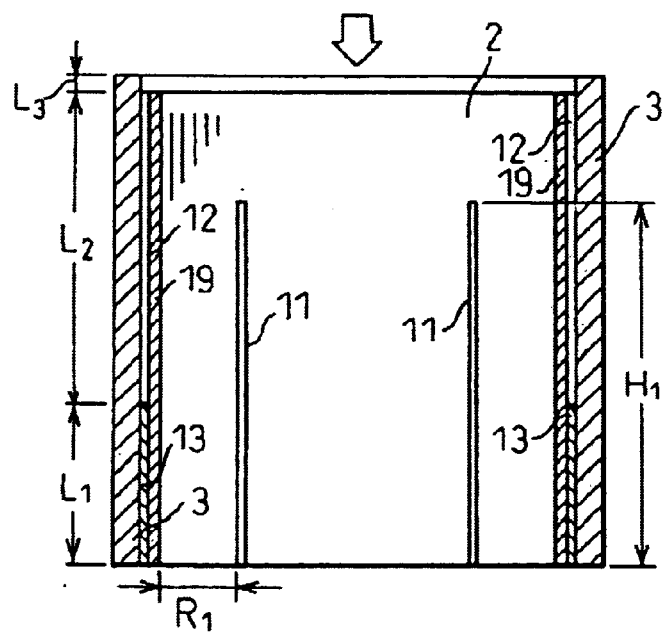
FIG. 45 is a sectional view showing an example of the metal support equipped with a shell according to the present invention.
Figure 46:
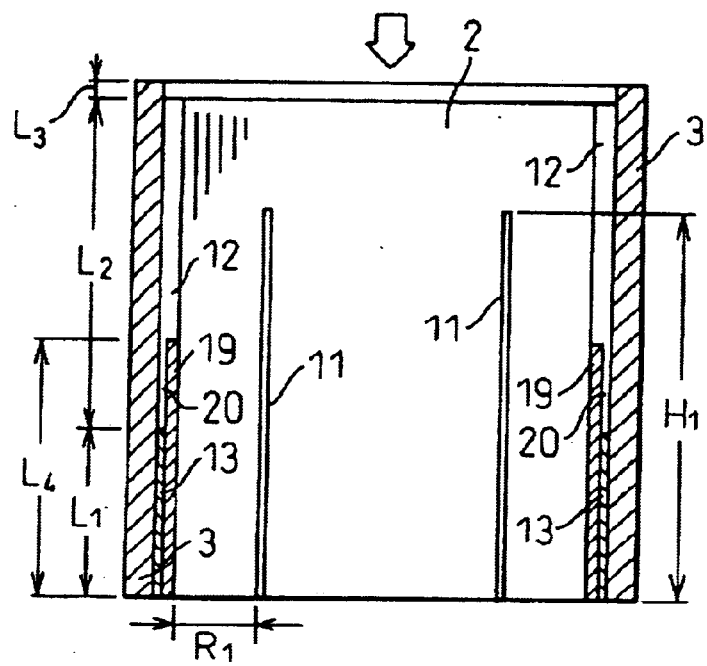
FIG. 46 is a sectional view showing another example of the metal support equipped with the shell according to the present invention.

Diffusion-preventing agent: mixture of alumina powder having a grain size of 1 $\mu$m with water, Brazing material: foil wax In FIG. 45, the diffusion-preventing agent described above was applied to the positions of the honeycomb unbonded portion and the boundary unbonded portion 12, and the brazing material was bonded to the position of the boundary bonded portion 13. Vacuum heat-treatment was then applied in order to diffusion-bond the contact portion between the flat foil and the corrugated foil of the honeycomb body 2 and the flat foils of the shell 19 with each other or the corrugated foils of the shell 19 with each other. Also, the brazing material bonded portion at the boundary was brazed.

(1) Metal Support 1 (Example of This Invention)

Shape and size: $L_1$=40 mm, $L_2$=80 mm, $L_3$=3 mm, $H_1$=90 mm and $R_1$=2 to 3 circumferences in FIG. 45

Thickness of flat and corrugated foils 50 $\mu$m

Back-tension in winding metal honeycomb body: 10 kgf

Shell: Flat foil integral with metal honeycomb body was wound 5 turns

Shell thickness: 250 $\mu$m

Vacuum heat-treatment: at 1,200° C. for 60 minutes at $10^{-4}$ Torr (2) Metal Support 2 (Example of This Invention)

Shape and size: same as metal support 1

Thickness of flat and corrugated foils: 50 $\mu$m

Back-tension in winding of metal honeycomb body: 10 kgf

Shell: Corrugated foil integral with metal honeycomb body was wound 5 turns.

Shell thickness: 250 $\mu$m

Vacuum heat-treatment: at 1,200° C. for 60 minutes at $10^{-4}$ Torr (3) Metal Support 3 (Example of This Invention)

Shape and size: same as metal support 1

Thickness of flat and corrugated foils: 20 $\mu$m

Back-tension in winding of metal honeycomb body: 5 kgf

Shell: Flat foil integral with metal honeycomb body was wound 15 turns.

Shell thickness: 300 $\mu$m

Vacuum heat-treatment: at 1,150° C. for 60 minutes at $10^{-4}$ Torr (4) Metal Support 4 (Example of This Invention)

Shape and size: $L_1$=40 mm, $L_2$=80 mm, $L_3$=3 mm, $L_4$=60 mm, $H_1$=90 mm and $R_1$=2 to 3 turns Thickness of flat and corrugated foils: 50 $\mu$m Back-tension in winding of metal honeycomb body: 10 kgf Shell: produced by winding 5 turns a flat foil separate from metal honeycomb body, and 50 $\mu$m thick and 60 mm wide.

Shell thickness: 250 $\mu$m

Vacuum heat-treatment: at 1,200° C. for 60 minutes at $10^{-4}$ Torr (5) Metal Support 5 (Example of This Invention)

Shape and size: same as metal support 1

Thickness of flat and corrugated foils: 20 $\mu$m

Back-tension in winding of metal honeycomb body: 5 kgf

Shell: 50 $\mu$m-thick flat foil separate from metal honeycomb body was wound 5 turns.

Shell thickness: 250 $\mu$m

Vacuum heat-treatment: at 1,200° C. for 60 minutes and at $10^{-4}$ Torr (6) Metal Support 6 (Comparative Example)

Figure 47:
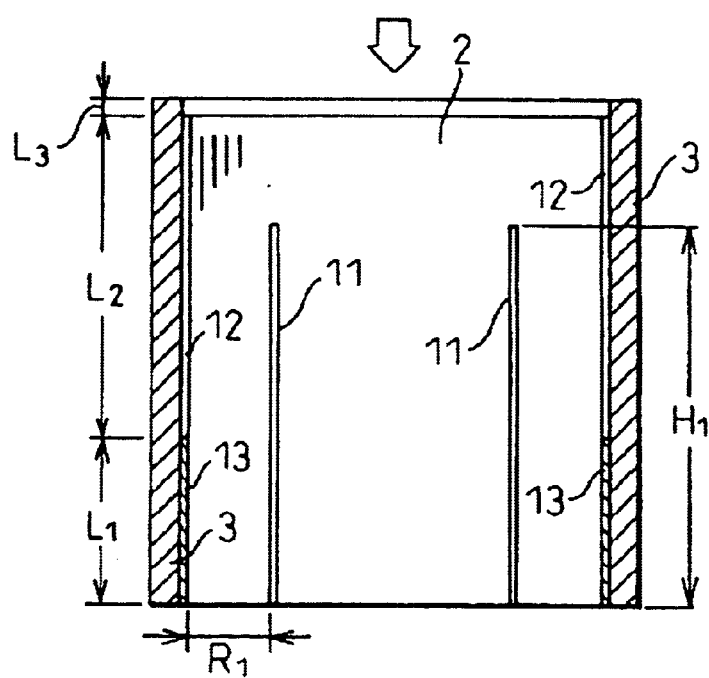
FIG. 47 is a sectional view showing another example of the metal support not equipped with the shell as a comparative example.

Shape and size: $L_1$=40 mm, $L_2$=80 mm, $L_3$=3 mm, $H_1$=90 mm and $R_1$=2 to 3 turns in FIG. 47

Thickness of flat and corrugated foils: 50 $\mu$m Back-tension in winding of metal honeycomb body: 10 kgf Shell: nil.

Vacuum heat-treatment: at 1,280° C. for 90 minutes at $10^{-4}$ Torr (7) Metal Support 7 (Comparative Example)

Shape and size: same as metal support 6

Thickness of flat and corrugated foils: 20 $\mu$m

Back-tension in winding of metal honeycomb body: 5 kgf

Shell: nil.

Vacuum heat-treatment: at 1,280° C. for 90 minutes at $10^{-4}$ Torr (8) Metal Support 8 (Comparative Example)

Shape and size: same as metal support 6

Thickness of flat and corrugated foils: 50 $\mu$m

Back-tension in winding of metal honeycomb body: 10 kgf

Shell: nil.

Vacuum heat-treatment: at 1,200° C. for 60 minutes and $10^{-4}$ Torr (9) Metal Support 9 (Comparative Example)

Shape and size: same as metal support 6

Thickness of flat and corrugated foils: 20 μm
Back-tension in winding of metal honeycomb body: 5 kgf
Shell: nil.
Vacuum heat-treatment: at 1,150° C. for 60 minutes and at $10^{-4}$ Torr The metal support of each of the examples of this invention and Comparative Examples was fitted to an exhaust manifold, and an engine cooling-heating durability test of 900 cycles each comprising heat to 950° C. for 10 minutes and cooling to 150° C. for 10 minutes was conducted under the four conditions tabulated in Table 2.

In Table 2, a uniformity index γ was determined in the procedure shown in Table 3 by dividing a large number of vent holes of the metal honeycomb body into multiple channels, measuring the flow velocity distribution of the exhaust gas flowing through each channel and statistically processing these distributions. When γ was 1.00, the gas flow of each vent hole of the metal honeycomb body was completely uniform. The smaller this value, the more vigorous became non-uniformity of the gas flow. In Table 3, the term "local" means one channel when the vent holes were divided into n channels.

The result was tabulated in Table 4. This test was conducted by fitting the metal support to the position immediately below the exhaust manifold. This was a severe cooling-heating durability test in which the metal support was rapidly heated to 950° C. by the high temperature exhaust gas and was cooled rapidly. Particularly, the condition of the exhaust manifold A was the condition under which the stress concentration by the assembly was remarkable and the exhaust gas non-uniform flow as remarkable, too. However, the metal supports 1 to 5 passed all the conditions.

The metal supports 6 to 9 did not have the shell. Therefore, in all these metal supports, the deviation occurred between the metal honeycomb body 2 and the outer cylinder 3. In the metal supports 6 and 7 in which the vacuum heat-treatment was 1,280° C., the honeycomb defect called "cracks" occurred.

Incidentally, exhaust gas purification performance of the metal supports 3 and 5 could be improved by about 10% in comparison with the metal supports 1, 2 and 4.

TABLE 2

|  | Exhaust gas non-uniform flow: remarkable (γ = 0.89) | Exhaust gas non-uniform flow: mild (γ = 0.96) |
|---|---|---|
| Stress concentration due to assembly: remarkable | Exhaust manifold A | Exhaust manifold B |
| Stress concentration due to assembly: mild | Exhaust manifold C | Exhaust manifold D |

TABLE 3

| Local gas flow velocity | Wi |
|---|---|
| Mean gas flow velocity | $W = \dfrac{\sum^{n} Wi}{n}$ |
| Local non-uniformity index | $\omega i = \dfrac{\sqrt{(Wi - W)^2}}{W}$ |

TABLE 3-continued

| Local gas flow velocity | Wi |
|---|---|
| Non-uniformity index | $\omega = \dfrac{\sum^{n} \omega i}{n}$ |
| Uniformity index | $\gamma = 1 - \dfrac{\omega}{2}$ |

TABLE 4

|  | Exhaust manifold | Occurrence of deviation | Occurrence of cracked | Evaluation |
|---|---|---|---|---|
| Metal support 1 | A | No | No | Approved |
|  | B | No | No | Approved |
|  | C | No | No | Approved |
|  | D | No | No | Approved |
| Metal support 2 | A | No | No | Approved |
|  | B | No | No | Approved |
|  | C | No | No | Approved |
|  | D | No | No | Approved |
| Metal support 3 | A | No | No | Approved |
|  | B | No | No | Approved |
|  | C | No | No | Approved |
|  | D | No | No | Approved |
| Metal support 4 | A | No | No | Approved |
|  | B | No | No | Approved |
|  | C | No | No | Approved |
|  | D | No | No | Approved |
| Metal support 5 | A | No | No | Approved |
|  | B | No | No | Approved |
|  | C | No | No | Approved |
|  | D | No | No | Approved |
| Metal support 6 | A | Yes | Yes | Rejected |
|  | B | Yes | No | Rejected |
|  | C | No | Yes | Rejected |
|  | D | No | No | Approved |
| Metal support 7 | A | Yes | Yes | Rejected |
|  | B | Yes | No | Rejected |
|  | C | No | Yes | Rejected |
|  | D | No | No | Approved |
| Metal support 8 | A | Yes | No | Rejected |
|  | B | Yes | No | Rejected |
|  | C | No | No | Approved |
|  | D | No | No | Approved |
| Metal support 9 | A | Yes | No | Rejected |
|  | B | Yes | No | Rejected |
|  | C | No | No | Approved |
|  | D | No | No | Approved |

INDUSTRIAL APPLICABILITY

As described above, the present invention can provide a metal support that has excellent solid phase diffusion bondability and has improved engine durability as well as improved exhaust gas purification performance. Therefore, the metal support of this invention can exhibit excellent durability and exhaust gas purification performance even under an extremely severe condition such as when it is fitted to an exhaust manifold of an automobile engine, where an exhaust gas having a high temperature of not lower than 950° C. and a temperature of 150° C., for example, is introduced as a non-uniform flow into each vent hole of the metal honeycomb body 2, or where the stress condition due to the assembly is remarkable.

What is claimed is:

1. A metal honeycomb body for an exhaust gas purification catalyst, said honeycomb body comprising:

a plurality of alternate layers of flat metal foil and corrugated metal foil, with adjacent layers in contact with one another, said flat metal foil and said corrugated metal foil being ferrite heat-resistant high alloy steel;
at least one of said flat metal foil and said corrugated metal foil having a foil thickness of less than 40 µm;
said flat metal foil and said corrugated metal foil having a width-wise direction perpendicular to a rolling direction of said metal foils;
said flat metal foil and said corrugated metal foil having a surface roughness specified by an arithmetical mean deviation Rac within a range of 0.001 to 0.3 µm in the direction perpendicular to the rolling direction of said metal foils;
contact portions between said flat metal foil and said corrugated metal foil bonded by solid phase diffusion bonding;
wherein Al content in both said flat metal foil and said corrugated metal foil is at least 3.0%.

2. A metal honeycomb body according to claim 1, wherein said foil thickness is within a range of 10 to 35 µm.

3. A metal honeycomb body for an exhaust gas purification catalyst, said honeycomb body comprising:
a plurality of alternate layers of flat metal foil and corrugated metal foil, with adjacent layers in contact with one another, said flat metal foil and said corrugated metal foil being ferrite heat-resistant high alloy steel;
said flat metal foil and said corrugated metal foil having a width-wise direction perpendicular to a rolling direction of said foils;
said flat metal foil and said corrugated metal foil having a surface roughness specified by an arithmetical mean deviation Rac within a range of 0.001 to 0.3 µm measured in the direction perpendicular to the rolling direction of said metal foils;
contact portions between said flat metal foil and said corrugated metal foil bonded by solid phase diffusion bonding.

4. A metal honeycomb body for an exhaust gas purification catalyst according to claim 3, wherein surface texture of said flat metal foil and said corrugated metal foil is further specified by a number of peaks PPI of at least 100 per inch length measured in the direction perpendicular to the rolling direction of said metal foils.

5. A metal honeycomb body for an exhaust gas purification catalyst according to claim 3, wherein contact portions between said flat metal foil and said corrugated metal foil have a length measured along a length-wise direction of said metal foils at least five times the thickness of said flat-metal foil and said corrugated metal foil.

6. A metal honeycomb body for an exhaust gas purification catalyst according to claim 5, wherein surface texture of said flat metal foil and said corrugated metal foil is specified by a number of peaks PPI of at least 100 per inch of length measured in the direction perpendicular to the rolling direction of said metal foils.

7. A metal honeycomb body for an exhaust gas purification catalyst, said honeycomb body comprising:
a plurality of alternate layers of flat metal foil and corrugated metal foil, with adjacent layers in contact with one another, said flat metal foil and said corrugated metal foil being ferrite heat-resistant high alloy steel;
said flat metal foil and said corrugated metal foil having a wide-wise direction perpendicular to a rolling direction of said metal foils;
said flat metal foil and said corrugated metal foil having a surface texture specified by a number of peaks PPI at least 100 per inch length measured in the direction perpendicular to the rolling direction of said metal foils;
contact portions between said flat metal foil and said corrugated metal foil bonded by solid phase diffusion bonding.

8. A metal honeycomb body for an exhaust gas purification catalyst, said honeycomb body comprising:
a plurality of alternate layers of flat metal foil and corrugated metal foil, with adjacent layers in contact with one another, said flat metal foil and said corrugated metal foil being ferrite heat-resistant high alloy steel;
said honeycomb body having a cylindrical shape, a length, a center axis, an outer periphery, a radius defined between the center axis and the outer periphery, a gas entry side at a first end of the cylindrical shape and a gas exit side at a second end of the cylindrical shape;
said flat metal foil and said corrugated metal foil having a width-wise direction perpendicular to a rolling direction of said metal foils;
said flat metal foil and said corrugated metal foil having a surface texture comprising a surface roughness specified by an arithmetical mean deviation Rac measured in the direction perpendicular to the rolling direction of said metal foils within a range of 0.001 to 0.3 µm;
a portion of contact portions between the flat metal foil and the corrugated metal foil not bonded to one another at least at one position in said honeycomb body defining at least one unbonded portion;
remaining portions of the contact portions between the flat metal foil and the corrugated metal foil bonded by solid phase diffusion bonding;
said at least one unbonded portion located at a distance of at least ½ the radius from the center axis to the outer periphery of said cylindrical shaped metal honeycomb body and extending from at or near the gas exit side, as a start point, toward the gas entry side in a direction of the center axis for a distance of 9/20 to 9/10 of the length of the cylindrical shaped metal honeycomb body and covering at least one circumferential turn with respect to the cylindrical shape of the metal honeycomb body.

9. A metal honeycomb body for an exhaust gas purification catalyst according to claim 8, wherein said start point is located at a position from the gas exit side toward the gas entry side in the direction of the center axis of less than 1/10 the length of the cylindrical shaped metal honeycomb body.

10. A metal honeycomb body for an exhaust gas purification catalyst according to claim 8, further comprising:
said cylindrical shaped metal honeycomb body is disposed in an outer cylinder, with said cylindrical shaped metal honeycomb body bonded to the outer cylinder by a bonded portion between the outer periphery of said cylindrical shaped metal honeycomb and the outer cylinder;
said bonded portion having a length in the direction of the center axis of the cylindrical shaped metal honeycomb body of no greater than ½ the length of the cylindrical shaped metal honeycomb body;
said bonded portion spaced at a distance from the gas entry side in the direction of the center axis of at least ⅓ the length of the cylindrical shaped metal honeycomb body.

11. A metal honeycomb body according to claim 8, further comprising:
a shell located on the outer periphery of the cylindrical shaped metal honeycomb body, said shell comprising at least one circumferential turn of the flat metal foil or the corrugated metal foil around the outer periphery of said cylindrical shaped metal honeycomb body;
said flat metal foil or said corrugated foil of said shell being bonded with each other;
said shell bonded to the outer periphery of said cylindrical shaped metal honeycomb body.

12. A metal honeycomb body according to claim 11, wherein said shell comprises said flat metal foil or said corrugated metal foil elongated by a distance corresponding to a shell formation length.

13. A metal honeycomb body according to claim 11, wherein said shell comprises said flat metal foil or said corrugated metal foil separate from the metal foils constituting said metal honeycomb body.

14. A metal honeycomb body according to claim 11, wherein said shell has a thickness of from 100 to 500 µm.

15. A metal honeycomb body according to claim 11, wherein the outer periphery of said cylindrical shaped metal honeycomb body and the shell are bonded, and said flat metal foil or said corrugated metal foil of said shell are bonded with each other, by solid phase diffusion bonding.

16. A metal honeycomb body according to claim 11, wherein an unbonded portion is located between the outer periphery of said cylindrical shaped metal honeycomb body having said shell around the outer periphery thereof and the outer cylinder in which said cylindrical shaped metal honeycomb body is disposed.

17. A metal honeycomb body according to claim 11, wherein an unbonded portion is located between said cylindrical shaped metal honeycomb body having the shell around the outer periphery thereof and an outer cylinder into which the cylindrical shaped honeycomb is disposed and between part of an outer periphery of the shell and the outer cylinder.

18. A method of producing a metal honeycomb body for an exhaust gas purification catalyst by alternately laminating or integrally winding a flat metal foil and a corrugated metal foil made of a ferrite heat-resistant high alloy steel containing 3 to 10 wt % of Al, said method comprising the steps of:
forming said metal honeycomb body using metal foils in which at least one of said flat metal foil and said corrugated metal foil has a foil thickness of less than 40 µm; and
bonding contact portions between said metal foils by solid phase diffusion bonding by heating said metal honeycomb body at a treatment temperature of 1,100 to 1,250° C. for a treatment time of 30 to 90 minutes in a degree of vacuum of $3\times10^{-4}$ to $5\times10^{-5}$ Torr at the time of arrival at said treatment temperature.

19. A method of producing a metal honeycomb body for an exhaust gas purification catalyst by alternately laminating or integrally winding a flat metal foil and a corrugated metal foil made of ferrite heat-resistant high alloy steel, said method comprising the steps of:
forming said metal honeycomb body by using metal foils in which said flat metal foil and said corrugated metal foil have a surface texture comprising at least one of a surface roughness specified by an arithmetical mean deviation Rac of 0.001 to 0.3 µm measured in a direction perpendicular to a rolling direction of said foils or by a number of peaks PPI of at least 100 per inch length measured in the direction perpendicular to the rolling direction of said foils;
bonding contact portions between said metal foils by solid phase diffusion bonding by heating said metal honeycomb body at a treatment temperature of 1,100 to 1,250° C., a treatment time of 30 to 90 minutes in a degree of vacuum of $3\times10^{-4}$ to $5\times10^{-5}$ Torr at the time of arrival at said treatment temperature.

20. A method of producing a metal honeycomb body for an exhaust gas purification catalyst by alternately laminating or integrally winding a belt-like flat metal foil and corrugated metal foil made of a ferrite heat-resistant high alloy steel, said method comprising the steps of:
forming said metal honeycomb body by winding said foils while a back-tension of 0.2 to 1.5 kgf/cm per unit width of said belt-like flat metal foil is applied to said belt-like flat metal foil resulting in a width of contact portions between said flat metal foil and said corrugated metal foil at least five times the thickness of said flat metal foil and said corrugated metal foil, in which said flat metal foil and said corrugated metal foil have a surface texture comprising at least one of a surface roughness specified by an arithmetical mean deviation Rac of 0.001 to 0.3 µm measure in a direction perpendicular to a rolling direction of said foils or by a number of peaks PPI of at least 100 per inch length measured in the direction perpendicular to the rolling direction of the foils;
bonding said contact portions between said metal foils by solid phase diffusion bonding by heating said metal honeycomb body at a treatment temperature of 1,100 to 1,250° C. for a treatment time of 30 to 90 minutes in a degree of a vacuum of $3\times10^{-4}$ to $5\times10^{-5}$ Torr at the time of arrival at said treatment temperature.

21. A method of producing a metal honeycomb body according to claim 20, wherein said solid phase diffusion bonding is conducted at a vacuum heat treatment temperature T (° C.) within the range of 1,100 to 1,250° C. and satisfying the following relational formula:

$$10^4/(T+273) \leq -0.43 \log Rac + 6.43$$

wherein Rac is the surface roughness specified by the arithmetical mean deviation measured in the direction perpendicular to the rolling direction of said metal foils.

22. A method of producing a metal honeycomb body for an exhaust gas purification catalyst, said method comprising the steps of:
winding a flat metal foil and a corrugated metal foil forming a cylindrical shaped honeycomb body, said flat metal foil and said corrugated metal foil made of a ferrite heat-resistant high alloy steel;
said cylindrical shaped honeycomb body having a length, a center axis, an outer periphery, a radius defined between the center axis and the outer periphery, a gas entry side at a first end of the cylindrical shaped honeycomb body and a gas exit side at a second end of the cylindrical shaped honeycomb body;
during said winding, applying a diffusion-preventing agent at one or more positions at contact portions between the flat metal foil and the corrugated metal foil, said diffusion-preventing agent applied at a distance of at least ½ the radius from the center axis to the outer periphery of said cylindrical shaped honeycomb body and extending from at or near the gas exit side, as a start point, toward the gas entry side in the direction of the center axis for a distance of 9/20 to 9/10 of the length of the cylindrical shaped honeycomb body and covering at least one circumferential turn with respect to the cylindrical shape of the honeycomb body;

providing said flat metal foil and said corrugated metal foil having a width-wise direction perpendicular a rolling direction of the foils with a surface roughness specified by an arithmetical mean deviation Rac measured in the direction perpendicular to the rolling direction of the foils within a range of 0.001 to 0.3 μm;

heat-treating the cylindrical shaped honeycomb body at a treatment temperature of 1,100 to 1,250° C. for a treatment time of 30 to 90 minutes in a degree of vacuum of $3 \times 10^{-4}$ to $5 \times 10^{-5}$ Torr at time of arrival at said heating-treating temperature for solid phase diffusion bonding.

23. A method of producing a metal honeycomb body according to claim 22 further comprising locating said start point at a position from the gas exit side toward the gas entry side in the direction of the center axis of less than 1/10 of length of the cylindrical shaped honeycomb body.

24. A method of producing a metal honeycomb body according to claim 22 further comprising:

forming a shell on said cylindrical shaped honeycomb body by winding at least one turn of the flat foil or the corrugated foil around the outer periphery of the cylindrical shaped honeycomb body and thereafter performing said heat-treating for solid phase diffusion bonding.

25. A method for producing a metal honeycomb body according to claim 24 wherein said shell comprises flat foil or corrugated foil other than said flat foil and corrugated foil forming said cylindrical shaped honeycomb body.

26. A method for producing a metal honeycomb body according to claim 24 further comprising:

applying a brazing material to at least a portion of an outer peripheral surface of the shell formed around the cylindrical shaped honeycomb body;

applying a diffusion-preventing agent to a portion of the outer peripheral surface of the cylindrical shaped honeycomb body not covered by the shell;

thereafter, fitting the cylindrical shaped honeycomb body into an outer cylinder, followed by heat-treating.

27. A method of producing a metal honeycomb body according to claim 26 further comprising:

applying a diffusion-preventing agent on another portion of the outer peripheral surface of the shell not having brazing material applied thereto.

28. A method of producing a metal honeycomb body according to claim 24, further comprising conducting said heat-treating for solid phase diffusion as vacuum heat-treating at a temperature (T ° C.) within a range in accordance with foil thickness (t μm) of the foils defined by the equation:

$$1,100 \leq T \leq 1.7 \times t + 1,165.$$

29. A metal foil made of a ferrite type heat resistant high alloy steel for use as a metal honeycomb body for an exhaust gas purification catalyst produced by alternately laminating or integrally winding a flat foil and a corrugated foil, characterized in that a surface roughness of said metal foil specified by an arithmetical mean deviation Rac measured in a direction perpendicular to a rolling direction of said foil falls within a range of 0.001 to 0.3 μm.

30. (New) A metal foil according to claim 29, wherein a surface texture specified by a number of peaks PPI is at least 100 per inch length measured in the direction perpendicular to the rolling direction of the foil.

31. A metal foil made of a ferrite type heat resistant high alloy steel for use as a metal honeycomb body for an exhaust gas purification catalyst produced by alternately laminating or integrally winding a flat foil and a corrugated foil, characterized in that a surface texture of said metal foil specified by a number of peaks PPI is at least 100 per inch length measured in a direction perpendicular to a rolling direction of the foil.

* * * * *